(12) United States Patent
Matsuura et al.

(10) Patent No.: US 7,857,087 B2
(45) Date of Patent: Dec. 28, 2010

(54) ACTUATOR

(75) Inventors: Hirokazu Matsuura, Aichi-ken (JP); Naoki Yamano, Aichi-ken (JP); Hideo Higashi, Aichi-ken (JP); Kazuhito Sugimoto, Aichi-ken (JP); Hajime Kitte, Aichi-ken (JP); Ichizo Shiga, Aichi-ken (JP); Shigeyuki Suzuki, Aichi-ken (JP); Takeki Hayashi, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 168 days.

(21) Appl. No.: 12/232,908

(22) Filed: Sep. 25, 2008

(65) Prior Publication Data

US 2009/0084620 A1    Apr. 2, 2009

(30) Foreign Application Priority Data

Sep. 27, 2007  (JP) ............... 2007-252012
Mar. 6, 2008   (JP) ............... 2008-056910
Jul. 31, 2008  (JP) ............... 2008-198754

(51) Int. Cl.
   *B62D 25/10*  (2006.01)
   *F15B 15/26*  (2006.01)

(52) U.S. Cl. ............... 180/274; 296/187.04; 92/23

(58) Field of Classification Search ............... 180/69.2, 180/69.21, 271, 274; 92/15, 17, 19, 23, 26; 188/371, 374, 377; 296/187.04, 193.11, 296/187.11

See application file for complete search history.

(56) References Cited

U.S. PATENT DOCUMENTS 6,530,449 B2 * 3/2003 Sasaki et al. ............... 180/274

7,475,752 B2 * 1/2009 Borg et al. ............... 180/274
2002/0011372 A1   1/2002 Sasaki et al.
2004/0211313 A1   10/2004 Yamaguchi
2006/0108169 A1 * 5/2006 Borg et al. ............... 180/274

FOREIGN PATENT DOCUMENTS

| JP | A-2002-029367 | 1/2002 |
| JP | A-2002-029370 | 1/2002 |
| JP | A-2003-191818 | 7/2003 |
| JP | A-2004-322735 | 11/2004 |
| JP | A-2004-330913 | 11/2004 |

* cited by examiner

*Primary Examiner*—Paul N Dickson
*Assistant Examiner*—Joseph Rocca
(74) *Attorney, Agent, or Firm*—Posz Law Group, PLC

(57) ABSTRACT

An actuator AE1 includes a lock mechanism R1 configured to fill a gas G generated by operating a gas generator 35 at inside of a cylinder 22 and moving forward a piston 38 along with a support rod 40 for restricting a rearward movement of the support rod moved forward. The support rod 40 is arranged to be able to absorb a kinetic energy of a protection object person and capable of being plastically deformed when the protection object person is received by a receiving member after having been moved forward. A lock mechanism R1 is constituted by a diameter enlarging deformed portion 42 arranged at a piston and a locking stepped portion 24 capable of restricting the rearward movement of the piston. Further, the diameter enlarging deformed portion 42 is locked by the locking stepped portion 24 by being elastically deformed by an elastic force of the diameter enlarging deformed portion 42 per se from a diameter contracting state to a diameter enlarging state when arranged to the locking stepped portion 24 after moving the piston forward.

11 Claims, 34 Drawing Sheets

XXXII-XXXII END FACE VIEW

ACTUATOR

BACKGROUND OF THE INVENTION

1. Field of the Invention

The present invention relates to an actuator used for a safety apparatus for an automobile, for example, relates to an actuator used for an operation of lifting a hood panel or the like in receiving a walker as a protection object.

2. Description of the Related Art

In a background art, there is an actuator of a safety apparatus for an automobile mounted to a vehicle of moving up a rear end side of a hood panel to be able to receive a walker by a hood panel per se by utilizing absorption of an energy in plastically deforming the hood panel (refer to, for example, Patent References 1, 2).

The actuators for moving up the hood panel are constituted as a piston cylinder type constituting a drive source by a gas generated in operating a gas generator to be able to be operated swiftly and constituted such that the gas constituting a working fluid generated by operating the gas generator is filled at inside of a cylinder and a piston rod contained at inside of the cylinder is moved up to move up the hood panel connected to an upper end side of the piston rod. Further, the piston rod is constituted by a structure of integrating a piston and a support rod capable of supporting the hood panel by being extended from the piston. Further, the actuator constituted as the piston cylinder type includes a lock mechanism of restricting a downward movement of the moved-up piston rod relative to the cylinder so as not to move down the hood panel after moving up the hood panel by filling the gas from the gas generator at inside of the cylinder.

Further, as the gas generator, a micro gas generator igniting a powder or a gas generating agent by inputting an operating signal, and according to the gas generator, a combustion gas of the powder or a gas generated by a chemical reaction (oxidation reaction· oxidation combustion reaction) of the gas generator is utilized as a gas of moving the piston rod.

Patent Reference 1: JP-A-2004-322735

Patent Reference 2: JP-A-2004-330913

However, according to the actuator of the background art, as a structure of a lock mechanism, there is constituted a structure in which an inner peripheral face side of the cylinder is arranged with a C ring elastically deformed in a diameter contracting direction, an outer peripheral face side of the piston rod is made to be slidable relative to the inner peripheral face substantially over an entire length of the cylinder, and a fitting groove for fitting the C ring is arranged at a position of the outer peripheral face of the piston rod intended to be locked.

Therefore, for example, when a kinetic energy of a walker is configured to be able to be absorbed by using a plastic deformation of not only a receiving member of the hood panel or the like for receiving the protection object of a walker or the like but bending of the rod per se or the like by changing an outer diameter dimension of the rod to adjust a rigidity of the rod moving forward, according to the actuator of the background art, there is constituted the structure of sliding the outer peripheral face substantially over the entire length of the rod to the inner peripheral face of the cylinder, and therefore, the change is not limited only to the rod but also an inner diameter of the cylinder needs to change, which cannot be dealt with easily.

SUMMARY OF THE INVENTION

The invention resolves the above-described problem and it is an object thereof to provide an actuator capable of easily adjusting a rigidity of a support rod supporting a receiving member even when a lock mechanism capable of preventing a rearward movement after operating a support rod is provided.

An actuator according to the invention is characterized in an actuator having a constitution used in a safety apparatus for an automobile, configured to move forward a moving member arranged at inside of a housing in a cylindrical shape along with a support rod connected to the moving member in being operated, constituted by including a lock mechanism of restricting a rearward movement of the support rod moved forward, and the support rod projected from a front end wall portion of the housing supports a receiving member for receiving a protection object;

wherein the support rod is arranged to be able to absorb a kinetic energy of the protection object and to be able to be plastically deformed in receiving the protection object by the receiving member after having moved forward;

wherein the lock mechanism is constituted by a diameter enlarging deformed portion arranged at the moving member capable of enlarging a diameter thereof more than an outer diameter dimension of the moving member in moving forward at inside of the housing; and a locking stepped portion arranged at a position of arranging the moving member after having been moved at an inner peripheral face of the housing and capable of restricting a rearward movement of the moving member by locking the diameter enlarging deformed portion the diameter of which is enlarged; and wherein the diameter enlarging deformed portion is constructed by a constitution of being locked by the locking stepped portion by being elastically deformed by an elastic force of the diameter enlarging deformed portion per se, or being plastically deformed by a press force of the moving member from a diameter contracting state to a diameter enlarging state when the moving member is arranged at the locking stepped portion after having been moved forward.

In the actuator according to the invention, in being operated, the moving member arranged at inside of the housing is moved forward along with the support rod. Further, when the moving member is arranged at the locking stepped portion after having been moved forward, the diameter enlarging deformed portion is elastically deformed by an elastic force of the diameter enlarging deformed portion per se from the diameter contracting state to the diameter enlarging state, or plastically deformed by a press force of the moving member to be locked by the locking stepped portion. Therefore, the rearward movement of the support rod is restricted, when the receiving member receives the protection object, the kinetic energy of the protection object can be absorbed by plastically deforming the support rod pertinently as in the bending deformation or the like when the receiving member receives the protection object.

Further, in the actuator according to the invention, even when an outer diameter dimension of the support rod is changed to change a rigidity, although it is necessary to adjust an inner diameter dimension of the inserting hole of the support rod at the front end wall portion on the side of the housing, constitutions of the diameter enlarging deformed portion on the side of the moving member and the locking stepped portion on the side of the housing of locking the diameter enlarging deformed portion can commonly be used without being changed to be able to easily deal therewith.

Therefore, in the actuator according to the invention, the rigidity of the support rod supporting the receiving member can easily be adjusted even when the lock mechanism capable of preventing the rearward movement of the support rod after having been operated is provided.

Further, the actuator of the invention can be constructed by a simple and convenient constitution in which the locking member of the lock mechanism is not provided on the side of the housing enlarging the outer diameter dimension of the housing but the housing side is provided with the recess portion of simply enlarging the diameter locally at a vicinity of an end portion on the side of the front end wall portion of an inner peripheral face to form the locking stepped portion and large-sized formation of the housing can be avoided. Further, at inside of the housing, although the diameter enlarging deformed portion is provided locally at the portion of the moving member, the diameter enlarging deformed portion is deformed to enlarge the diameter to be able to be locked by the locking stepped portion by elastically deforming or plastically deforming the diameter enlarging deformed portion per se, and a number of parts constituting the diameter enlarging deformed portion provided on the side of the moving member can be made to be as small as possible.

Further, as the protection object, not only a person of a walker, a passenger or the like but a part of a vehicle body of a bumper or the like can be exemplified.

Further, as the drive source of moving the moving member, a fluid pressure of a working fluid of oil, water, a gas (gas) of air or the like, an attraction force of a solenoid, an urge force of a compressed spring (recovery force) can be utilized.

Further, the diameter enlarging deformed portion can be constituted by a ring-like elastic member contained in the recess groove provided along a peripheral direction of an outer peripheral face of the moving member and elastically deformed from the diameter contracting state to the diameter enlarging state riding over the recess groove of the moving member and the locking stepped portion of the housing when the moving member is arranged at the locking stepped portion after having been moved forward. As such a ring-like elastic member, for example, a C ring comprising spring steel or the like can be exemplified.

Further, when the ring-like elastic member is constituted by a C ring having a notch penetrating inner and outer peripheries, the ring-like elastic member may be formed by a shape of widening a width dimension between the inner and the outer peripheries from a side of a front end portion at the vicinity of the notch to a side of a root portion constituting a position of point symmetry with the notch. According to the constitution, the ring-like elastic member can be elastically deformed to easily contract the diameter such that the front end portion side at the vicinity of the notch is bent to an axis core side of the ring-like elastic member and easily enlarges the diameter when arranged to the locking stepped portion and is easily arranged to the recess groove. Incidentally, in this case, the front end portion per se at the vicinity of the notch of the ring-like elastic member narrows the width dimension between the inner and the outer peripheries, and even when the state of riding over the recess groove of the moving member and the locking stepped portion of the housing is not constituted in enlarging the diameter and the ring-like elastic member is arranged only on the side of the locking stepped portion by bringing the outer peripheral face enlarging the diameter into contact with the inner peripheral face of the locking stepped portion, the vicinity on the root portion side constituting the position of point symmetry with the front end portion is brought into a state of riding over the recess groove of the moving member and the locking stepped portion of the housing and can be locked by the bottom face of the locking stepped portion and the rearward movement of the support rod can be restricted. In other words, so far as the front end portion of the vicinity of the notch of the ring-like elastic member can ensure an elastic deformation of moving the root portion side to project from the recess groove into a state in which the root portion side of the locking stepped portion rides over the recess groove of the moving member of the locking stepped portion of the housing, it is not necessary to enlarge the diameter of the front end portion per se in the state of riding over the recess groove of the moving member and the locking stepped portion of the housing in enlarging the diameter. Therefore, in consideration of only the outer diameter dimension by which the front end portion per se is brought into the diameter enlarging state from the diameter contracting state in the elastic deformation, the inner diameter dimension may not strictly be controlled in the elastic deformation, and the ring-like elastic member comprising the C ring can easily be fabricated. Further, the bottom face of the locking stepped portion is a portion of restricting the rearward movement of the diameter enlarging deformed portion and the inner peripheral face of the locking stepped portion is a portion extended from the outer peripheral edge of the bottom face along a direction of the forward movement of the moving member.

Further, when the ring-like elastic member is constituted by the shape of the C ring, other than constituting the ring shape in a circular plate shape having a thickness dimension of a plate-like shape along the moving direction of the moving member, as a cylinder shape, a cross-sectional face in the direction orthogonal to the axis may be constituted by a C ring shape. In such a case, the locking stepped portion provided at the housing is constituted by providing a bottom face of restricting the rearward movement of the diameter enlarging deformed portion and an inner peripheral face extended from an outer peripheral edge of the bottom face along the forward movement direction of the moving member. Further, the ring-like elastic member constitutes the cross-sectional face in the direction orthogonal to the axis by the shape of the C ring having the notch penetrating the inner and outer peripheries, and forms a shape of the taper pipe capable of enlarging the outer diameter dimension from the end portion on the forward movement side to the end portion on the rearward movement side, and when the moving member is arranged to the locking stepped portion after the forward movement, the end portion on the forward movement side is contained in the recess groove, further, the end portion on the rearward movement side is elastically deformed from the diameter contracting state to the diameter enlarging state and is configured to be able to be brought into contact with the bottom face and the inner peripheral face of the locking stepped portion. In such a constitution, the rearward movement of the support rod can be received by a portion between the forward movement side end portion contained in the recess groove and the rearward movement side end portion locked by being brought into contact with the bottom face and the inner peripheral face of the locking stepped portion, that is, a peripheral wall substantially in a shape of a circular cylinder along the axial direction of the taper pipe shape, can withstand even a large compressive load and can stably restrict the rearward movement of the support rod. Further, according to the ring-like elastic member of the taper pipe shape provided with the notch along the axial direction, so far as the forward movement side end portion is brought into a state of being contained at inside of the recess groove in enlarging the diameter, the rearward movement side end portion may be made to be able to be separated from the recess groove to be able to be simply brought into contact with the bottom face and the inner peripheral face of the locking stepped portion in enlarging the diameter. In other words, the rearward movement side end portion may not be able to enlarge the diameter to ride over the recess groove and the locking stepped portion, according to the ring-like elastic member of the taper pipe shape provided with the notch along the axial direction, an accuracy of a wall thickness are a deformation amount of the rearward movement side end portion (deformation amount of elastically deforming the ring-like elastic member from the diameter enlarging state to the diameter contracting state to be able to be contained in the recess groove) may not be controlled strictly and the ring-like elastic member can easily be fabricated.

Further, when the diameter enlarging deformed portion is constituted from the ring-like elastic member of the C ring or the like, in being operated, the actuator is constituted by the piston cylinder type and the ring-like elastic member is configured to be brought into press contact slidably with the housing inner peripheral face in the state of being contained to the recess groove to move forward the moving member constituting the piston by making the working fluid flow to inside of the housing constituting the cylinder, and when the ring-like elastic member is constituted as the piston ring of sealing a side of supplying the working fluid at the moving member, the piston ring promoting the sliding function or the seal function may not be provided separately on the side of the moving member and a number of parts of the moving member constituting the piston can be made to be small.

Further, when the diameter enlarging deformed portion is elastically deformed to enlarge a diameter, the diameter enlarging deformed portion may be constituted as an elastic piece portion arranged on a side of an outer peripheral face of a moving member along a direction of moving the moving member. Such an elastic piece portion may constitute one end portion along the direction of moving the moving member as a side of a base portion connected to a side of a main body of the moving member and constitute other end portion along the direction of moving the moving member as a hook piece portion capable of being locked by the locking stepped portion, and may be arranged such that the side of the hook piece portion is elastically deformed to a side of the diameter enlarging direction to rotate by constituting a side of a center of rotation by the side of the base portion and the hook piece portion is locked by the locking stepped portion when arranged to the locking stepped portion after a forward movement of the moving member.

In this case, the elastic piece portion may arrange the hook piece portion relative to the base portion to be disposed on the side of the forward movement of the moving member, or conversely arrange on a side of a rearward movement of the moving member.

Further, when the hook piece portion is arranged on the side of the forward movement of the moving member relative to the base portion, a front end wall portion may be arranged with a guide face for guiding the hook piece portion in the diameter enlarging direction by being brought into contact with the hook piece portion when arranged to the locking stepped portion after the forward movement of the moving member. According to the constitution, even when an urge force in the direction of enlarging the diameter of the hook piece portion is weak, the hook piece portion can precisely be deformed to enlarge the diameter to be locked by the locking stepped portion. That is, even when the urge force in the direction of enlarging the diameter of the hook piece portion is weakened to weaken a resistance when the hook piece portion slides on an inner peripheral face of the cylinder, the hook piece portion can precisely be locked by the locking stepped portion by utilizing the guide face, and a speed of moving the moving member can be restrained from being reduced.

Further, the diameter enlarging deformed portion may be constructed by a constitution of being plastically deformed from a diameter contracting state to a diameter enlarging state by being brought into contact with the front end wall portion when arranged to the locking stepped portion after the forward movement of the moving member. In this case, the moving member may be configured to attach a diameter enlarging deformed member, or the moving member per se may be constituted as a diameter enlarging deformed portion.

Further, in a case in which the actuator is constituted by a piston cylinder type, in being operated, the moving member constituting a piston is moved forward by making a working fluid flow to inside of a housing constituting a cylinder and the moving member per se is constituted as the diameter enlarging deformed portion, so far as substantially an entire periphery in a peripheral direction of at least a portion of an outer peripheral face of the diameter enlarging deformed portion is made to be slidable on an inner peripheral face of the housing constituting the cylinder, the diameter enlarging deformed portion can be operated as the piston ring, and the moving member as the piston can be constituted without separately providing a piston ring.

Further, when the actuator is constituted by the piston cylinder type, in being operated, the moving member constituting the piston is configured to move forward by making the working fluid flow to inside of the housing constituting the cylinder, the locking stepped portion provided on the side of the cylinder is constituted by providing a bottom face for restricting the rearward movement of the diameter enlarging deformed portion and the inner peripheral face extended from an outer peripheral edge of the bottom face along the forward movement direction of the moving member. Further, the moving member is constituted by providing the piston main body and a lock member constituted separately from the piston main body and arranged as the diameter enlarging deformed member on a side of the front end wall portion of the piston main body, made to be brought into contact with the front end wall portion and connected to the support rod. Further, the lock member is constituted by providing a ceiling plate portion connected with the support rod and made to be able to be brought into contact with the front end wall portion, and an umbrella portion in a cylindrical shape extended from an outer peripheral edge of the ceiling plate portion to a side of the piston main body and constituting the diameter enlarging deformed portion. The umbrella portion is constituted by arranging a locking leg divided into a plurality thereof in a direction around an axis of the cylinder at an end portion side remote from the ceiling plate portion. Further, the piston main body is constituted by providing a converging taper shape press portion at a front end of the umbrella portion side to be able to press a lock member to move to a position of arranging the locking stepped portion by being brought into contact with the respective locking legs of the umbrella portion when the moving member constituting the piston is moved forward. Further, the umbrella portion may be configured to open in the diameter enlarging direction while being plastically deformed to restrict the rearward movement of the lock member by bringing the respective locking legs into contact with the bottom face and the inner peripheral face of the locking stepped portion by being pressed by the taper shape press portion of the piston main body when the lock member is arranged at the position of arranging the locking stepped portion by being pressed to the piston main body to bring the ceiling plate portion into contact with the front end wall portion by the piston main body.

According to such a constitution, in being operated, the piston main body is moved forward by receiving a pressure of the working fluid and the lock member is moved forward to the position of arranging the locking stepped portion by being pressed by the taper shape press portion of the piston main body. Further, even when the lock member is made to stop moving by bringing the ceiling plate portion into contact with the front end wall portion, the piston main body separate from the lock main body is moved forward by pressing the taper shape press portion, and therefore, the respective locking legs of the umbrella portion of the lock member enlarge the diameter while being plastically deformed, front ends of the respective locking legs are arranged on the bottom face of the locking stepped portion, and moved on the bottom face of the locking stepped portion and is brought into contact with the inner peripheral face of the locking stepped portion. At this occasion, even when the support rod supporting the receiving member is going to be moved rearward, the respective locking legs are brought into contact with the bottom face and the inner peripheral face of the locking stepped portion, and are not deformed to enlarge the diameter to be brought into a state of the support bar (prop) to support the ceiling plate portion, and therefore, the ceiling plate portion is not moved rearward, as a result, the rearward movement of the lock member is restricted, and the rearward movement of the support rod can be prevented. Further, a mechanism of bringing front ends of the respective locking legs into contact with the inner peripheral face of the locking stepped portion by moving the front ends on the bottom face of the locking stepped portion may utilize not only pressing of the taper shape press portion of the piston main body but a press force operated to the respective locking legs from the support rod by way of the ceiling plate portion when the support rod is going to be moved rearward.

Further, the above-described constitution can enlarge the diameter of the respective locking legs uniformly by the taper shape press portion of the piston main body and can restrict the rearward movement of the support rod in the direction around the axis of the cylinder with an excellent balance.

Further, in a case of using the working fluid for a drive source of moving the moving member, when the diameter enlarging deformed portion is plastically deformed from the diameter contracting state to the diameter enlarging state to enlarge the diameter, a pressure of the working fluid may be utilized. That is, an actuator having such a constitution is characterized in an actuator used in a safety apparatus for an automobile, configured to move forward a moving member arranged at inside of a housing in a cylindrical shape along with a support rod connected to the moving member in being operated, constituted by including a lock mechanism for restricting a rearward movement of the support rod moved forward, and configured to connect the support rod projected from a front end wall portion of the housing to a receiving member for receiving a protection object;

wherein the actuator is constituted as a piston cylinder type, and configured to move forward the moving member constituting a piston by making a working fluid flow to inside of the housing constituting a cylinder in being operated, wherein the support rod is arranged to be able to absorb a kinetic energy of the protection object and to be able to be plastically deformed when the receiving member receives the protection object after having moved forward;

wherein the lock mechanism is constituted by:

a diameter enlarging deformed portion arranged at the moving member and capable of enlarging a diameter thereof more than an outer diameter dimension of the moving member in moving forward at inside of the housing; and a locking stepped portion arranged at a position of arranging the moving member after having been moved forward at an inner peripheral face of the housing and capable of restricting a rearward movement of the moving member by locking the diameter enlarging deformed portion the diameter of which is enlarged;

wherein the diameter enlarging deformed portion is constructed by a fluid cap having a fluid flow inlet opened to a side of supplying the working fluid of the housing and storing the working fluid flowing from the fluid flow inlet; and wherein the cap is configured to be plastically deformed from a diameter contracting state to a diameter enlarging state by a pressure of the working fluid flowing from the fluid flow inlet when the moving member is arranged at the locking stepped portion after having been moved forward by making an outer peripheral face thereof slidable to an inner peripheral face of the housing.

In the actuator having such a constitution, in being operated, the moving member arranged at inside of the housing is moved forward along with the support rod by receiving the pressure of the working fluid. Further, even when in arranging the moving member to the locking stepped portion after the forward movement, the fluid cap as the diameter enlarging deformed portion sliding the outer peripheral face on the inner peripheral face of the housing is made to stop moving along the axial direction of the housing, the fluid cap is plastically deformed from the diameter contracting state to the diameter enlarging state by the pressure of the working fluid flowing from the fluid flow inlet to be locked by the locking stepped portion. Therefore, when the rearward movement of the support rod is restricted and the receiving member receives the protection object, the kinetic energy of the protection object can be absorbed by pertinently plastically deforming the support rod as in bending deformation or the like.

Further, also in the actuator having such a constitution, even when the outer diameter dimension of the support rod is changed to change a rigidity, although it is necessary to adjust the inner diameter dimension of the inserting hole of the support rod at the front end wall portion on the side of the housing, constitutions of the diameter enlarging deformed portion on the side of the moving member and the locking stepped portion on the side of the housing of locking the diameter enlarging deformed portion can commonly be used without being changed to easily deal therewith.

Therefore, also in the actuator of the above-described constitution, even when the lock mechanism capable of preventing the rearward movement of support rod after having being operated is provided, the rigidity of the support rod of supporting the receiving member can easily be adjusted. Naturally, also in this case, when the diameter enlarging deformed portion constituting the fluid cap is constituted such that substantially an entire periphery in a peripheral direction of at least a portion of an outer peripheral face is slid on the inner peripheral face of the cylinder, the diameter enlarging deformed portion can be operated as the piston ring, and the moving member constituting the piston can be constituted without separately providing a piston ring.

Further, when the moving member per se constitutes the fluid cap per se as the diameter enlarging deformed portion by making substantially the entire periphery in the peripheral direction of at least a portion of the outer peripheral face slidable on the inner peripheral face of the housing, the moving member as the piston can be constituted by the fluid cap per se without separately providing the piston ring and a number of parts constituting the moving member can be reduced.

Further, when the diameter enlarging deformed portion is plastically deformed by being brought into contact with the front end wall portion or by utilizing the fluid pressure, so far as the diameter enlarging deformed portion can ensure a dimension capable of smoothly moving to the locking stepped portion of the moving member in being operated, thereafter, the diameter enlarging deformed portion may enlarge the diameter while being plastically deformed to be able to be locked by the locking stepped portion, the diameter enlarging deformed portion may not be constituted with a high dimensional accuracy, further, a number of parts may be small, and therefore, the actuator can be fabricated extremely simply and conveniently.

Further, when the diameter enlarging fluid cap is utilized by utilizing the pressure of the fluid flowing from the fluid flow inlet, there may be constructed a constitution as follows. That is, the locking stepped portion provided on the side of the cylinder is constituted by including the bottom face of restricting the rearward movement of the diameter enlarging deformed portion and an inner peripheral face extended from the outer peripheral edge of the bottom face along the forward movement direction of the moving member. Further, the fluid cap is constituted by providing the ceiling plate portion connected to the support rod and made to be able to be brought into contact with the front end wall portion, the umbrella portion in the cylindrical shape extended from the outer peripheral edge of the ceiling plate portion to the side of the rearward movement and having the locking leg divided into the plurality in the direction around the axis of the cylinder, and the fluid flow inlet formed by being surrounded by the front ends of the respective locking legs of the umbrella portion. Further, the respective locking legs of the umbrella portion are configured to make the outer peripheral faces slidable on the inner peripheral face of the cylinder, open in the diameter enlarging direction while being plastically deformed by the pressure of the working fluid flowing from the fluid flow inlet when the moving member is arranged at the locking stepped portion after the forward movement and restrict the rearward movement of the moving member while bringing the respective front ends into contact with the bottom face and the inner peripheral face of the locking stepped portion.

According to the constitution, in being operated, the fluid cap is moved forward to the position of arranging the locking stepped portion by sliding the outer peripheral faces of the respective locking legs of the umbrella portion on the inner peripheral face of the cylinder by receiving the pressure of the working fluid. Further, when the fluid cap is made to stop moving by bringing the ceiling plate portion into contact with the front end wall portion, the respective locking legs of the umbrella portion enlarge the diameter while being plastically deformed by the pressure of the working fluid flowing from the fluid flow inlet, the front ends of the respective locking legs are arranged on the bottom face of the locking stepped portion, further moved on the bottom face of the locking stepped portion and brought into contact with the inner peripheral face of the locking stepped portion. At this occasion, even when the support rod supporting the receiving member is going to move rearward, the respective locking legs bring the front ends into contact with the bottom face and the inner peripheral face of the locking stepped portion, and is brought into a state of a support bar (prop) without being deformed to enlarge the diameter to support the ceiling plate portion, and therefore, the ceiling plate portion is not moved rearward, as a result, the rearward movement of the support rod can be prevented. Further, in the above-described constitution, vicinities of sides of root portions of the respective locking legs may partially be deformed plastically by ensuring an operation as the support bars by the respective locking legs of the umbrella portion without plastically deforming the total of the fluid cap and a state of plastically deforming the fluid cap can be stabilized.

In this case, the front end wall portion may be arranged with the projection for deformation of plastically deforming a portion of the outer peripheral edge of the ceiling plate portion to the side of the forward movement direction of the moving member by being brought into contact with the vicinity of the outer peripheral edge of the ceiling plate portion at the vicinities of the sides of the root portions of the respective locking legs for auxiliary deforming the respective locking legs in the diameter enlarging direction when the moving member is arranged at the locking stepped portion after the forward movement. According to the constitution, the respective locking legs are easy to be deformed plastically in the diameter enlarging direction uniformly and the rearward movement of the support rod can be restricted in the direction around the axis of the cylinder with the excellent balance.

Further, a constitution of providing the projection for deformation at the front end wall portion as described above can be utilized also in the actuator constituting the moving member by the lock member having the piston main body and the umbrella portion as described above.

Further, when the actuator is constituted by the piston cylinder type and configured to arrange the gas generator of generating a gas by being ignited in inputting an operating signal on a side of an end portion remote from the front end wall portion of the housing constituting the cylinder and moving forward the moving member constituting the piston by constituting a drive source by the gas generated by the gas generator, a micro gas generator capable of generating a gas explosively and rapidly in being ignited can be used and the moving constituting the piston can swiftly be moved.

DESCRIPTION OF THE PREFERRED EMBODIMENTS

Explaining an embodiment of the invention in reference to the drawings, as shown by FIGS. 1 through 4, an actuator A1 (AE1) of a first embodiment is used in a lifting apparatus U of a walker protecting apparatus M1 as a safety apparatus for an automobile mounted to a vehicle V, and the lifting apparatus U moves up a rear end 15c of a hood panel 15 in operating the actuator A1. Further, the actuator A1 of the first embodiment is arranged below a vicinity of the rear end 15c of the hood panel 15 of the vehicle V. Further, the walker protecting apparatus M1 is constituted by including the lifting apparatus U of moving up the rear end 15c of the hood panel 15 as a receiving member of receiving a walker, and an air bag apparatus 9 having an air bag protecting a walker from a front pillar 4.

Figure 1:
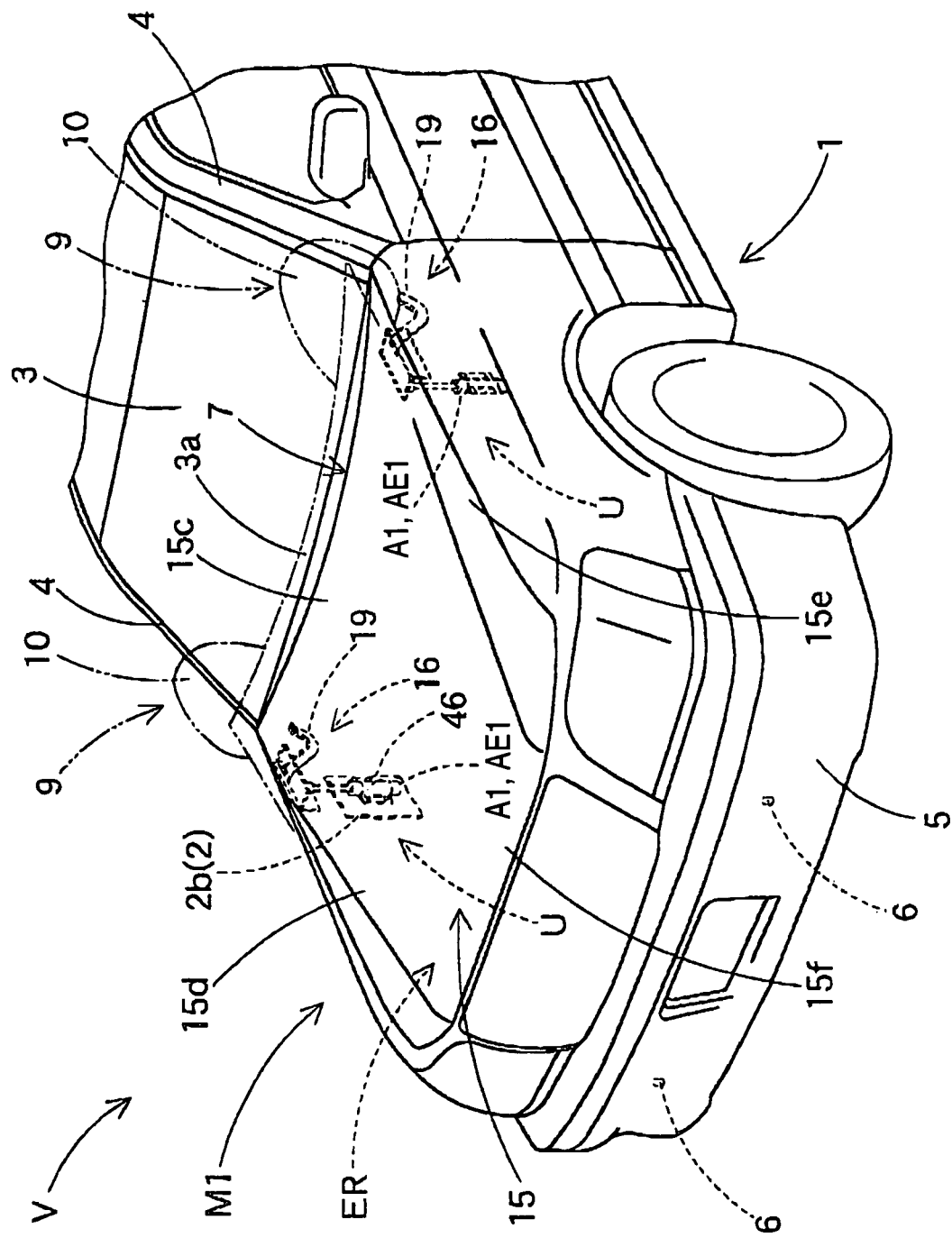
FIG. 1 is a perspective view of a vehicle mounted with a walker protecting apparatus using an actuator of a first embodiment of the invention.

Further, as shown by FIG. 1, a front bumper 5 of the vehicle V is arranged with a sensor 6 capable of detecting or predicting a collision with a walker as a protection object and is constituted such that when an operating circuit, not illustrated, inputting a signal from the sensor 6 detects or predicts a collision of the vehicle V with a walker based on the signal from the sensor 6, an inflator 11 (refer to FIG. 3) of the air bag apparatus 9 and a gas generator 35 (refer to FIG. 5) constituting a drive source of the actuator A1 of the lifting apparatus U are operated.

Further, according to the specification, a front and rear direction and an up and down direction are respectively made to coincide with a front and rear direction and an up and down direction of the vehicle V and a left and right direction is made to coincide with a left and right direction when a rear side is viewed from a front side of the vehicle V.

As shown by FIGS. 1 through 4, the hood panel 15 is arranged to cover an upper side of an engine room ER of the vehicle V and is connected to a body 1 of the vehicle V to be able to open and close to be opened in front by hinge portions 16 arranged on both edge sides in the left and right direction at a vicinity of the rear end 15c. The hood panel 15 is constituted by an outer panel 15a on an upper face side and an inner panel 15b disposed on a lower face side and increasing a strength thereof more than that of the outer panel 15a, which are made of a sheet metal comprising aluminum (aluminum alloy) or the like. The hood panel 15 is plastically deformed to be able to absorb a kinetic energy of a walker when the walker is received and the rear end 15c is moved up with an object of opening a large space on an upper side of the engine room ER by operating the actuator A1 of the lifting apparatus U in collision of the vehicle V with a walker to increase an amount of deformation. Further, the lifting apparatus U of the first embodiment also serves to provide a large gap S for projecting the air bag 10 between a cowl 7 and the rear end 15c of the hood panel 15 by lifting the rear end 15c of the hood panel 15.

Figure 2:
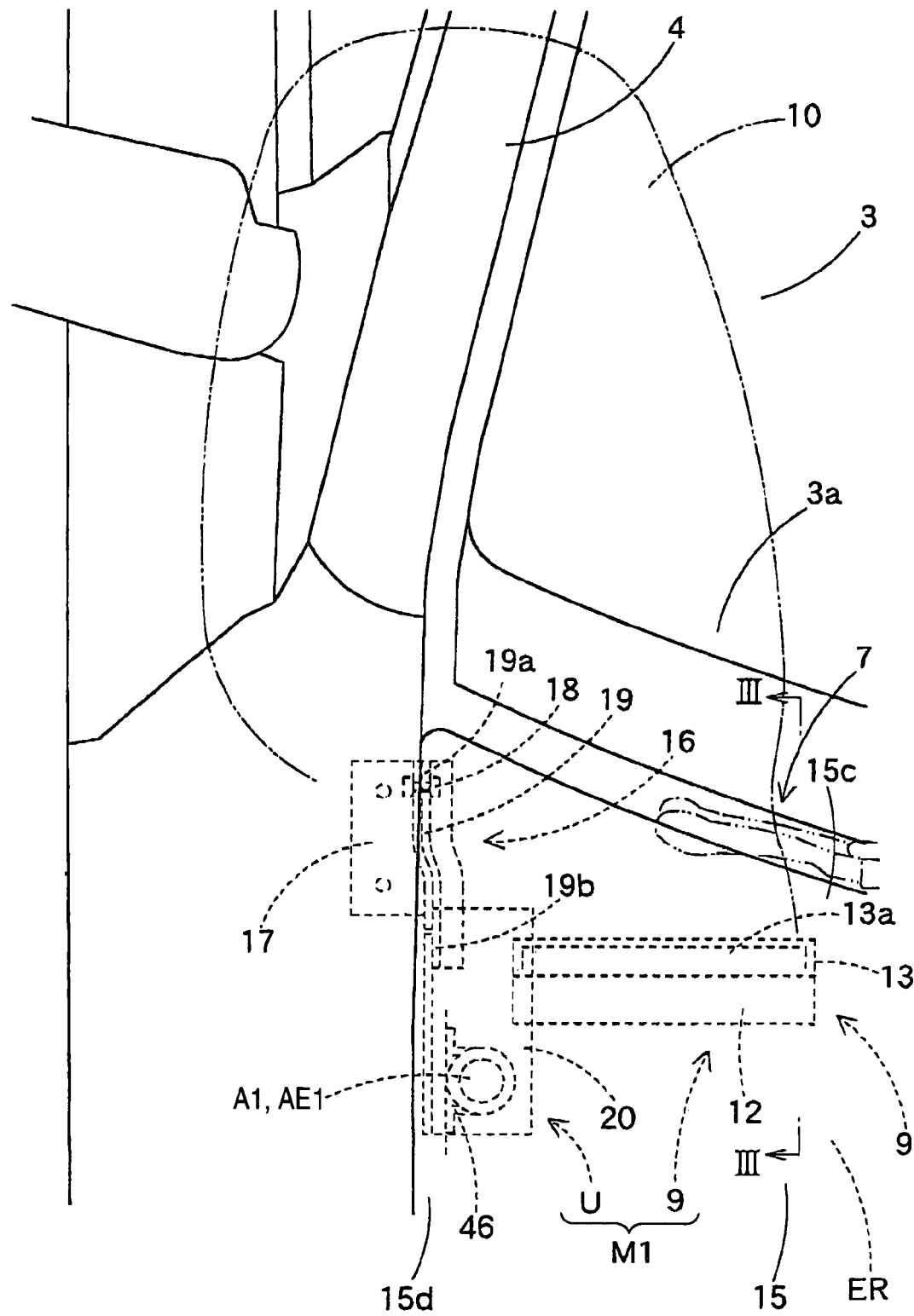
FIG. 2 is an enlarged partial plane view of a vehicle mounted with the walker protecting apparatus using the actuator of the first embodiment.
Figure 3:
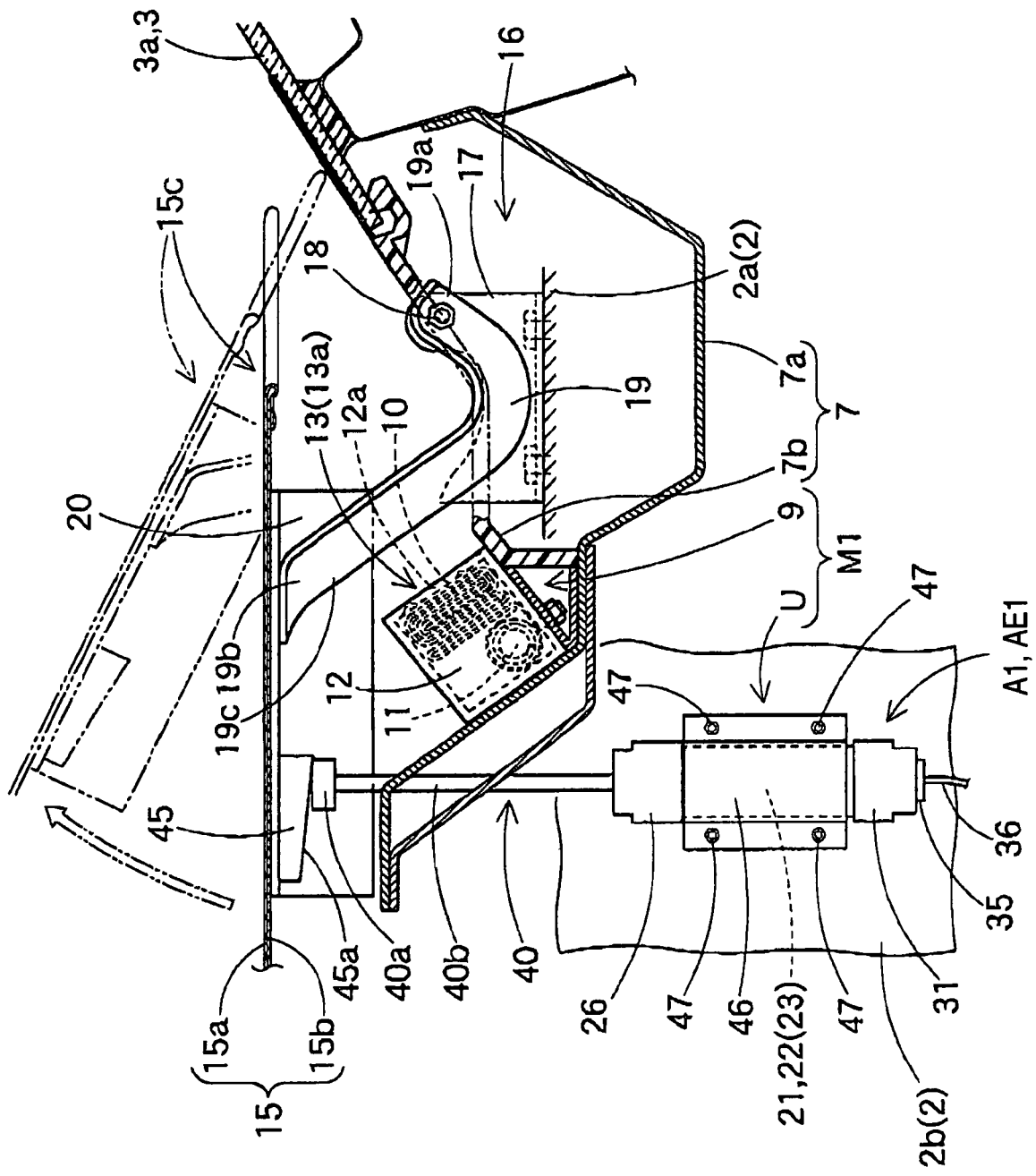
FIG. 3 is an outline vertical sectional view along a vehicle front and rear direction of the walker protecting apparatus of the first embodiment in correspondence with III-III portion of FIG. 2.

The hinge portions 16 are arranged at a left edge 15d and a right edge 15e on a side of the rear end 15c of the hood panel 15 (refer to FIG. 1), each of which is constituted by including a hinge base 17 fixed to an attaching flange 2a connected to a hood ridge reinforcement 2 on a side of the body 1, the attaching bracket 20 fixed to a side of the hood panel 15, and a hinge arm 19 connected to the hinge base 17 and an attaching bracket 20 (refer to FIG. 3). As shown by FIGS. 2, 3, each hinge arm 19 is constituted by a shape of bending an angle member made of a sheet metal substantially in a semicircular arc shape to project in a lower direction, a root portion end 19a on a side of the hinge base 17 is pivotably connected to the hinge base 17 by utilizing a support shaft 18, and a front end 19b is bonded to the attaching bracket 20 by utilizing welding or the like. The respective support shafts 18 are arranged by making axial directions thereof in line with the left and right direction of the vehicle V. Therefore, when the hood panel 15 is opened, as shown by bole lines to two-dotted chain lines of FIG. 3, a side of a front end 15f of the hood panel 15 (refer to FIG. 1) is moved up to be opened in front along with sides of the front ends 19b of the respective hinge arms 19 by constituting a center of rotation by the left and right support shafts 18.

Figure 4:
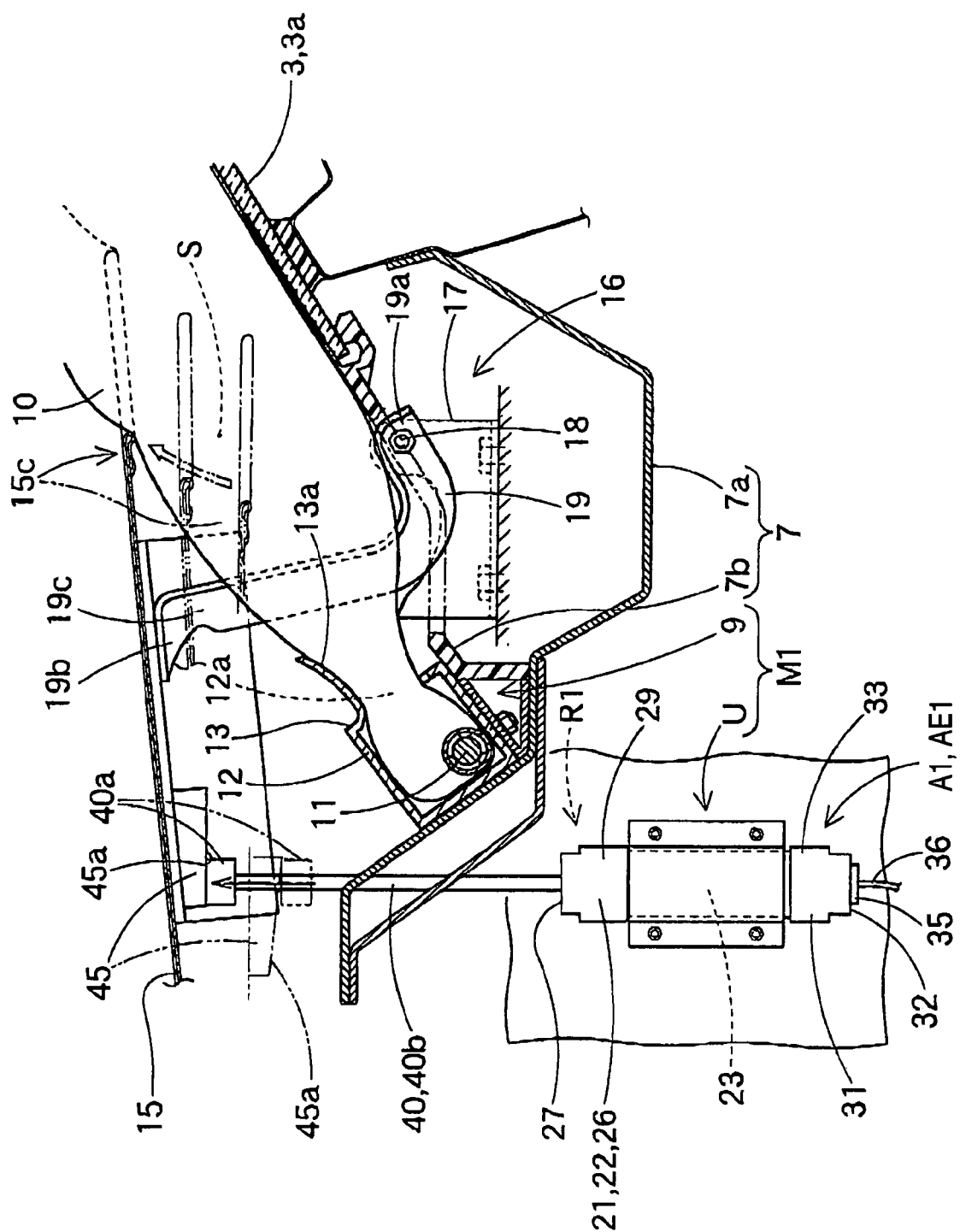
FIG. 4 is an outline vertical sectional view showing time of operating the walker protecting apparatus of the first embodiment.

Further, a vicinity of the front end 19b of the hinge arm 19 is constituted by a plastically deforming portion 19c plastically deformed when the rear end 15c of the food panel 15 is pressed up by a support rod 40 in operating the actuator A1 (refer to FIG. 4). Incidentally, when the rear end 15c of the hood panel 15 is moved up, a side of the front end 15f is not detached from a side of the body 1 by a latch mechanism arranged on a side of the front end 15f of the hood panel 15 opened and closed to be opened in front for locking a hood lock striker, not illustrated, arranged at the front end 15f normally used in being closed.

As shown by FIGS. 3, 4, the air bag apparatus 9 is constituted by including the air bag 10, the inflator 11 for supplying an expanding gas to the air bag 10, a case 12 containing the air bag 10 and the inflator 11, and an air bag cover 13 for covering the case 12 containing the air bag 10 and the inflator 11 to be able to open, and is mounted at a portion of the cowl 7 at a vicinity on lower sides of the left edge 15d or the right edges 15e of the rear end 15c of the hood panel 15. According to the air bag apparatus 9, when the rear end 15c of the hood panel 15 is moved up by operating the lifting apparatus U, the inflator 11 is operated to project the air bag 10 from the gap S between the rear end 15c and the cowl 7 and an expanding gas is supplied to the folded air bag 10. Further, the air bag 10 is developed to expand by pressing to open a door portion 13a of the air bag cover 13 covering an opening 12a on a side of a rear portion of the case 12, and covers sides of front faces of the left and right front pillars 4, 4 when the expanding gas is made to flow thereto (refer to FIG. 1).

Further, as shown by FIG. 3, the cowl 7 is constituted by including a cowl panel 7a having a high rigidity on a side of the body 1, a cowl louver 7b on an upper side of the cowl panel 7a. The cowl louver 7b is arranged such that a rear end side thereof is made to be continuous to a side of a lower portion 3a of a front windshield 3 and as shown by FIGS. 1, 2, the front pillars 4, 4 are arranged on left and right sides of the front windshield 3.

Figure 5:
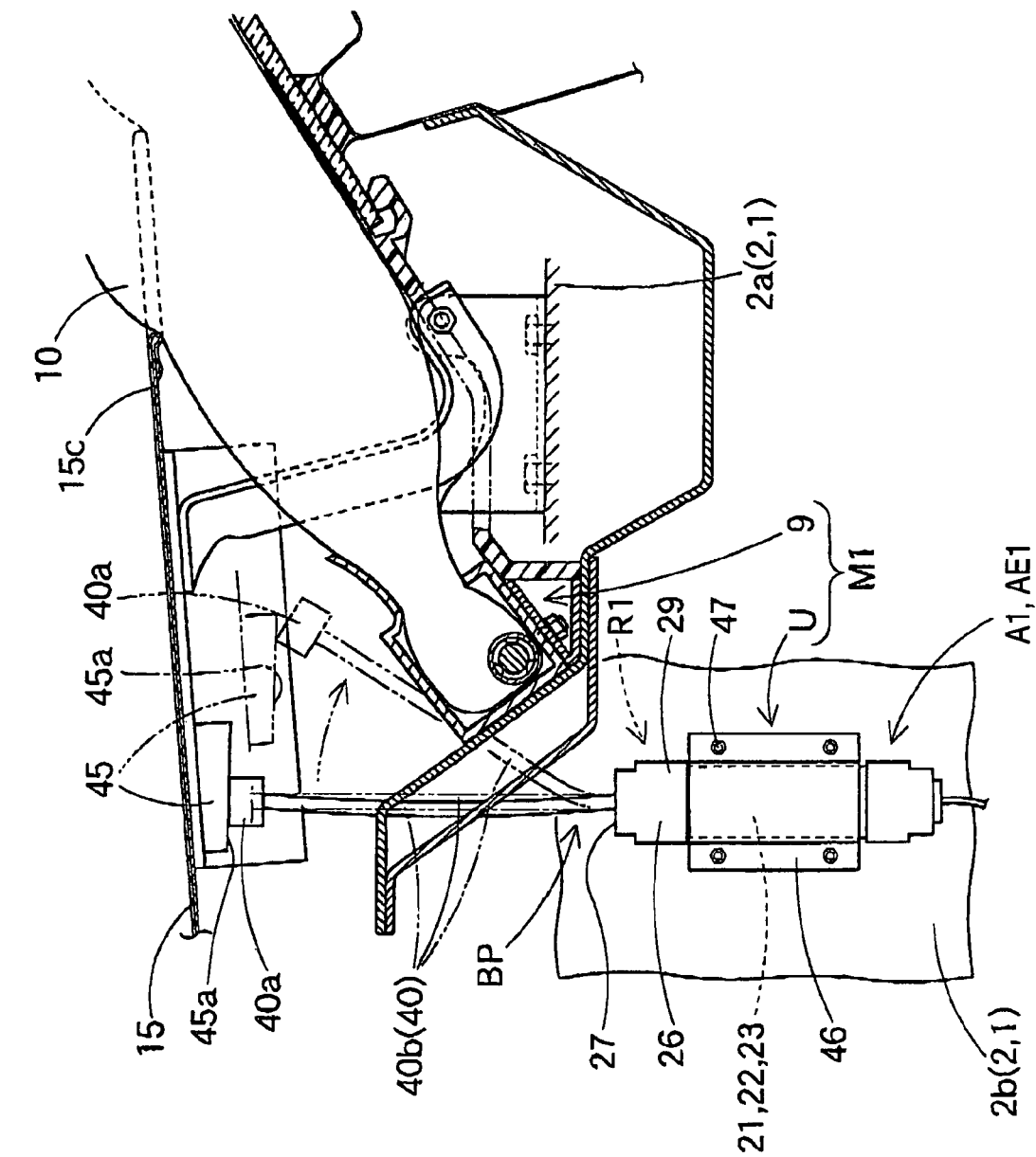
FIG. 5 is an outline view showing a state of plastically deforming a support rod of the actuator of the first embodiment.
Figure 6:
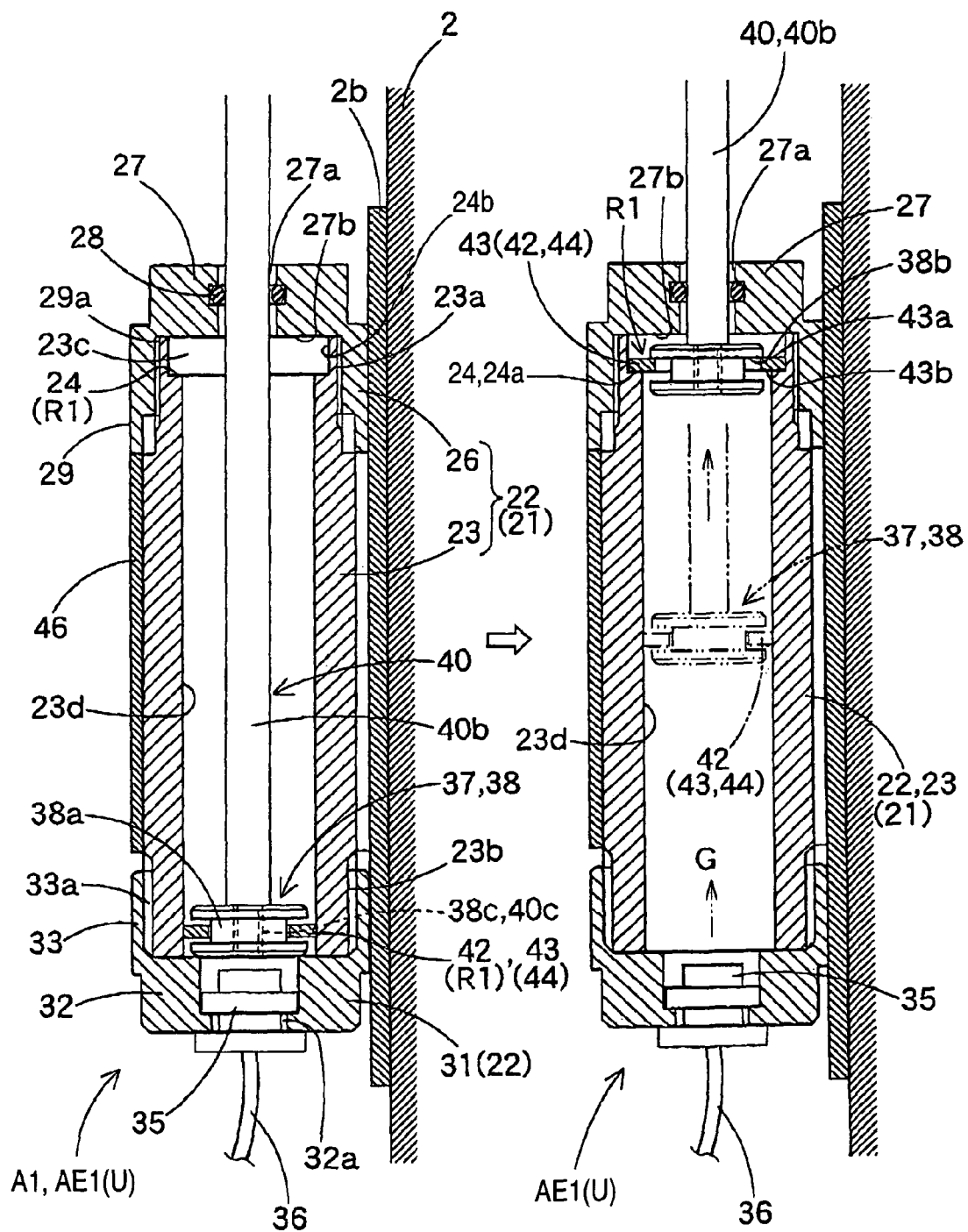
FIG. 6 is an outline vertical sectional view of the actuator of the first embodiment showing time of operating and time of finishing to operate.

As shown by FIGS. 3 through 5, the lifting apparatus U is constituted by including the actuator A1 and a receive seat 45 arranged on a side of the hood panel 15. As shown by FIG. 1, the actuators A1 are arranged on lower sides of the rear end 15c of the two left and right edges of the hood panel 15 in correspondence with two portions of the left and right hinge portions 16 of the hood panel 15 and respectively constituted by containing moving members 37 as pistons 38 in housings 21 as cylinders 22 in a circular cylinder shape as a piston cylinder type constituting a drive source by a gas G generated in operating the gas generators 35 as shown by FIG. 6. The receive seat 45 is attached to a portion of the attaching bracket 20 arranged at the lower face of the rear end 15c of the hood panel 15 and is constituted such that a lower face 45a thereof is made to be able to receive a head portion 45a at a front end of a support rod 40 moving up of the actuator A1.

As shown by FIGS. 3 through 5, the actuators A1 are arranged below the front end 15c of the two left and right edges of the hood panel 15 by being held by attaching brackets 46 of a section in a U-like shape attached to attaching flanges 2b connected to the hood ridge reinforcements 2 by bolts 47. Further, as shown by FIGS. 6, 7, each actuator A1 is constituted by including the cylinder 22 (housing 21), the piston 38 (moving member 37) slidably contained at inside of the cylinder 22, the support rod 40 connected to the piston 38, and a lock mechanism R1 for restricting a rearward movement (downward movement in the case of the first embodiment) of the support rod 40 moved forward (moved upward in the case of the first embodiment).

Figure 7:
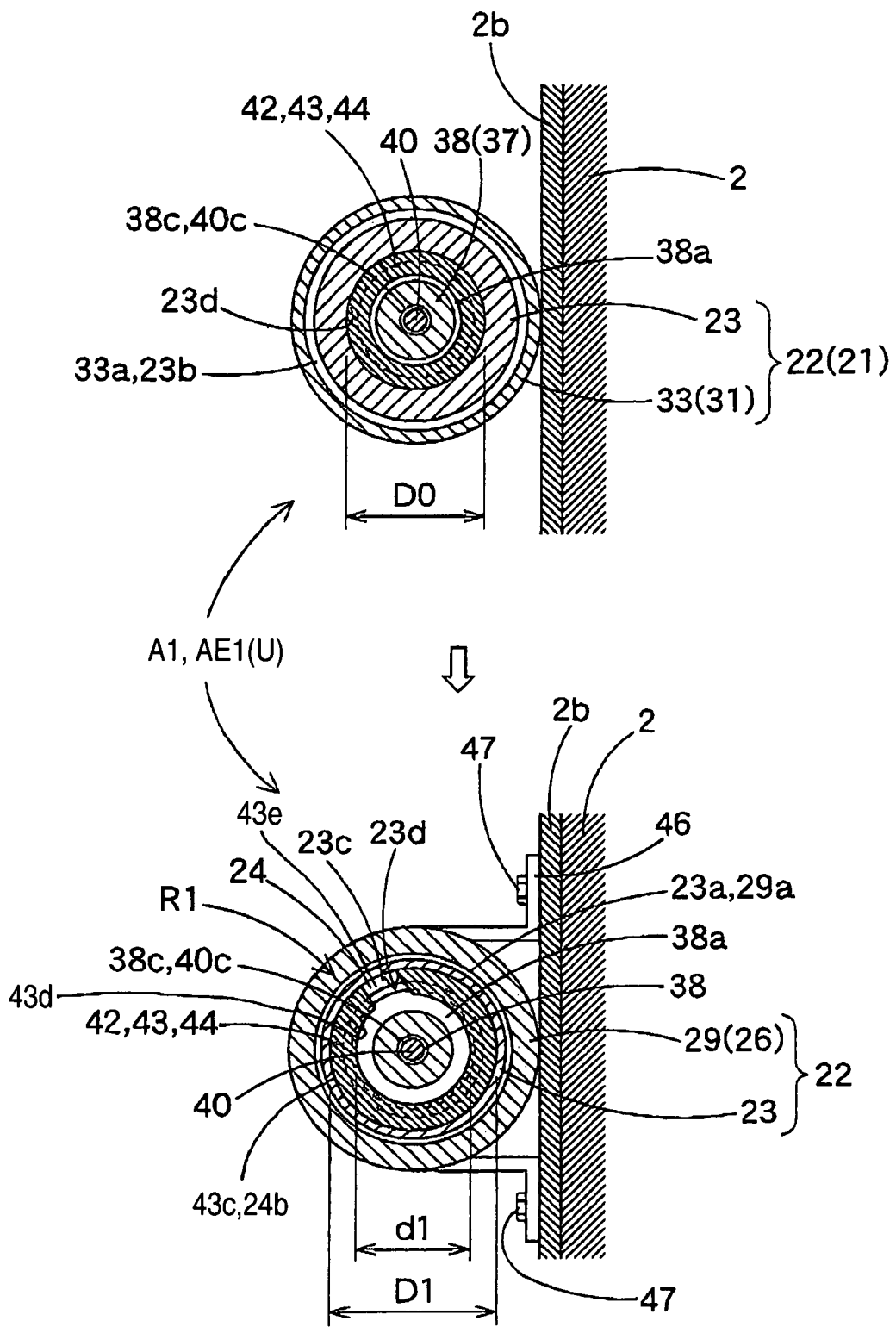
FIG. 7 is an outline sectional view of a portion of a diameter enlarging deformed portion of the actuator of the first embodiment, showing time of operating and time of finishing to operate.

As shown by FIGS. 6, 7, the cylinder 22 is constituted by including a main body 23 in a circular cylinder shape, and caps 26 and 31 respectively fixed to an upper end and a lower end of the main body 23. An inner peripheral face on an upper end side of the main body 23 is formed with a recess portion 23c over an entire periphery in a peripheral direction, and a side of an upper face (bottom face) of the recess portion 23c is made to constitute a locking stepped portion 24 for locking a diameter enlarging deformed portion 42 as a plane in a circular ring shape. The cap 26 on the upper end side of the main body 23 is constituted by including a front end wall portion 27 having a through hole 27a for inserting a shaft portion 40b of the support rod 40, and a peripheral wall portion 29 substantially in a circular cylinder shape extended from an outer peripheral edge of the front end wall portion 27 in a lower direction. The peripheral wall portion 29 includes a female screw 29a screwed to a male screw 23a provided at an outer periphery of an upper end of the main body 23 of the cylinder 22, and the cap 26 is attached to the main body 23 by screwing the female screw 29a of the male screw 23a in a state of inserting the shaft portion 40b of the support rod 40 to the through hole 27a. An inner peripheral face of the through hole 27a is is arranged with an O ring 28 brought into press contact with the shaft portion 40b. The cap 31 on the lower end side is constituted by including a root portion end wall portion 32 arranged to close the lower end of the main body 23 and a peripheral wall portion 33 substantially in a circular cylinder shape extended from an outer peripheral edge of the root portion end wall portion 32 in an upper direction. The root portion end wall portion 32 is attached with the gas generator 35 by utilizing a peripheral edge of a through hole 32a. The peripheral wall portion 33 includes a female screw 33a screwed to a male screw 23b provided at an outer periphery of a lower end of the main body 23 of the cylinder 22 and the cap 31 is attached to the main body 23 by screwing the female screw 33a to the male screw 23b in a state of attaching the gas generator 35 to the root portion end wall portion 32.

Further, describing in further details, the locking stepped portion 24 is constituted by including a bottom face 24a for restricting the rearward movement of the diameter enlarging deformed portion 42 by enlarging the diameter orthogonal from an inner peripheral face 23d of the main body 23, and an inner peripheral face 24b extended from an outer peripheral edge of the bottom face 24a along the front moving direction of the moving member 37.

As the gas generator 35, a micro gas generator is used, and a lower end face thereof is wired with a lead wire 36 for inputting an electric signal from a control circuit, not illustrated. The gas generator 35 generates a combustion gas by combusting a powder included therein when the electric signal from the control circuit, not illustrated, is inputted, and supplies the gas (combustion gas) G to a lower face side of the piston 38 at inside of the cylinder 22 as a working fluid.

The piston 30 is constituted by a shape of a circular disk and is formed with a recess groove 38a recessed over an entire periphery in a peripheral direction at an outer peripheral face of a middle portion in an up and down direction. Inside of the recess groove 38a is arranged with the diameter enlarging deformed portion 42 capable of enlarging a diameter more than an outer diameter dimension D0 of the piston 30 sliding on the inner peripheral face 23d from a lower end to the recess portion 23c of the main body 23 of the cylinder 22. Further, a center of the piston 38 is formed with a screw hole 38c penetrated in an up and down direction for attaching the support rod 40.

The diameter enlarging deformed portion 42 constitutes the lock mechanism R1 for restricting the rearward movement (according to the embodiment, downward movement) of the support rod 40 moved forward (according to the embodiment, moved upward) along with the locking stepped portion 24 of the cylinder 22 and in the case of the actuator A1 (AE1) of the first embodiment, the diameter enlarging deformed portion 42 is constituted by a ring-like elastic member 43 constituted by a C ring (snap ring) made of spring steel as a type of enlarging the diameter by elastic deformation (notation of the type is designated by AE, a first embodiment of the type is designated by AE1, a second embodiment and thereafter are designated by AE2, AE3, . . . as follows).

The ring-like elastic member 43 is contained in the recess groove 38a and is elastically deformed from a diameter contracting state to a diameter enlarging state of riding over the recess groove 38a of the piston 38 and the locking stepped portion 24 of the cylinder 22 when arranged to the locking stepped portion 24 after moving the piston 38 upward to restrict the downward movement of the piston 38. Particularly in the case of the first embodiment, the outer diameter dimension D0 of the piston 38 per se is constituted such that the ring-like elastic member 43 is slidably brought into press contact with the inner peripheral face 23d of the cylinder 22 in a state of being contained to the recess groove 38a to serve also as a piston ring 44 for sealing a side of the gas generator 35. Further, the ring-like elastic member 43 comprising the C ring is deformed from a diameter contracting state to a diameter enlarging state, that is, to constitute an outer diameter dimension D1 and an inner diameter dimension dl riding over the recess groove 38a of the piston 38 and the locking stepped portion 24 of the cylinder 22 from the outer diameter dimension D0 in the diameter contracting state when arranged to the locking stepped portion 24 after moving upward the piston 38 to be locked by the locking stepped portion 24.

Further, in the case of the first embodiment, when the diameter of the ring-like elastic member 43 is enlarged to the outer diameter dimension D1 to be locked by the locking stepped portion 24, an outer peripheral face 43c of the ring-like elastic member 43 is brought into contact with an inner peripheral face 24b of the locking stepped portion 24, and an inner peripheral face 43d of the ring-like elastic member 43 is arranged at inside of the recess groove 38a.

The support rod 40 is constituted by including the head portion 40a in a shape of a circular pillar of pressing up the rear end 15c of the hood panel 15 by being brought into contact with the receive seat 45 provided at the attaching bracket 20 of the rear end 15c of the hood panel 15 in moving upward at the upper end of the shaft portion 40b and including the male screw portion 45c of being screwed to the screw hole 38c of the piston 38 at the lower end of the shaft portion 45b. The support rod 40 comprises a plastically deformable metal material of steel or the like and is integrated to the piston 38 to be able to be interchanged by being fastened to and detached from the screw hole 38c.

According to the walker protecting apparatus M1 of the first embodiment, when the operating circuit, not illustrated, detects or predicts the collision of the vehicle V with the walker by the signal from the sensor 6, the gas generator 35 of the actuator A1 of each lifting apparatus U is operated and the inflator 11 of the air bag apparatus 9 is operated.

Further, when the gas generator 35 of the actuator A1 is operated, as shown by FIGS. 3, 4 and FIGS. 6A, 6B, the generated gas G presses up the piston 38 at inside of the main body 23 of the cylinder 22, brings the head portion 40a of the upper end of the support rod 40 into contact with the receive seat 45, moves up the rear end 15c of the hood panel 15, and forms the gap S between the hood panel 15 and the cowl 7 on the side of the rear end 15c. Further, when the inflator 11 of the air bag apparatus 9 is operated, as shown by two-dotted chain lines of FIGS. 1, 2 and FIG. 4, the air bag 10 which is folded to be contained is projected from the case 12 by pressing to open the door portion 13a of the air bag cover 13 by making the gas from the inflator 11 flow and is expanded to project to the upper side of the front windshield 3 by way of the gap S. The air bag 10 that has been finished to be expanded covers the front side of the front pillar 4.

Further, according to the actuator A1 (AE1) of the first embodiment, when the gas G is generated from the gas generator 35 in being operated, the gas G is filled at inside of the cylinder 22, the piston 38 contained at inside of the cylinder 22 is moved upward along with the support rod 40 and is brought into contact with the lower face 27b of the front end wall portion 27 to restrict the upward movement. Further, when arranged to the locking stepped portion 24 after the upward movement of the piston 38, the ring-like elastic member 43 constituting the diameter enlarging deformed portion 42 is elastically deformed by the elastic force of the diameter enlarging deformed portion 42 per se from the diameter contracting state to the diameter enlarging state to bring the outer peripheral face 43c into contact with the inner peripheral face 24b of the locking stepped portion to be locked by the locking stepped portion 24. That is, as shown by FIG. 6B, even when the support rod 40 is going to be moved downward, the ring-like elastic member 43 brings the lower face 43b into contact with the bottom face 24b of the locking stepped portion 24 and brings an upper face 43a thereof into contact with a lower face 38b of the recess groove of the piston 38 and the downward movement of the support rod 40 is restricted.

Further, when the hood panel 15 constituting the receiving member receives a walker as a protection object, the hood panel 15 is plastically deformed, absorbs a kinetic energy of the walker, and can receive the walker by alleviating an impact, further, as shown by FIG. 5, the shaft portion 40b of the support rod 40 is pertinently plastically deformed to bend at a portion of a fold-to-bend point BP to absorb the kinetic energy of the walker and the hood panel 15 can receive the walker by further alleviating the impact.

Figure 8:
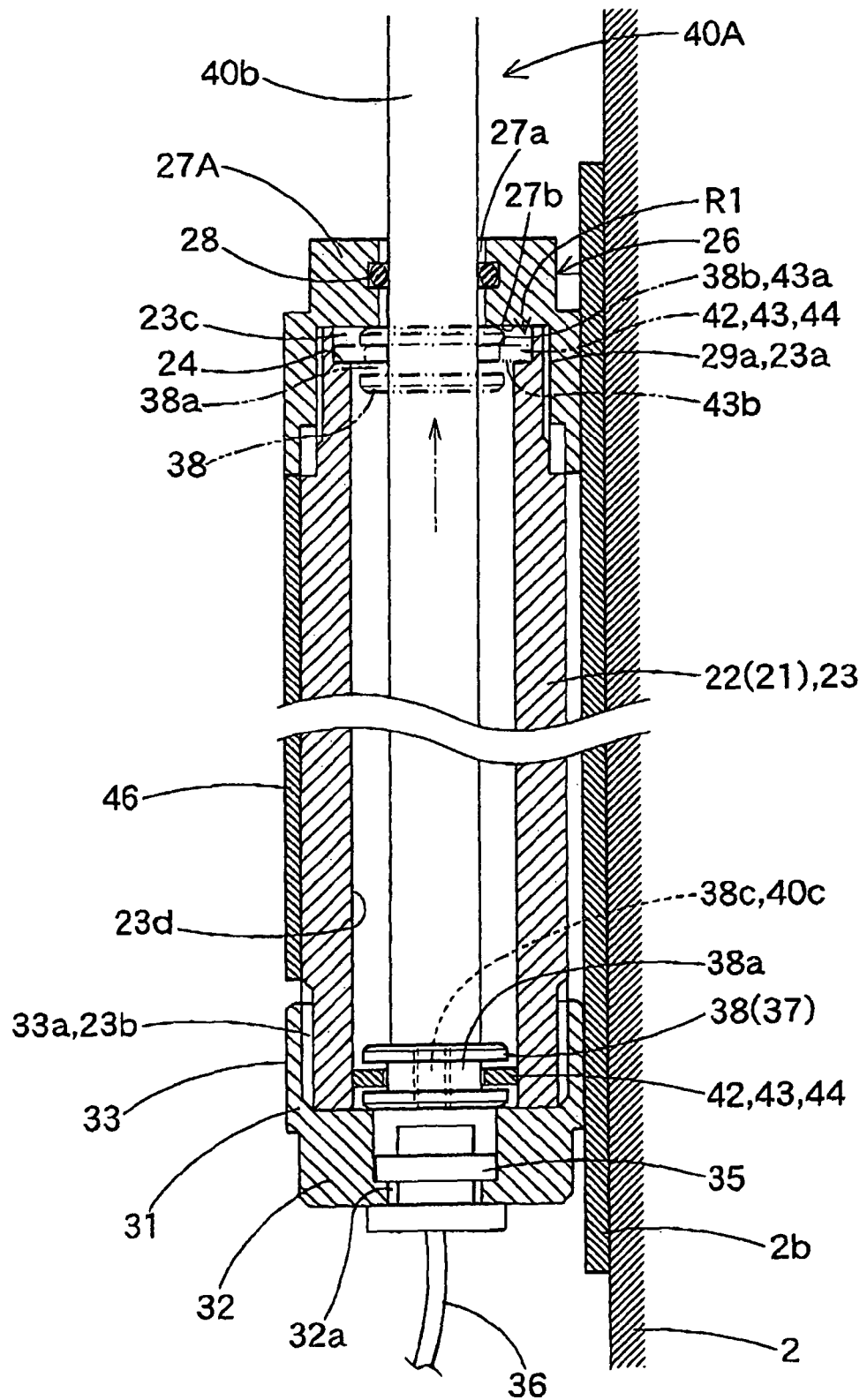
FIG. 8 is an outline vertical sectional view showing a state of interchanging the support rod of the actuator of the first embodiment.

Naturally, when an amount of absorbing the kinetic energy of the walker by plastically deforming the support rod 40 is increased, as shown by FIG. 8, the support rod 40 may be changed to a support rod 40A having a high bending rigidity by making a shaft portion 40b bold. In changing the support rod, when the male screw portion 40c of the support rod 40A is formed in correspondence with the screw hole 38c of the piston 38, the support rod 40 can easily be interchanged by the support rod 40A.

Further, according to the actuator A1 of the first embodiment, even when the outer diameter dimension of the support rod 40, 40A is changed to adjust the rigidity, although it is necessary to adjust an inner diameter dimension of the inserting hole 27a of the support rod 40A of the front wall portion 27a on the side of the cylinder 22 (housing 21), constitutions of the diameter enlarging deformed portion 42 on the side of the piston 38 (moving member 37) and the locking stepped portion 24 on the side of the cylinder 22 for locking the diameter enlarging deformed portion 42 can commonly be used without being changed to be able to easily deal therewith.

Therefore, according to the actuator A1 of the first embodiment, even when the lock mechanism R1 capable of preventing the downward movement (rearward movement) after operating the support rod 40 is provided, the rigidity of the support rod 40 of supporting the hood panel 15 as the receiving member can easily be adjusted.

Further, when the amount of absorbing the kinetic energy of the walker by plastically deforming the support rod 40 is changed, a total of the support rod 40 or the material of the shaft portion 40b may be changed.

Further, even in a case in which a stroke of moving the support rod 40A is increased for making a height of the rear end 15c of the lifting hood panel 15 high and the bending rigidities of the support rods 40, 40A are adjusted to be equivalent to each other when plastically deformed to bend at the portion of the fold-to-bend point BP, as shown by FIG. 8, the case is made to be dealt with by making the shaft portion 40b bold. Further, in the case of dealing therewith in this way, in comparison with a case of using the support rod 40, although an outer diameter dimension of the support rod 40A and an inner diameter dimension of the inserting hole 27a of the support rod 40A at the front end wall portion 27a are increased, and also length dimensions of the shaft portion 40b of the support rod 40A and the main body 23 of the cylinder 22 are prolonged, the piston 38 and the diameter enlarging deformed portion 42 used for the support rod 40 can commonly be used, the shape of the inner periphery of the main body 23 of the cylinder 22 and the structure of the locking stepped portion 24 can be formed by the same specification, and therefore, the case can easily be dealt with. Further, naturally, even when the support rod 40 or 40A is formed by a forged product or the like integral with the piston 38, further, outer diameter dimensions of the support rods 40 and 40A differ from each other, the diameter enlarging deformed portion 42 can commonly be used therebetween, the inner peripheral shape of the main body 23 of the cylinder 22 and the structure of the locking stepped portion 24 can be formed by the same specification, and therefore, the case can easily be dealt with.

Further, according to the actuator A1 (AE1) of the first embodiment, there can be constructed a simple and convenient constitution in which the locking member of the lock mechanism is not provided on the side of the cylinder 22 of enlarging the outer diameter dimension of the cylinder 22 (housing 21) but the side of the cylinder 22 is only formed with the locking stepped portion 24 by simply providing the recess portion 23c of enlarging the diameter locally at a vicinity of an end portion on a side of the front end wall portion 27 of the inner peripheral face, and a large-sized formation of the cylinder 22 can be avoided. Further, although at inside of the cylinder 22, the diameter enlarging deformed portion 42 is provided locally at the portion of the piston 38 (moving member 37), the diameter enlarging deformed portion 42 is deformed to enlarge the diameter is to be able to be locked by the locking stepped portion 24 by elastically deforming the diameter enlarging deformed portion 42 per se and a number of parts constituting the diameter enlarging deformed portion 42 provided on the side of the piston 38 can be made to be as small as possible.

Further, according to the first embodiment, the diameter enlarging deformed portion 42 is constituted by the ring-like elastic member 43 constituting the C ring, and is configured to be slidably brought into press contact with the inner peripheral face 23d of the cylinder 22 in a state of being contained to the recess groove 38a, and is constituted as the piston ring 44 for sealing a side of the gas generator 35 at the piston 38, it is not necessary to provide the piston ring for promoting a sliding function or a seal function separately on the side of the piston 38 and the number of parts of the piston 38 can be reduced.

Figure 9:
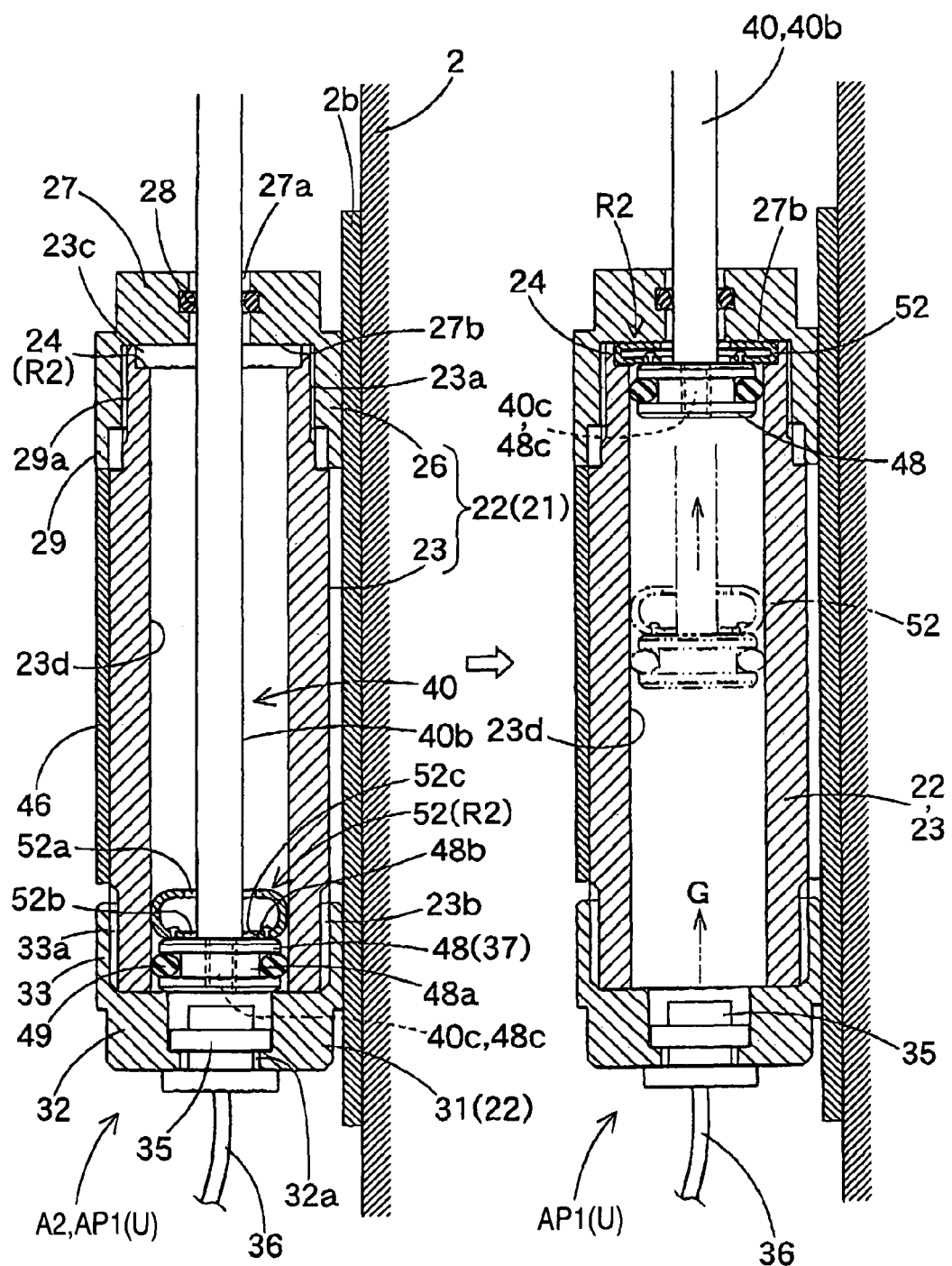
FIG. 9 is an outline vertical sectional view of an actuator of a second embodiment, showing time of operating and time of finishing to operate.
Figure 10:
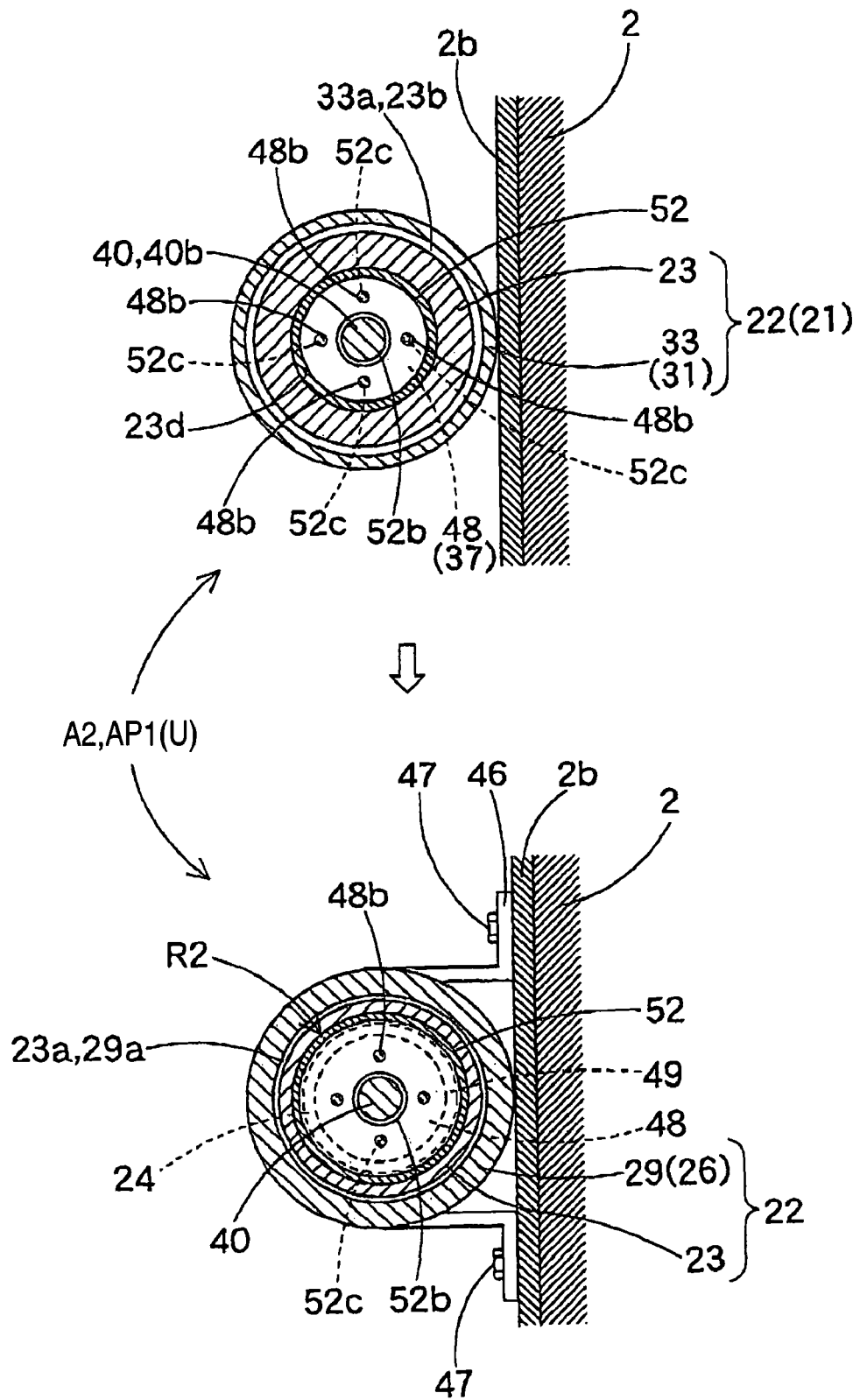
FIG. 10 is an outline cross-sectional view of a portion of a diameter enlarging deformed portion of the actuator of the second embodiment, showing time of operating and time of finishing to operate.

Further, although according to the actuator A1 (AE1) of the first embodiment, the diameter enlarging deformed portion 42 for enlarging the diameter by being elastically deformed is used, as in an actuator A2 (AP1) of a second embodiment shown in FIGS. 9, 10, there may be constructed a constitution in which a diameter enlarging deformed portion 52 is plastically deformed from a diameter contracting state to a diameter enlarging state by being brought into contact with the front end wall portion 27 when the diameter enlarging deformed portion 52 is arranged to the locking stepped portion 24 after the forward movement (after upward movement in the illustrated example) of the piston 48 (moving member 37) (a notation of the type is designated by AP, and embodiments of the type are successively designated by AP1, AP2 . . . ).

The actuator A2 (AP1) of the second embodiment is used for the lifting apparatus U for moving up the rear end of the hood panel in being operated similar to the actuator A1 (AE1) of the first embodiment, and is constituted by including the cylinder 22 (housing 21), a piston 48 (moving member 37) slidably contained at inside of the cylinder 22, the support rod connected to the piston 48, and a lock mechanism R2 of restricting the rearward movement (downward movement also in the case of the second embodiment) of the support rod 40 moved forward (moved upward also in the case of the second embodiment). Further, according to the second embodiment, only the piston 48 and the diameter enlarging deformed portion 52 constituting the lock mechanism R2 differ from those of the actuator A1 (AE1) of the first embodiment, otherwise, the cylinder 22, the gas generator 35 and the support rod 40 are substantially similar to those of the actuator A1 (AE1) of the first embodiment and portions or members similar to those of the first embodiment are attached with notations the same as those of the first embodiment and an explanation thereof will be omitted.

The piston 48 is constituted by a shape of a circular disk and formed with a recess groove 48*a* for fitting a piston ring 49 slidably brought into press contact with the inner peripheral face 23*d* of the cylinder 22 over an entire periphery in a peripheral direction at an outer peripheral face of a middle portion in an up and down direction. On an upper face side of the piston 48, a plurality (4 pieces according to the embodiment) of attaching pieces 48*b* for attaching a diameter enlarging deformed portion 52 are projected to an upper side. The attaching pieces 48*b* are fitted to attaching holes 52*c* of the diameter enlarging deformed portion 52 and attached to the piston 48 such that the diameter enlarging deformed portion 52 is not detached therefrom. A screw hole 48*c* penetrated in an up and down direction for attaching the support rod 40 is formed at a center of the piston 48.

The diameter enlarging deformed portion 52 constitutes the lock mechanism R2 of restricting the rearward movement (downward movement according to the embodiment) of the support rod 40 moved forward (moved upward according to the embodiment) along with the locking stepped portion 24 of the cylinder 22, in the case of the second embodiment, it is provided to be brought into contact with the lower face 27*b* of the front end wall portion 27 of the cylinder 22 in moving up the piston 48 by being constituted substantially by a shape of an ellipsoid including inserting holes 52*a*, 52*b*, plastically deformed substantially in a shape of a circular disk and formed by a metal material of aluminum or the like a diameter of which is enlarged to be fitted to the locking stepped portion 24. The diameter enlarging deformed portion 52 includes the inserting holes 52*a*, 52*b* is formed with an attaching hole 52*c* fitted to the respective attaching pieces 48*b* of the piston 42 for penetrating the support rod 40 and a peripheral edge of the inserting hole 52*b* for attaching the diameter enlarging deformed portion 52 to the piston 48.

According to the actuator A2 (AP1) of the second embodiment, in being operated, the piston 48 is moved up by the gas G generated from the gas generator 35, the diameter enlarging deformed portion 52 is plastically deformed by being brought into contact with the lower face 27*b* of the front end wall portion 27 of the cylinder 22 and the diameter is enlarged to be fitted to the locking stepped portion 24. Further, the diameter enlarging deformed portion 52 the diameter of which is enlarged by being plastically deformed invades the locking stepped portion 24 to be stationary to be locked by the locking stepped portion 24, and therefore, even when the support rod 40 is going to be moved downward, the downward movement can be restricted.

Figure 11:
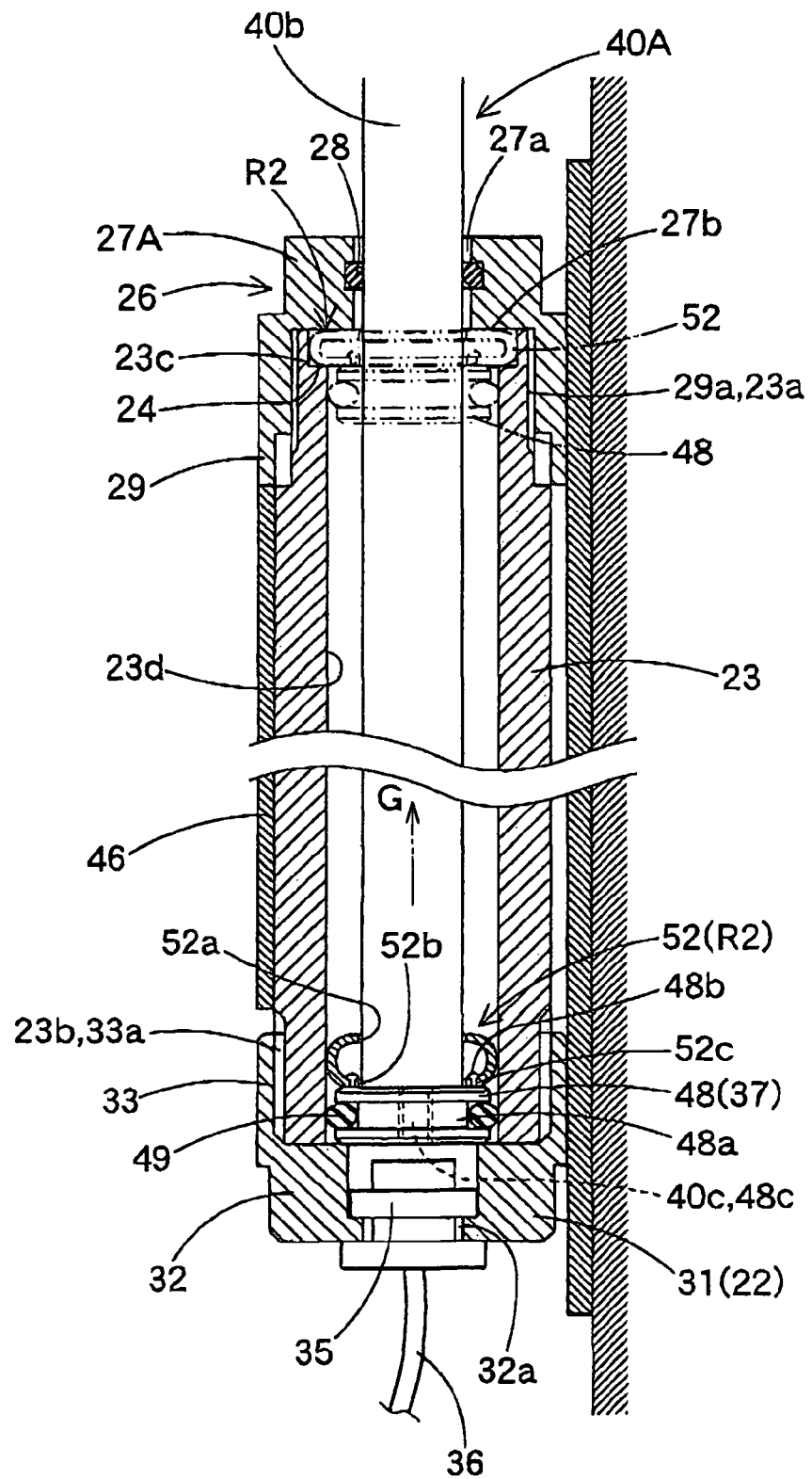
FIG. 11 is an outline vertical sectional view showing a state of interchanging a support rod of the actuator of the second embodiment.

Further, also according to the second embodiment, when an amount of absorbing the kinetic energy of the walker by plastically deforming the support rod 40 is changed, by utilizing the screw hole 48*c*, the support rod 40 may be interchanged by the support rod 40A (refer to FIG. 11) the outer diameter dimension of the shaft portion 40*b* of which is adjusted. Further, also in the second embodiment, even when outer diameter dimensions of the support rods 40 and 40A are changed to change the rigidity, although it is necessary to adjust the inner diameter dimension of the inserting hole 27*a* of the support rod 40A of the front end wall portion 27A on the side of the cylinder 22 (refer to FIG. 11), the constitution of the diameter enlarging deformed portion 52 on the side of the piston 48 (moving member 37) and the locking stepped portion 24 on the side of the cylinder 22 for locking the diameter enlarging deformed portion 52 can commonly be used without being changed to be easily able to deal therewith.

Further, also according to the actuator A2 (AP1) of the second embodiment, there may be constructed a simple and convenient constitution in which the locking member of the lock mechanism is not provided on the side of the cylinder 22 of enlarging the outer diameter dimension of the cylinder 22 but only the locking stepped portion 24 is formed by providing the recess portion 23*c* of simply enlarging the diameter locally at a vicinity of an end portion on the side of the front end wall portion 27 of the inner peripheral face on the side of the cylinder 22, the large-sized formation of the cylinder 22 can be avoided. Further, although inside of the cylinder 22 is provided with the diameter enlarging deformed portion 52 locally at the portion of the piston 48, the diameter enlarging deformed portion 52 is deformed to enlarge the diameter to be able to be locked by the locking stepped portion 24 by being plastically deformed and a number of parts constituting the diameter enlarging deformed portion 52 provided on the side of the piston 48 can be made to be as small as possible, and even in the actuator A2 (AP1) of the second embodiment, operation and effect similar to those of the first embodiment can be achieved.

Figure 12:
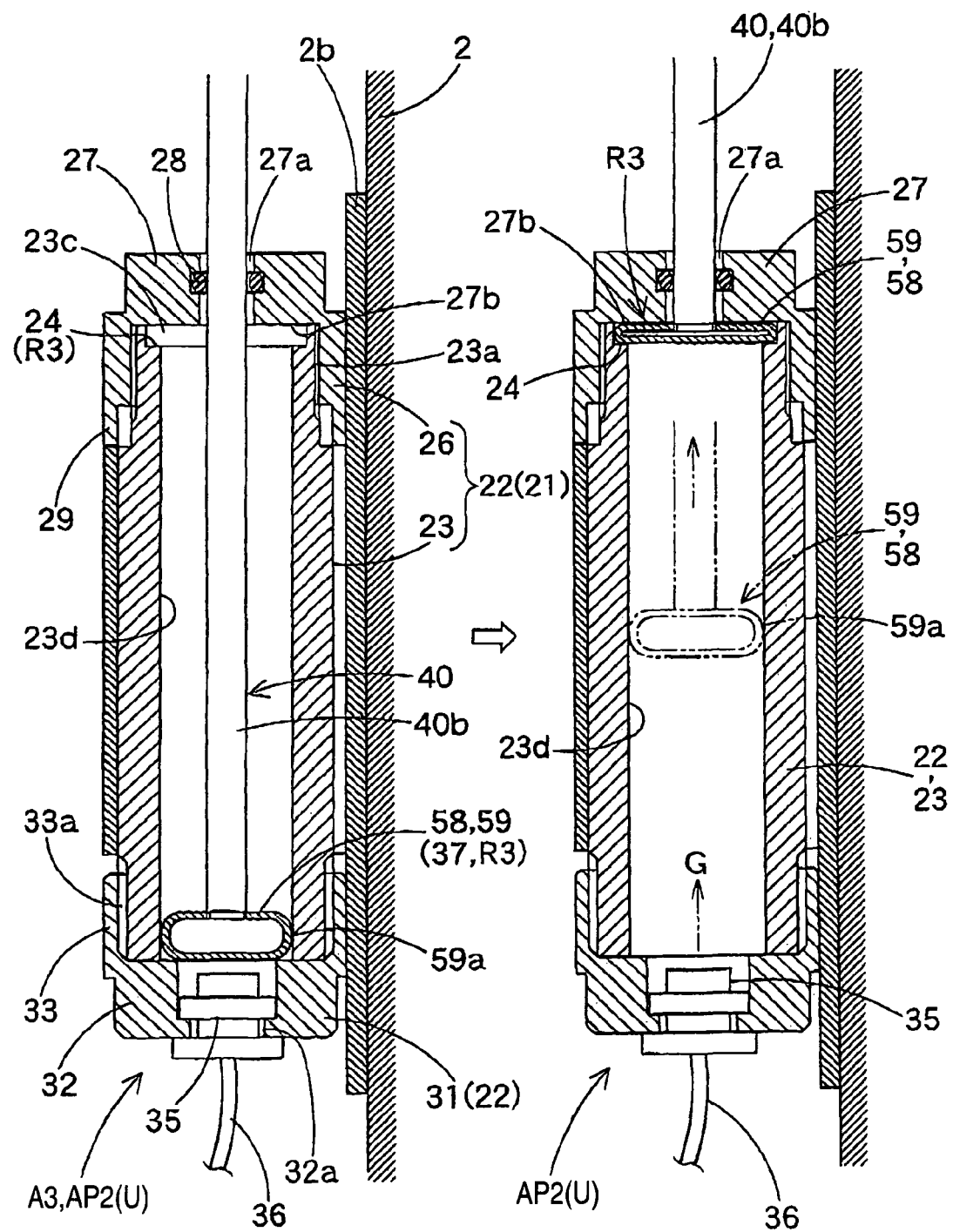
FIG. 12 is an outline vertical sectional view of an actuator of a third embodiment and showing time of operating and time of finishing to operate.
Figure 13:
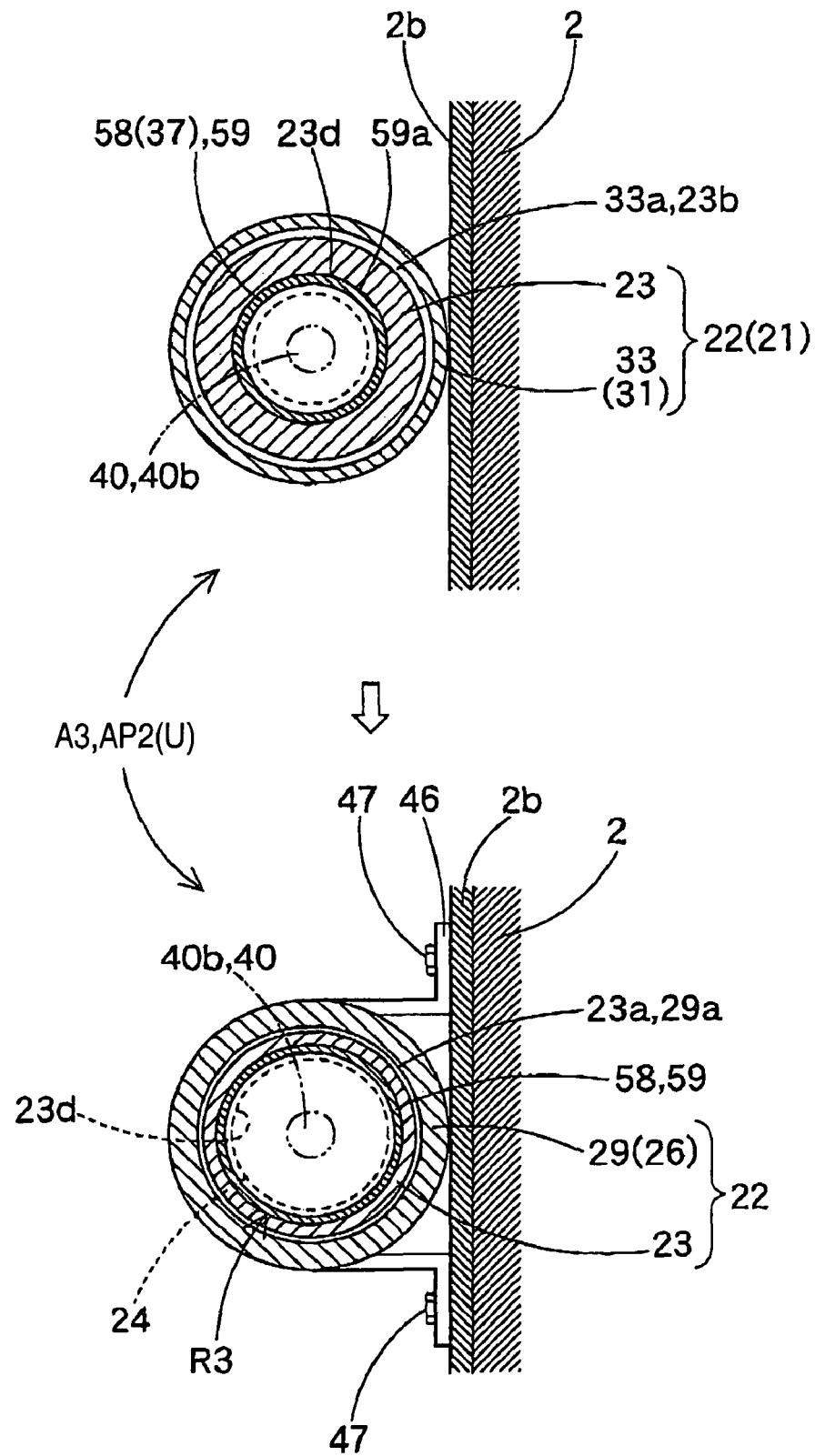
FIG. 13 is an outline cross-sectional view of a portion of a diameter enlarging deformed portion of the actuator of the third embodiment, showing time before being operated and time of finishing to operate.

Further, as the diameter enlarging deformed portion for being deformed plastically, as in an actuator A3 (AP2) of a third embodiment shown in FIGS. 12, 13, a piston 28 (moving member 37) per se may be constituted from a diameter enlarging deformed portion 59 substantially in shape of an ellipsoid. The diameter enlarging deformed portion 59 is moved by sliding on the inner peripheral face 23*d* of the cylinder 22 (housing 21) when the gas 28 is generated from the gas generator 35, further, formed by a metal material of aluminum or the like a diameter of which is enlarged to be fitted to the locking stepped portion 24 by being plastically deformed substantially in a shape of a circular disk by being brought into contact with the lower face 27*b* of the front end wall portion 27 of the cylinder 22. The support rod 40 is attached to an upper face side of the diameter enlarging deformed portion 59 by utilizing welding or adhering, or, a screw structure of the screw hole 38*c* and the male screw portion 40*c* of the first embodiment, fastening by a bolt and a nut, fastening by a rivet or the like.

Also according to the embodiment, only the diameter enlarging deformed portion 59 constituting a lock mechanism R3 which is used also as the piston 58 differs from that of the actuator A1 (AE1), A2 (AP1) of the first and the second embodiment, otherwise, the cylinder 22, the gas generator 35, the support rod 40 are substantially similar to those of the actuator A1 (AE2) of the first embodiment, and portions and members similar to those of the first embodiment are attached with notations the same as those of the first and the second embodiments and an explanation thereof will be omitted.

Further, also in the third embodiment, in being operated, by the gas G generated from the gas generator 35, the diameter enlarging deformed portion 59 used also as the piston 58 is plastically deformed by being brought into contact with the lower face 27*b* of the front end wall portion 27 of the cylinder 22 and enlarged in the diameter to be fitted to the locking stepped portion 24. Further, the diameter enlarging deformed portion 59 enlarging the diameter by being deformed plastically invades the locking stepped portion 24 to be locked by the locking stepped portion 24, and therefore, even when the support rod 40 is going to be moved downward, the downward movement can be restricted.

Figure 14:
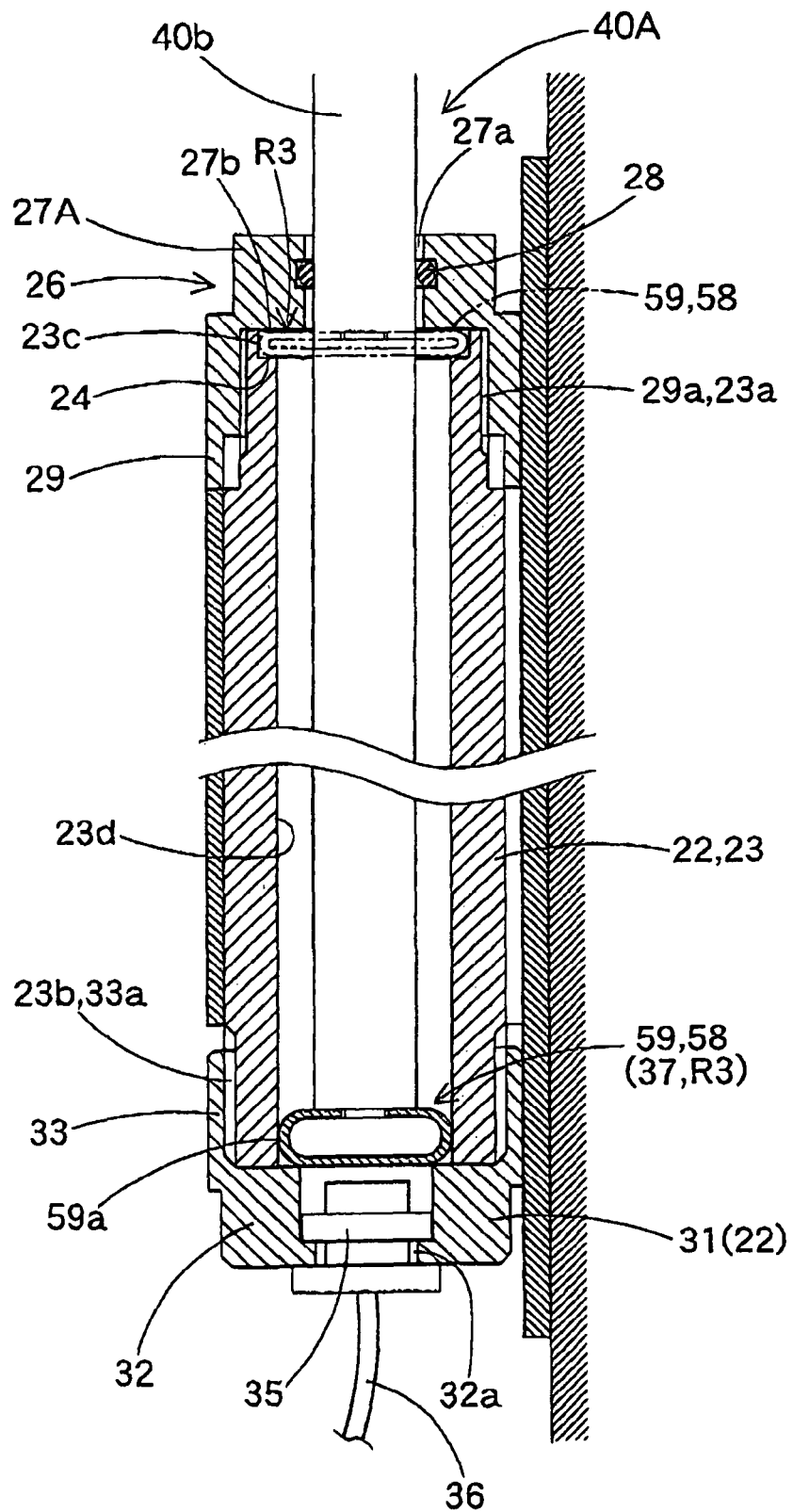
FIG. 14 is an outline vertical sectional view showing a state of interchanging a support rod of the actuator of the third embodiment.

Further, also according to the third embodiment, when the amount of absorbing the kinetic energy of the walker by plastically deforming the support rod 40 is changed, the support rod 40 may be interchanged by the support rod 40A (refer to FIG. 14) adjusting the outer diameter dimension of the shaft portion 40b. Further, also in the third embodiment, even when the outer diameter dimension of the support rod 40 or 40A is changed to change the rigidity, although it is necessary to adjust the inner diameter dimension of the inserting hole 27a of the support rod 40A at the front end wall portion 27A on the side of the cylinder 22 (refer to FIG. 11), the constitutions of the diameter enlarging deformed portion 59 on the side of the piston 58 and the locking stepped portion 24 on the side of the cylinder 22 for locking the diameter enlarging deformed portion 59 can commonly be used without being changed and can easily be dealt therewith.

Further, although according to the actuator A3 (AP2) of the third embodiment, there can be constructed a simple and convenient constitution in which the locking member of the lock mechanism is not provided on the side of the cylinder 22 of enlarging the outer diameter dimension of the cylinder 22 but the side of the cylinder 22 is only formed with the locking stepped portion 24 by providing the recess portion 23c of simply enlarging the diameter locally at the vicinity of the end portion on the side of the front end wall portion 27 at the inner peripheral face, and large-sized formation of the cylinder 22 can be avoided. Further, although inside of the cylinder 22 is provided with the diameter enlarging deformed portion 59 used also as the piston 58, the diameter enlarging deformed portion 59 is deformed to enlarge the diameter to be able to be locked by the locking stepped portion 24 by being deformed plastically, a number of parts constituting the diameter enlarging deformed portion 59 used also as the piston 58 can be made to be as small as possible to be one part, and even in the actuator A3 (AP2) of the third embodiment, operation and effect similar to those of the first and the second embodiments can be achieved.

Further, according to the third embodiment, the piston 58 per se is constituted as the diameter enlarging deformed portion 59, and when substantially a total periphery in the peripheral direction of at least a portion 59a of the outer peripheral face is made to be slidable on the inner peripheral face 23d of the cylinder 22, the piston 58 can be constituted without separately providing a piston ring.

Figure 15:
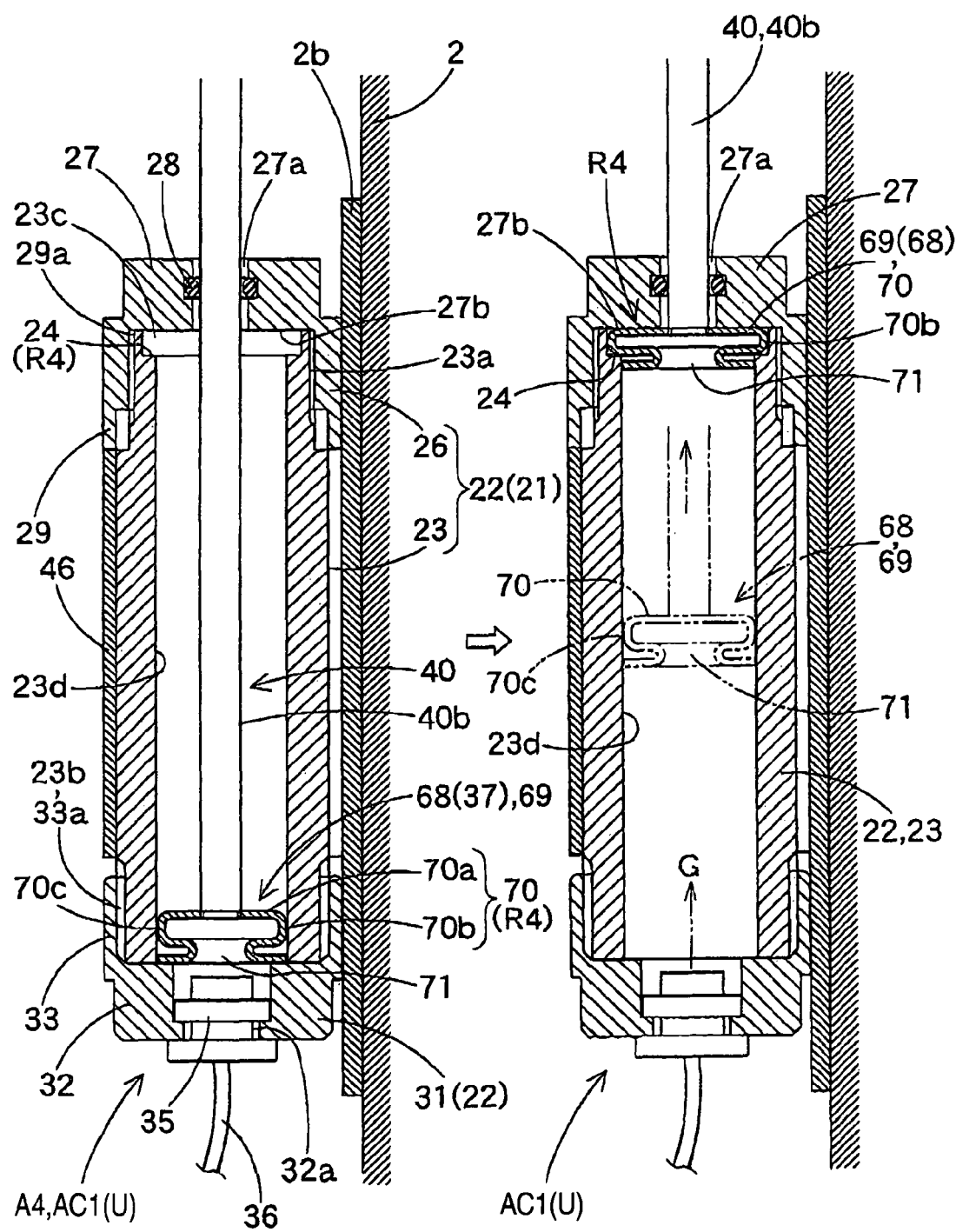
FIG. 15 is an outline vertical sectional view of an actuator of a fourth embodiment, showing time of operating and time of finishing to operate.
Figure 16:
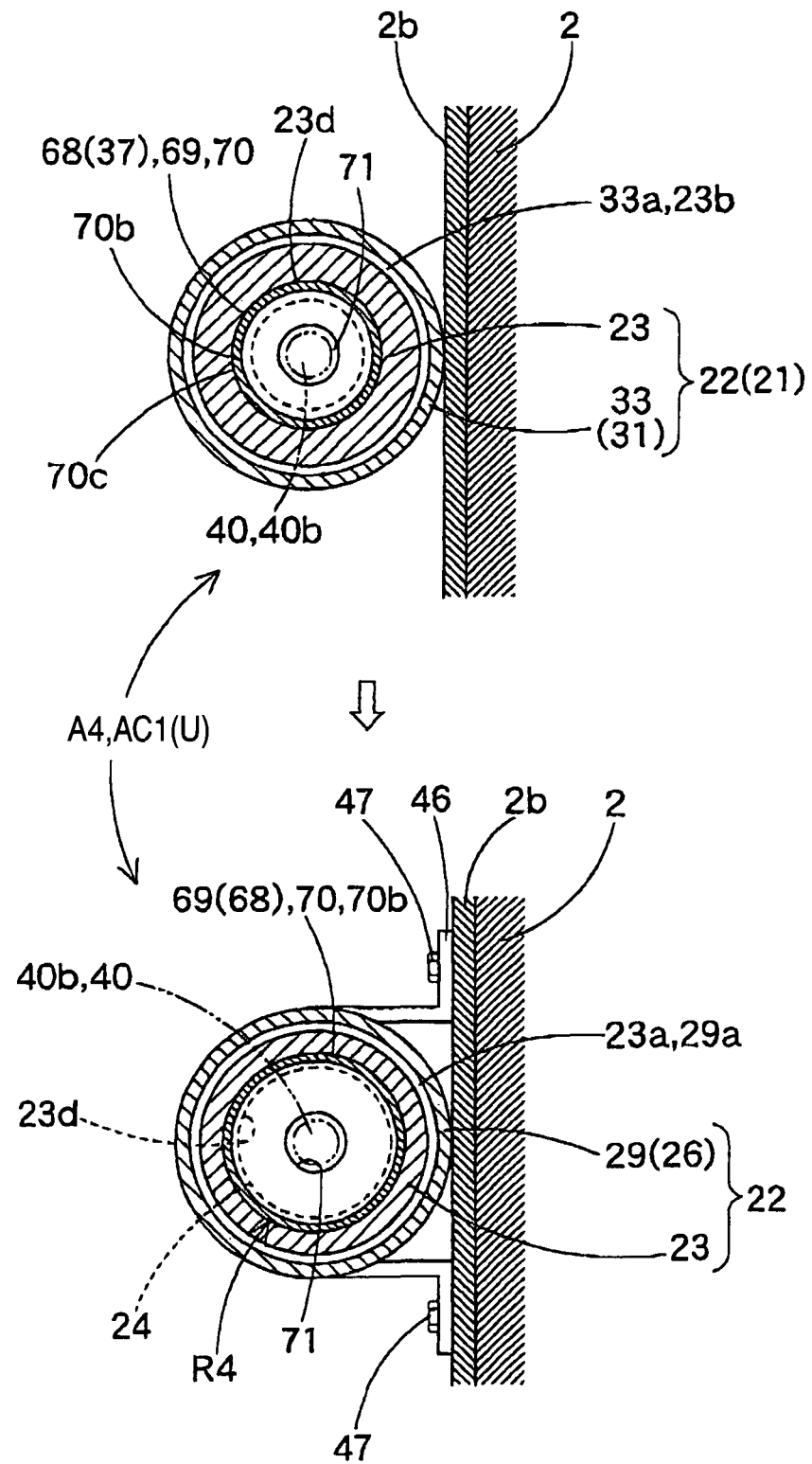
FIG. 16 is an outline cross-sectional view of a portion of a diameter enlarging deformed portion of the actuator of the fourth embodiment, showing time before being operated and time of finishing to operate.

Further, as in an actuator A4 (AC1) of a fourth embodiment shown in FIGS. 15, 16, a diameter enlarging deformed portion 69 of enlarging a diameter by being plastically deformed may be constituted from a gas cap 70 constituting a fluid cap and may be plastically deformed by receiving a pressure of the gas G per se of the working fluid (notation of the type is designated by AC, in the following, the type is designated as AC1, AC2 . . . in an order of embodiments). The gas cap 70 is constituted by a bag-like shape including a gas flow inlet 71 as a fluid flow inlet opened to a side of the gas generator 35, and plastically deformed from a diameter contracting state to a diameter enlarging state by a pressure of the gas G flowing by way of the gas flow inlet 71 when arranged to the locking stepped portion 24 after forward movement (after upward movement).

Further, according to the actuator A4 (AC1) of the fourth embodiment, similar to the actuator A3 (AP2) of the third embodiment, only the diameter enlarging deformed portion 69 constituting a lock mechanism R4 used also as the piston 68 differs from the actuator A3 (AP2) of the third embodiment, otherwise, the cylinder 22, the gas generator 36 and the support rod 40 attached to the piston 68 by welding or the like are substantially similar to those of the actuator A3 (AP2) of the third embodiment, portions and members similar to those of the third embodiment are attached with notations the same as those of the third embodiment and an explanation thereof will be omitted.

The gas cap 70 constituting the diameter enlarging deformed portion 69 is constituted by the bag-like shape substantially by a shape of a circular disk opening the gas flowing inlet 71 in the circular shape to the lower end side of constituting the side of the gas generator 35, includes a ceiling wall 70a and a peripheral wall 70b extended to a lower side from an outer peripheral edge of the ceiling wall 70a and is connected with the support rod 40 by welding, adhering or the like on the upper face side. The gas cap 70 is moved forward by sliding an outer peripheral face 70c of the peripheral wall 70b on the inner peripheral face 73d of the cylinder 22 (housing 21) when the gas G is generated. Also the diameter enlarging deformed portion 69 (gas cap 70) is formed by a plastically deformed metal material of aluminum or the like.

Further, according to the fourth embodiment, in being operated, by the gas G generated from the gas generator 35, the diameter enlarging deformed portion 69 used also as the piston 68 slides the outer peripheral face 70c of the gas cap 70 on the inner peripheral face 23d of the cylinder 22, and is restricted from being moved upward by bringing the ceiling wall 70a into contact with the lower face 27b of the front end wall portion 27 when arranged up to a position of the locking stepped portion 24, further, the peripheral wall 70b of the gas cap 70 is plastically deformed from the diameter contracting state to the diameter enlarging state by the pressure of the gas G flowing thereto by way of the gas flow inlet 71. The diameter is enlarged to be fitted to the locking stepped portion 24. Further, the diameter enlarging deformed portion 69 the diameter of which is enlarged by being plastically deformed invades the locking stepped portion 24 to be stationary to be locked by the locking stepped portion 24, and therefore, even when the support rod 40 is going to be moved downward, the downward movement can be restricted.

Figure 17:
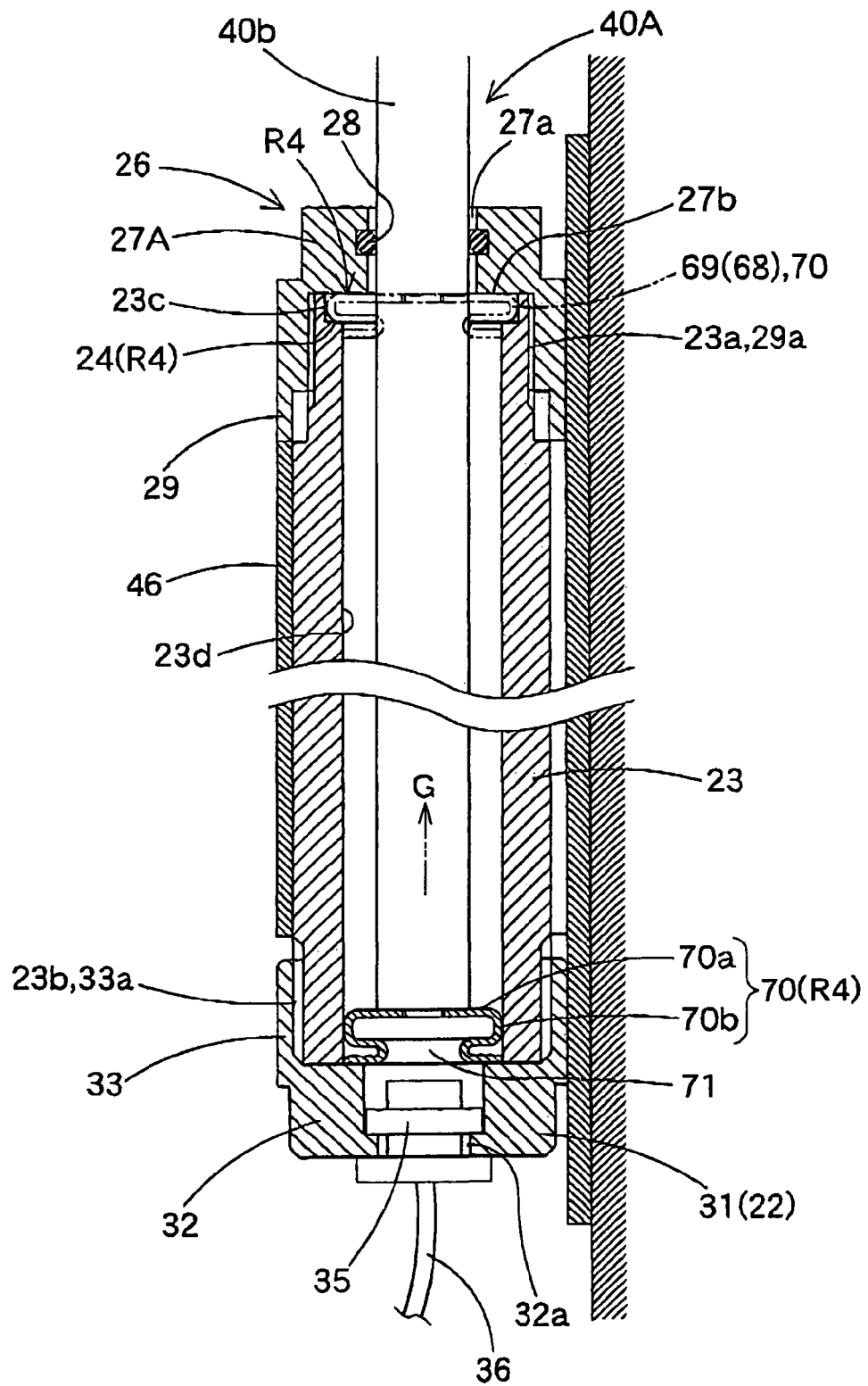
FIG. 17 is an outline vertical sectional view showing a state of interchanging a support rod of the actuator of the fourth embodiment.

Further, also in the fourth embodiment, when the amount of absorbing the kinetic energy of the walker by plastically deforming the support rod 40 is changed, the support rod 40 may be interchanged by the support rod 40A (refer to FIG. 17) of adjusting the outer diameter dimension of the shaft portion 40b. Further, also according to the fourth embodiment, even when the outer diameter dimension of the support rod 40 or 40A is changed to change a rigidity, although it is necessary to adjust the inner diameter dimension of the inserting hole 27a of the support rod 40A at the front end wall portion 27A on the side of the housing 21 (refer to FIG. 17), the constitutions of the diameter enlarging deformed portion 69 on the side of the piston 68 and the locking stepped portion 24 on the side of the housing 21 for locking the diameter enlarging deformed portion 69 can commonly be used without being changed and can easily deal therewith.

Further, also according to the actuator A4 (AC1) of the fourth embodiment, there can be constructed a simple and convenient constitution in which a locking member of a lock mechanism is not provided on the side of the cylinder 22 of enlarging the outer diameter dimension of the cylinder 22, the side of the cylinder 22 is only formed with the locking stepped portion 24 by providing the recess portion 23c of simply enlarging the diameter locally at a vicinity of the end portion on the side of the front end wall portion 27 of the inner peripheral face, and a large-sized formation of the cylinder 22 can be avoided. Further, although inside of the cylinder 22 is provided with the diameter enlarging deformed portion 69 used also as the piston 68, the diameter enlarging deformed portion 69 is deformed to enlarge the diameter to be able to be locked by the locking stepped portion 24 by plastically deforming the diameter enlarging deformed portion 69 per se, and a number of parts constituting the diameter enlarging deformed portion 69 used also as the piston 68 can be made to be as small as possible to one part, and even in the actuator A4 (AC1) of the fourth embodiment, operation and effect similar to those of the third embodiment can be achieved.

Further, also in the fourth embodiment, similar to the third embodiment, the piston 68 per se is constituted as the diameter enlarging deformed portion 69, and when substantially a total periphery in a peripheral direction of at least a portion of the outer peripheral face 70c is made to be slidable relative to the inner peripheral face 23d of the cylinder 22, the piston 68 can be constituted without separately providing a piston ring.

Figure 18:
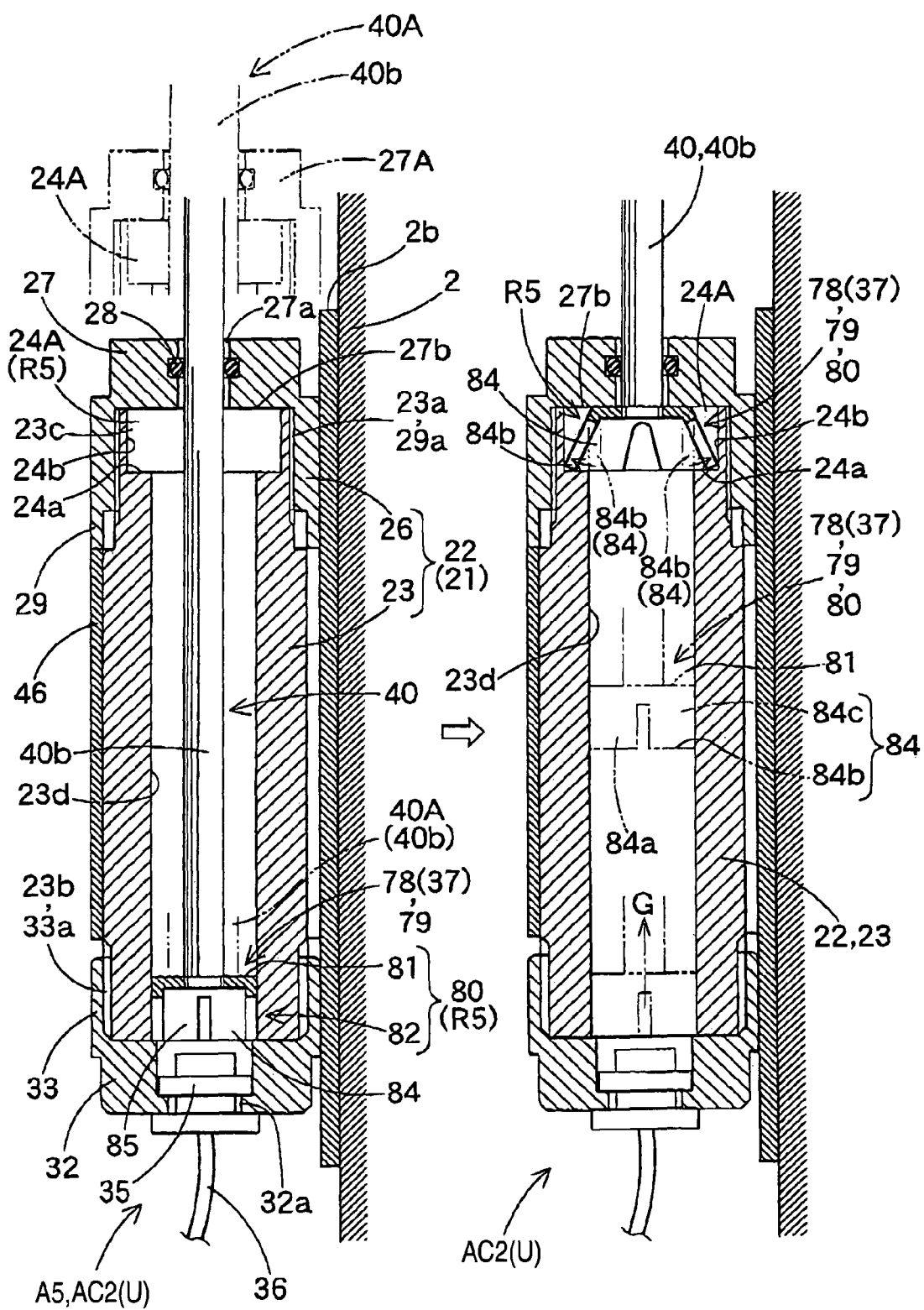
FIG. 18 is an outline vertical sectional view of an actuator of a fifth embodiment, showing time before being operated and time of finishing to operate.

Further, when the gas pressure is utilized, there may be constructed a constitution as in an actuator A5 (AC2) of a fifth embodiment shown in FIG. 18. According to the fifth embodiment, the diameter enlarging deformed portion 79 of enlarging the diameter by being deformed plastically is constituted by a gas cap 80 as a fluid cap, further, may be deformed plastically by receiving the pressure of the gas G per se of the working fluid. The gas cap 80 is constituted by a bag-like shape including a gas flow inlet 85 as a fluid flow inlet opened to the side of the gas generator 35, and is plastically deformed from the diameter contracting state to the diameter enlarging state by the pressure of the gas G flowing thereto by way of the gas flow inlet 85 when arranged to the locking stepped portion 24 after forward movement (after upward movement).

Further, according to the actuator A5 (AC2) of the fifth embodiment, similar to the actuator A4 (AC1) of the fourth embodiment, only a diameter enlarging deformed portion 79 used also as the piston 78 and the locking stepped portion 24A constituting the lock mechanism R5 differs from those of the actuator A4 (AC1) of the fourth embodiment, otherwise, the cylinder 22, the gas generator 35 and the support rod 40 attached to the piston 78 by a screw structure, welding or the like are substantially similar to those of the actuator A4 (AC1) of the fourth embodiment, portions and members similar to those of the fourth embodiment are attached with notations the same as those of the fourth embodiment and an explanation thereof will be omitted.

The locking stepped portion 24A provided on the side of the cylinder 22 of the fifth embodiment differs from that of the fourth embodiment in that in comparison with the locking stepped portion 24 of the fourth embodiment, a length dimension along the axial direction of the cylinder 22 is made to be slightly large, including the bottom face 24a of restricting the rearward movement (downward movement) of the diameter enlarging deformed portion 79, and the inner peripheral face 24b extended from the outer peripheral edge of the bottom face 24a along the forward moving direction (upward) of the gas cap 80 (piston 78 or moving member 37) and also the inner peripheral face 24b is utilized for restricting the downward movement.

Figure 19:
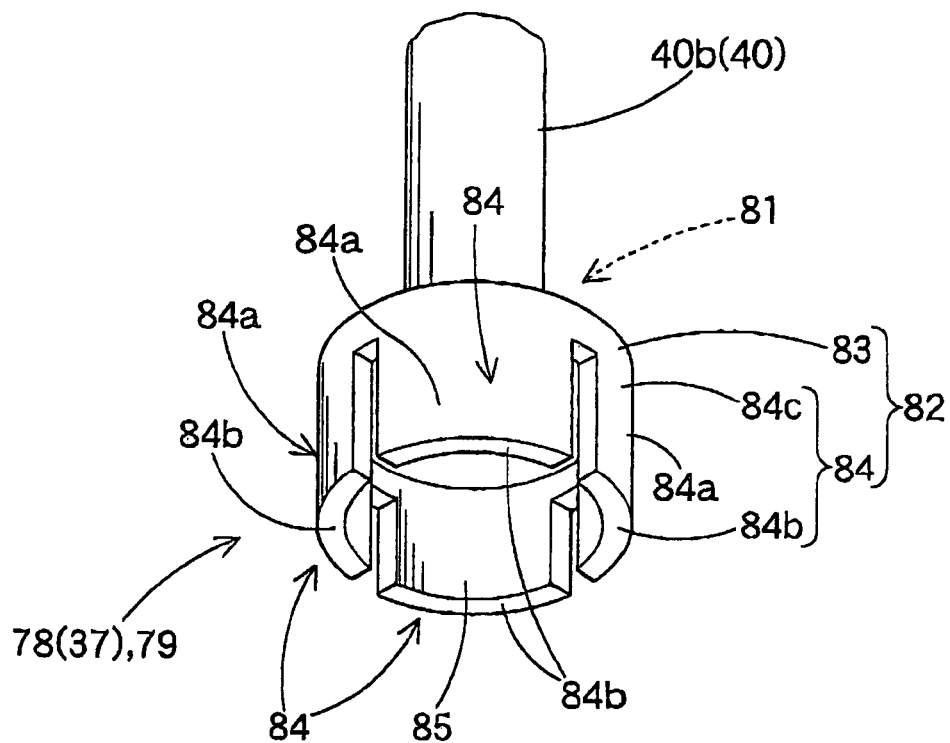
FIG. 19 illustrates respective perspective views viewed from a lower face side and an upper face side showing a portion of a piston used in the actuator of the fifth embodiment.
Figure 19:
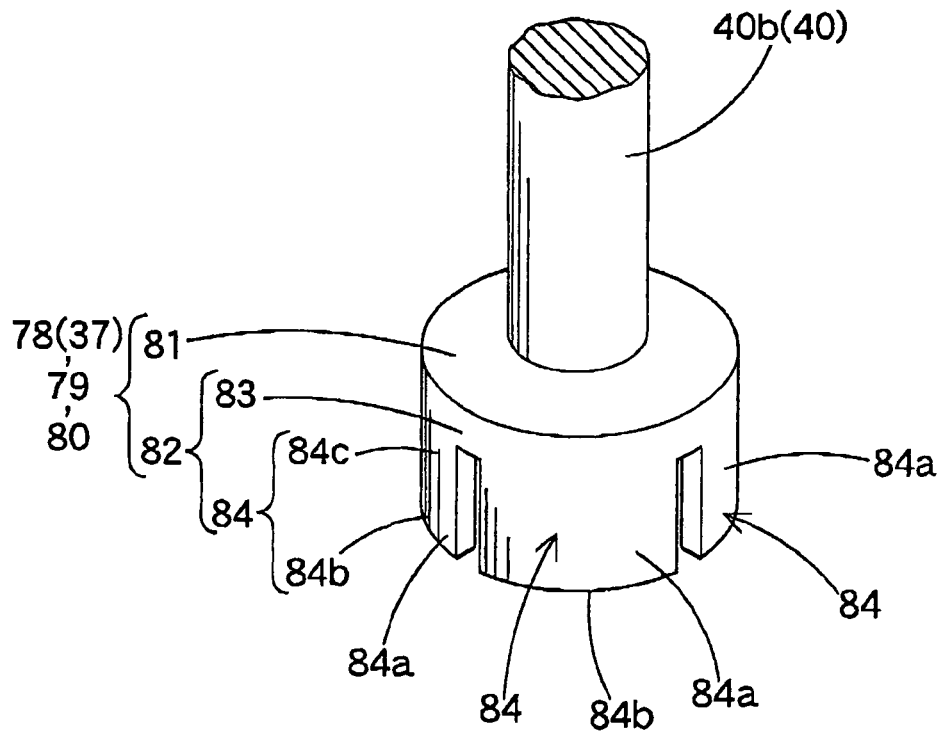

As shown by FIG. 18 and FIGS. 19A, 19B, the gas cap 80 as a fluid cap is constituted by including a ceiling plate portion 81 in a shape of a circular disk connected with the support rod 40 to be able to be brought into contact with the lower face 27b of the front end wall portion 27, and an umbrella portion 82 in a shape of a circular cylinder extended from an outer peripheral edge of the ceiling plate portion 81 to a side of a rear movement (lower side). The umbrella portion 82 is constituted by including locking legs 84 divided into a plurality (4 pieces in fifth embodiment) thereof in a direction around an axis of the cylinder 22 from a cylinder portion 83 in a shape of a circular cylinder over to a lower end side. Further, a gas flow inlet 85 as a fluid flow inlet is formed at a portion surrounded by front ends (lower ends) 84b of the respective locking legs 84 of the umbrella portion 82. Further, also the gas cap 80 is formed by a plastically deformable metal material of aluminum or the like.

The respective locking legs 84 of the umbrella portion 82 are configured to constitute outer peripheral faces 84a by a shape of a curved face of substantially a ¼ circle slidable on the inner peripheral face 23d of the cylinder 22 to be opened in a diameter enlarging direction while being plastically deformed by a pressure of the gas G flowing from the gas flow inlet 85 when arranged at the locking stepped portion 24A after upward movement of the gas cap 80, and touch the respective front ends 84b to the bottom face 24a and the inner peripheral face 24b of the locking stepped portion 24A.

Even in the actuator A5 (AC2) of the fifth embodiment, when operated, the gas cap 80 is moved forward to a position of arranging the locking stepped portion 24A by sliding the outer peripheral faces 84a of the respective locking legs 84 of the umbrella portion 82 on the inner peripheral face 23d of the cylinder 22. Further, when the gas cap 80 stops moving by bringing the ceiling plate portion 81 into contact with the lower face 17b of the front end wall portion 27, the gas cap 80 enlarges the diameter by plastically deforming the respective locking legs 84 of the umbrella portion 82 by the pressure of the gas G flowing from the gas flow inlet 85, and the front ends 84b of the respective locking legs 84 are arranged on the bottom face 24a of the locking stepped portion 24A, moved on the bottom face 24a of the locking stepped portion 24A and are brought into contact with the inner peripheral face 24b of the locking stepped portion 24A. At this occasion, even when the support rod 40 supporting the hood panel (not illustrated) constituting the receiving member is going to move downward, as shown by FIG. 18B, the respective locking legs 84 are brought into contact with the bottom face 24a and the inner peripheral face 24b of the locking stepped portion 24A and support the ceiling plate portion 81 by being brought into a state of a support bar (prop) without being deformed to enlarge the diameter, and therefore, the ceiling plate portion 81 does not move downward, as a result, a downward movement of the support rod 40 can be prevented.

Further, naturally, even in the fifth embodiment, when the amount of absorbing the kinetic energy of the walker by plastically deforming the support rod 40 is changed, the support rod may be interchanged by the support rod 40A (refer to two-dotted chain line of FIG. 18) adjusting the outer diameter dimension of the shaft portion 40b. Further, also according to the fifth embodiment, even when the outer diameter dimension of the support rod 40, 40A is changed to change the rigidity, although it is necessary to adjust the inner diameter dimension of the inserting hole 27a of the support rod 40A at the front end wall portion 27A on the side of the housing 21, constitutions of the diameter enlarging deformed portion 79 on the side of the piston 78 and the locking stepped portion 24A on the side of the housing 21 locking the diameter enlarging deformed portion 79 can commonly be used without being changed to be dealt with easily, and even in the actuator A5 (AC2) of the fifth embodiment, operation and effect similar to those of the fourth embodiment can be achieved.

Further, according to eth actuator A5 (AC2) of the fifth embodiment, only vicinities on sides of root portions 84c of the respective locking legs 84 may be changed plastically by ensuring the operation as the support bars by the respective locking legs 84 of the umbrella portion 82 without plastically deforming a total of the gas cap 80, a state of plastically deforming the gas cap 80 can be stabilized for the respective actuators A5 (AC2).

Figure 20:
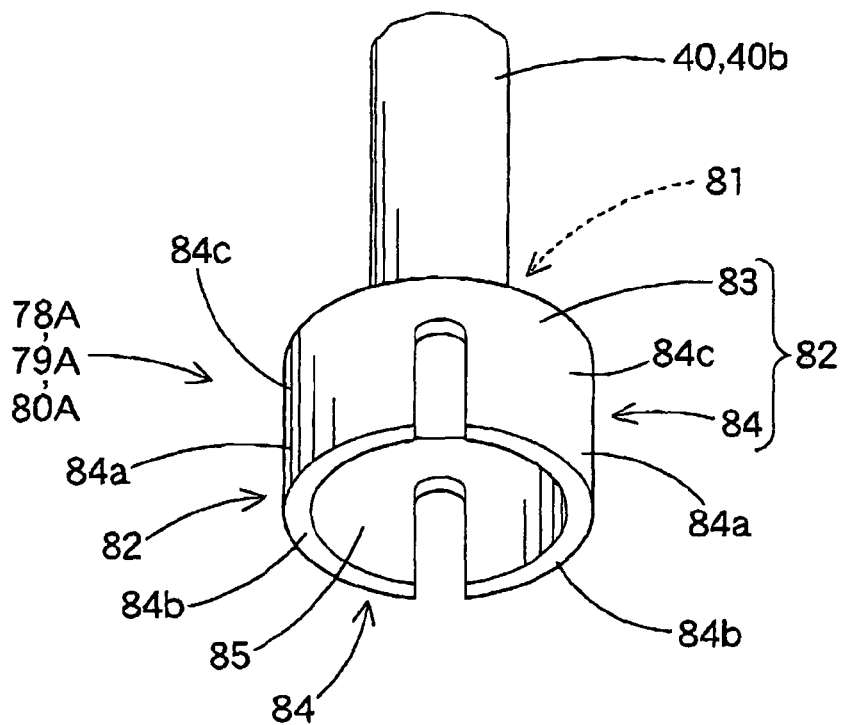
FIG. 20 is a perspective view showing a modified example of a piston used in the actuator of the fifth embodiment.
Figure 21:
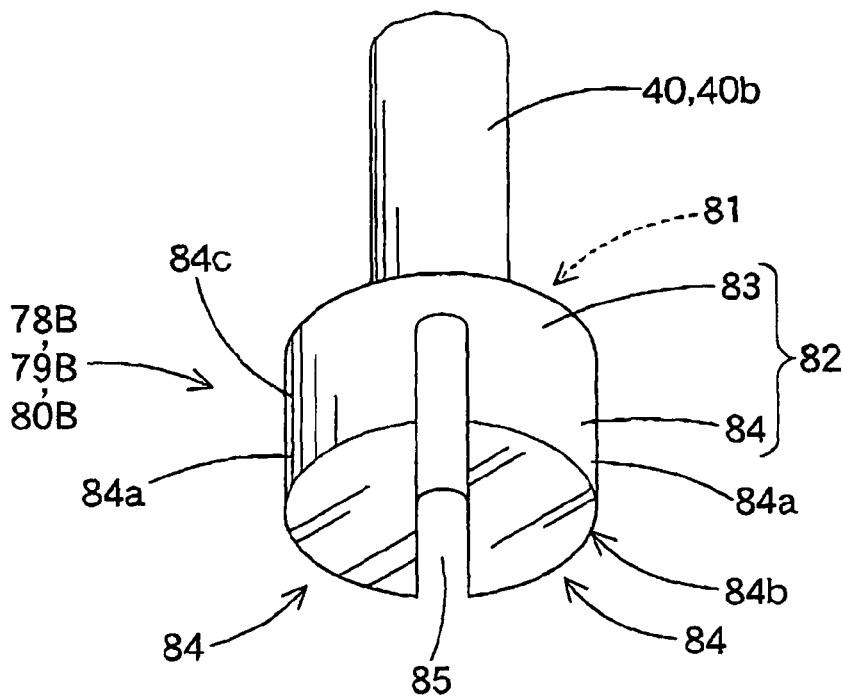
FIG. 21 is a perspective view showing other modified example of a piston used in the actuator of the fifth embodiment.
Figure 22:
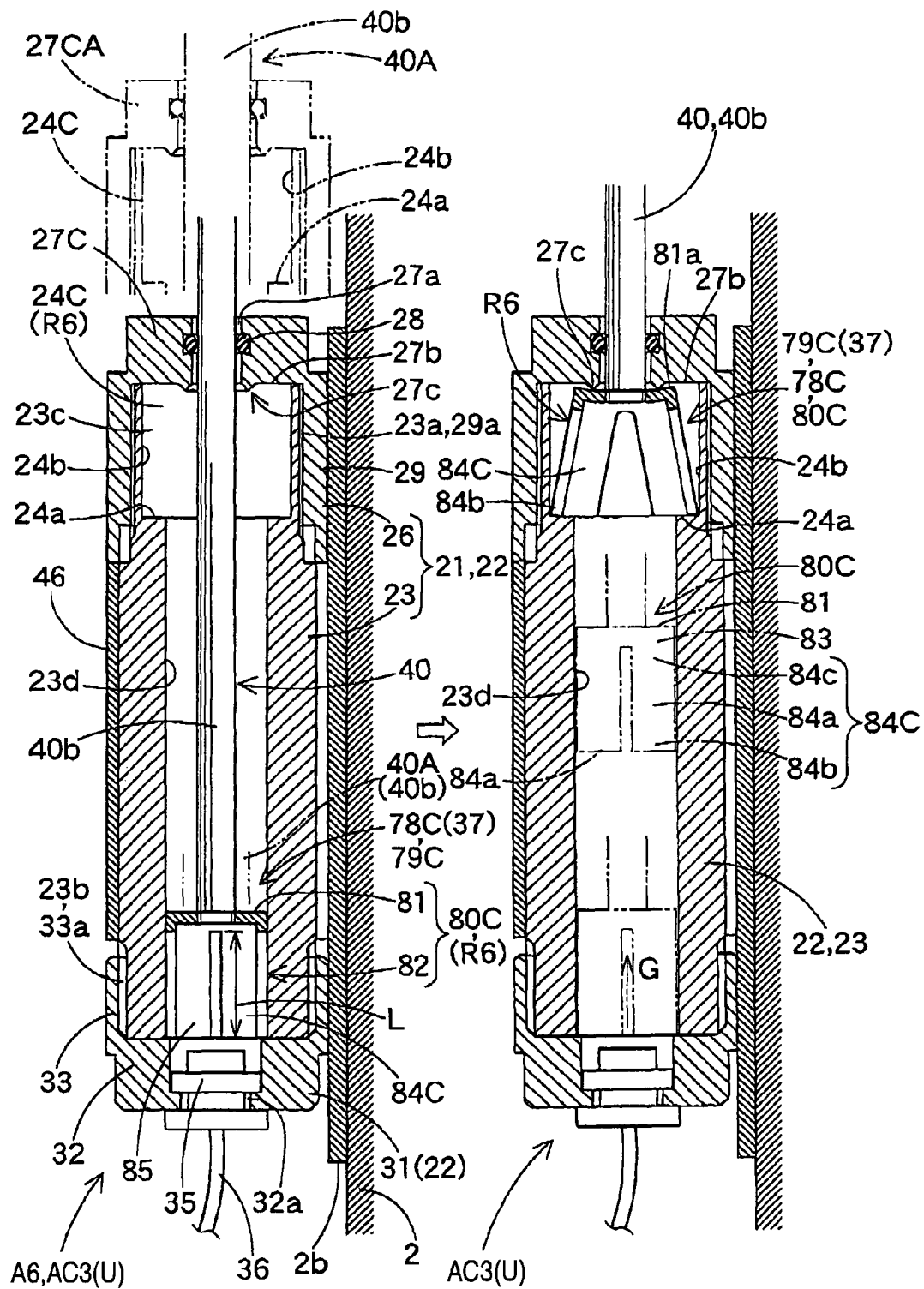
FIG. 22 is an outline vertical sectional view of an actuator of a sixth embodiment, showing time of operating and operating time of finishing to operate.

Further, although according to the fifth embodiment, a case of providing 4 pieces of the locking legs 84 of the umbrella portion 82 is shown, as in gas caps 80A, 80B constituting diameter enlarging deformed portions 79A, 79B of pistons 78A, 78B shown in FIGS. 20, 21, the locking legs 84 may be constituted as a plurality thereof of 2 pieces, 3 pieces or the like. Further, as in an actuator A6 (AC3) of a sixth embodiment shown in FIG. 22, a length dimension L of a locking leg 84C of a piston 78C may be configured to be long along with that of a locking stepped portion 24C constituting a lock mechanism R6 to stabilize a restriction of the rearward movement. Further, as in the actuator A6 (AC3) of the sixth embodiment, a lower face 27b of a front end wall portion 27C may be arranged with a projection 27c of plastically deforming an outer peripheral edge portion 81a of the ceiling plate portion 81 to a side of an upward moving direction of the piston 78C by being brought into contact with a vicinity of an outer peripheral edge of the ceiling plate portion 81 at vicinities on sides of the root portions 84c of the respective locking legs 84C for auxiliary deforming the respective locking legs 84C in the diameter enlarging direction when arranged to the locking stepped portion 84C after the forward movement (after upward movement) of the piston 78C (moving member 37). In the case of the sixth embodiment, the projection 27c for deformation is projected to a lower side in a shape of a circular ring at a peripheral edge of the inserting hole 27a. According to the constitution, the respective locking legs 84c are easy to be plastically deformed uniformly in the diameter enlarging direction, and the rearward movement of the support rod 40 can be restricted with an excellent balance in the direction around the axis of the cylinder 22.

Figure 23:
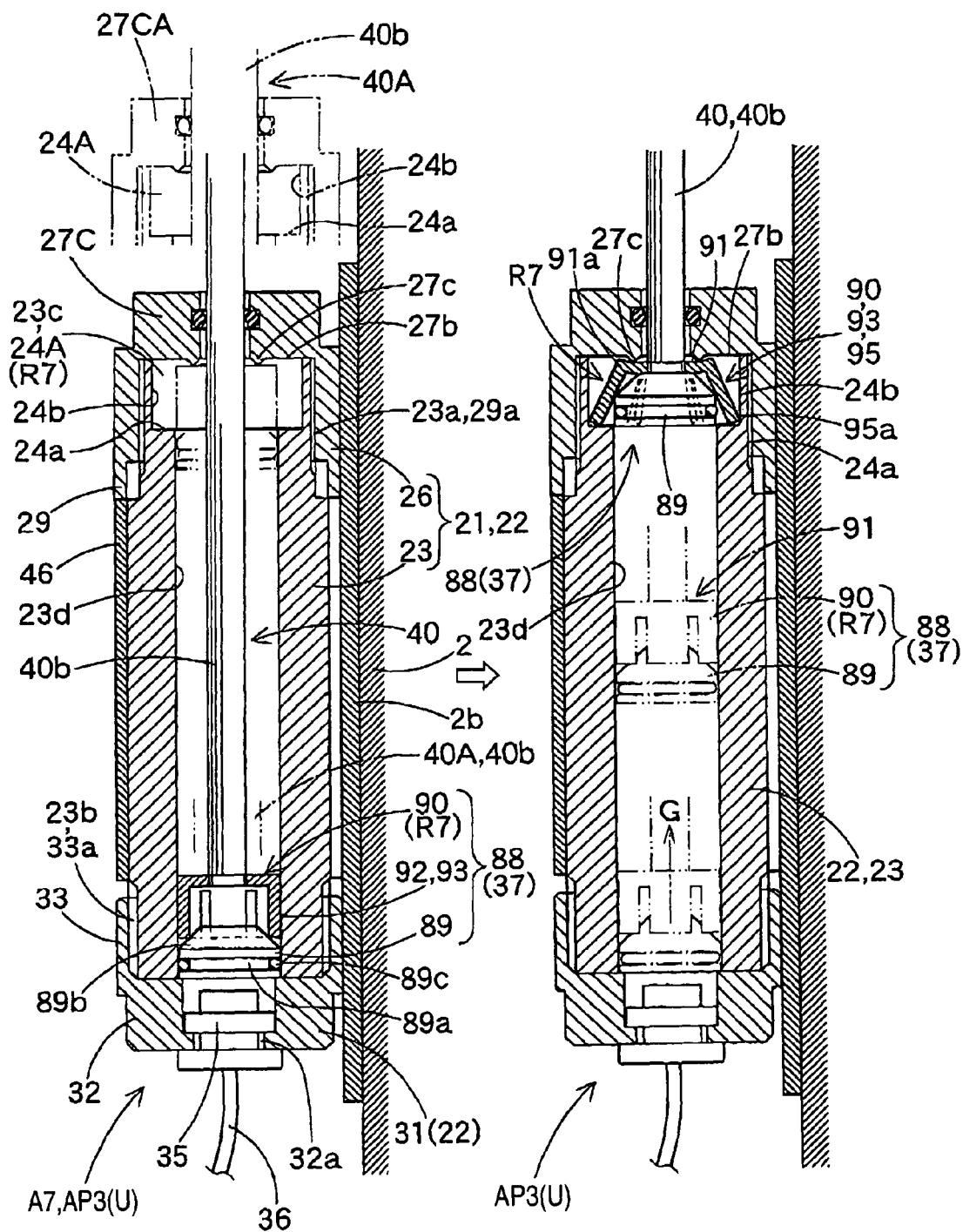
FIG. 23 is an outline vertical sectional view of an actuator of a seventh embodiment, showing time before being operated and time of finishing to operate.
Figure 24:
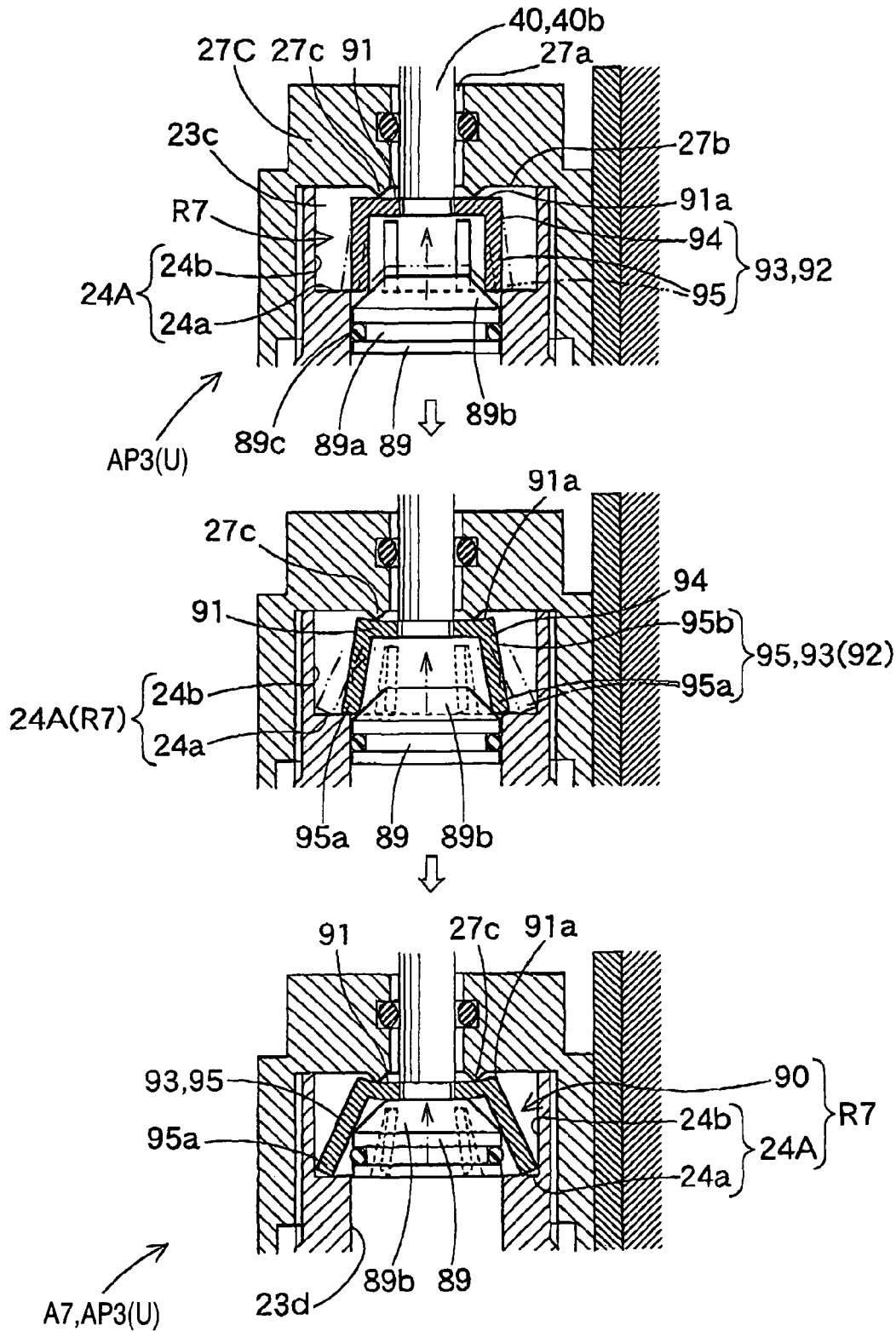
FIG. 24 is an outline vertical sectional view showing a deformation of a lock member in accordance with a movement of a piston main body in operating the actuator of the seventh embodiment.

Further, according to the constitution of arranging the umbrella portion 82 to be plastically deformed as in the fifth and the sixth embodiments, there may be also constructed a constitution as in an actuator A7 (AP3) of a seventh embodiment shown in FIGS. 23, 24.

The actuator A7 (AP3) of the seventh embodiment is constituted as a piston cylinder type, and constituted such that the moving member 37 as a piston 88 is moved forward (moved upward) by making the working fluid flow to inside of the housing 21 constituting the cylinder 22 when operated, and constituted such that similar to the fifth embodiment, the locking stepped portion 24A provided on the side of the cylinder 22 constituting the lock mechanism R7 along with a lock member 90 of the piston 88 is provided with the bottom face 24a of restricting the rearward movement (downward movement) of a diameter enlarging deformed portion 92, and the inner peripheral face 24b extended from the outer peripheral edge of the bottom face 24a along an upward moving direction of the piston 88.

Further, the actuator A7 (AP3) of the seventh embodiment differs from the actuator A5 (AC2) of the fifth embodiment in constitutions of the piston 88 as the moving member 37 and the front end wall portion 27c, otherwise, the cylinder 22, the gas generator 35, and the support rod 40 attached to the piston 88 by a screw structure, welding or the like are substantially similar to those of the actuator A5 (AC2) of the fifth embodiment, portions and members similar to those of the fifth embodiment are attached with notations the same as those of the fifth embodiment, and an explanation thereof will be omitted. Further, according to the constitution of the front end wall portion 27C of the cylinder 22, similar to the sixth embodiment, the peripheral edge of the inserting hole 27a of the lower face 27b is formed with the projection 27c for deformation projected downward in a shape of a circular ring for auxiliary plastically deforming the respective locking legs 95 in the diameter enlarging direction.

Further, the piston 88 of the seventh embodiment is constituted by providing a piston main body 89 and a lock member 90 arranged as the diameter enlarging deformed member on a side of a front end wall portion 27C of the piston main body 89 separately from the piston main body 89 and connected to the support rod 40 to be able to be brought into contact with the front end wall portion 27C.

The lock member 90 is constituted by providing a ceiling plate portion 91 in a shape of a circular disk connected with the support rod 40 to be able to be brought into contact with the front end wall portion 27C, and an umbrella portion 93 in a shape of a cylinder extended from an outer peripheral edge of the ceiling plate portion 91 to a side of the piston main body 89 and constituting a diameter enlarging deformed portion 92. Similar to the umbrella portion 82 of the fifth embodiment, the umbrella portion 93 is constituted by arranging a cylinder portion 94 in a shape of a circular cylinder extended from the ceiling plate portion 91, and locking legs 95 divided into a plurality thereof (4 pieces also in seventh embodiment) in a direction around the axis of the cylinder 22 on a side of an end portion of a cylinder portion 94 remote from the ceiling plate portion 91. Further, also the lock member 90 is formed by a plastically deformable metal material of aluminum or the like similar to the gas cap 80 (piston 78, diameter enlarging deformed portion 79) of the fifth embodiment.

Further, the piston main body 89 is formed with a taper shape press portion 89b in a converging shape constituting a shape of a circular cone to be able to press to move the lock member 90 to a position of arranging the locking stepped portion 24A by being brought into contact with the respective locking legs 95 of the umbrella portion 93 in the upward movement of the moving member 37 of the piston 88 at a front end on a side of the umbrella portion 93. The piston main body 89 is constituted by arranging a piston ring 89c slidable on the inner peripheral face 23d of the main body 23 of the cylinder 22 at a recess groove 89a of an outer peripheral face by constituting substantially a shape of a circular disk including the taper shape press portion 89b.

Further, the umbrella portion 93 is opened in a diameter enlarging direction while being plastically deformed by pressing an inner peripheral side by the taper shape press portion 89b of the piston main body 89 when the lock member 90 is arranged at a position of arranging the locking stepped portion 24A by being pressed by the piston main body 89 to bring the ceiling plate portion 91 into contact with the front end wall portion 27C and the downward movement of the lock member 90 is restricted by bringing the respective locking legs 95 into contact with the bottom face 24a and the inner peripheral face 24b of the locking stepped portion 24A.

According to the actuator A7 (AP3) of the seventh embodiment, when operated, the piston main body 89 is moved upward (moved forward) by receiving the pressure of the gas G, and the lock member 90 is moved upward to the position of arranging the locking stepped portion 24A by being pressed by the taper shape press portion 89b of the piston main body 69. Further, even when the lock member 90 stops moving by bringing the ceiling plate portion 91 into contact with the front end wall portion 27C as shown by FIG. 24A, the piston main body 89 separate from the lock member 90 moves upward by pressing the taper shape press portion 89b, and therefore, as shown by FIGS. 24B and 24C, the respective locking legs 95 of the umbrella portion 93 of the lock member 90 enlarge the diameter while being plastically deformed, front ends 95a of the respective locking legs 95 are arranged on the bottom face 24a of the locking stepped portion 24A, further, moved on the bottom face 24a of the locking stepped portion 24A and brought into contact with the inner peripheral face 24b of the locking stepped portion 24A. At this occasion, even when the support rod 40 of supporting the hood panel of the receiving member, not illustrated, is going to move downward, the respective locking legs 95 bring the front ends 95a into contact with the bottom face 24a and the inner peripheral face 24b of the locking stepped portion 24A and support the ceiling plate portion 91 by being brought into a state of a support bar (prop) without being deformed to enlarge the diameter, and therefore, the ceiling plate portion 91 is not moved downward, as a result, the downward movement of the support rod 40 can be prevented by restricting the downward movement of the lock member 90.

Further, naturally, even in the seventh embodiment, when the amount of absorbing the kinetic energy of the walker by plastically deforming the support rod 40 is changed, the support rod may be interchanged by the support rod 40A, (refer to two-dotted chain line of FIG. 23A) adjusting the outer diameter dimension of the shaft portion 40b. Further, also in the seventh embodiment, even when the diameter dimension of the support rod 40, 40A is changed to change the rigidity, although it is necessary to adjust the inner diameter dimension of the inserting hole 27a of the support rod 40A at the front end wall portion 27C on the side of the housing 21, constitutions of the piston main body 89, the lock member 90 on the side of the piston 88 and the locking stepped portion 24A on the side of the housing 21 for locking the lock member 90 can commonly be used without being changed to be easily deal therewith, and also in the actuator A7 (AP3) of the seventh embodiment, operation and effect similar to those of the fifth embodiment can be achieved.

Further, according to the actuator A7 (AP3), by the taper shape press portion 89b of the piston main body 89, the respective locking legs 95 can enlarge the diameter uniformly, and the rearward movement of the support rod 40, 40A can be restricted with an excellent balance in the direction around the axis of the cylinder 22.

Further, also in the seventh embodiment, the lower face 27b of the front end wall portion 27C is arranged with the projection 27c for deformation for plastically deforming the outer peripheral edge portion 91a of the ceiling plate portion 91 to the side of the upward movement direction of the lock member 90 by being brought into contact with a vicinity of the outer peripheral edge of the ceiling plate portion 91 at vicinities of the sides of the root portions 90b of the respective locking legs 95 for auxiliary deforming the respective locking legs 95 in the diameter enlarging direction when arranged to the locking stepped portion 24A after the downward movement (after upward movement) of the lock member 90. Therefore, in such a constitution, the respective locking legs 95 are easy to be plastically deformed in the diameter enlarging direction further uniformly, and the rearward movement of the support rod 40 can be restricted with an excellent balance in the direction around the shaft of the cylinder 22.

Further, in the seventh embodiment, the mechanism of moving the front ends 95a of the respective locking legs 95 on the bottom face 24a of the locking stepped portion 24A to be brought into contact with the inner peripheral face 24b of the locking stepped portion 24A may utilize not only pressing of the taper shape press portion 89b of the piston main body 89 but press forces operated to the respective locking legs 95 from the support rod 40 by way of the ceiling plate portion 91 when the support rod 40 is going to be moved rearward.

Further, in cases of the actuators A2 (AP1), A3 (AP2), A7 (AP3), A4 (AC1), A5 (AC2), A6 (AC3) of the second through the seventh embodiments of plastically deforming the diameter enlarging deformed portions 52, 59, 69, 79, 79C, 92 by bringing the diameter deformed portions into contact with the lower faces 27b of the front end wall portions 27, 27A, 27C or utilizing the gas pressure, so far as the diameter enlarging deformed portions 52, 59, 69, 79, 79C, 92 can ensure dimensions of capable of smoothly moving to the locking stepped portions 24, 24A, 24C of the pistons (moving members 37) 48, 58, 68, 78, 78C, when operated thereafter, the diameters may be enlarged while being plastically deformed to be able to be locked by the locking deformed portions 24, 24A, 24C, the diameter enlarging deformed portions may not be constituted with a high dimensional accuracy and also a number of parts may be small, and therefore, the actuators A2 (AP1), A3 (AP2), A7 (AP3), A4 (AC1), A5 (AC2), A6 (AC3) can be fabricated extremely simply and conveniently.

Figure 25:
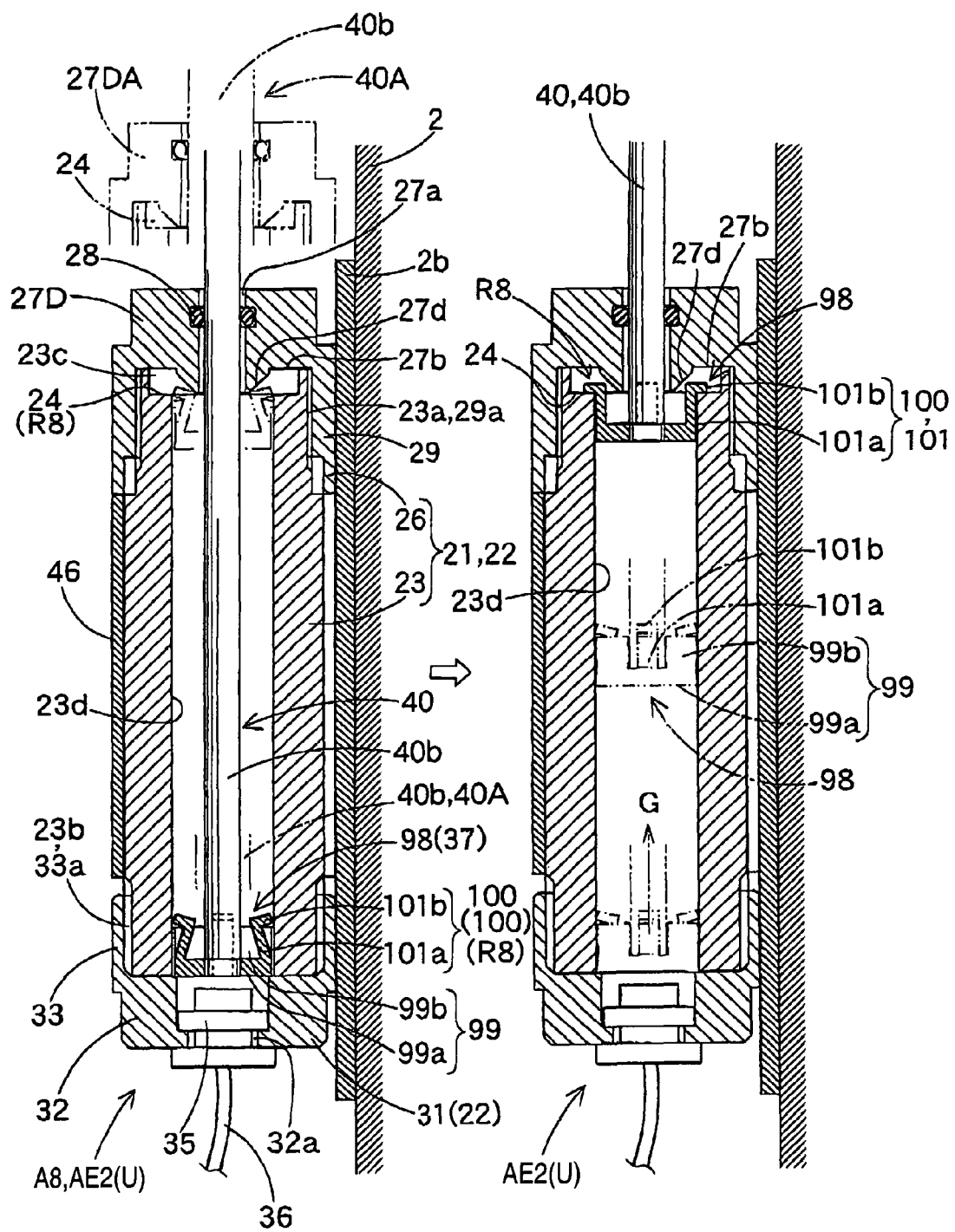
FIG. 25 is an outline vertical sectional view of an actuator of an eighth embodiment, showing time before being operated and time of finishing to operate.
Figure 26:
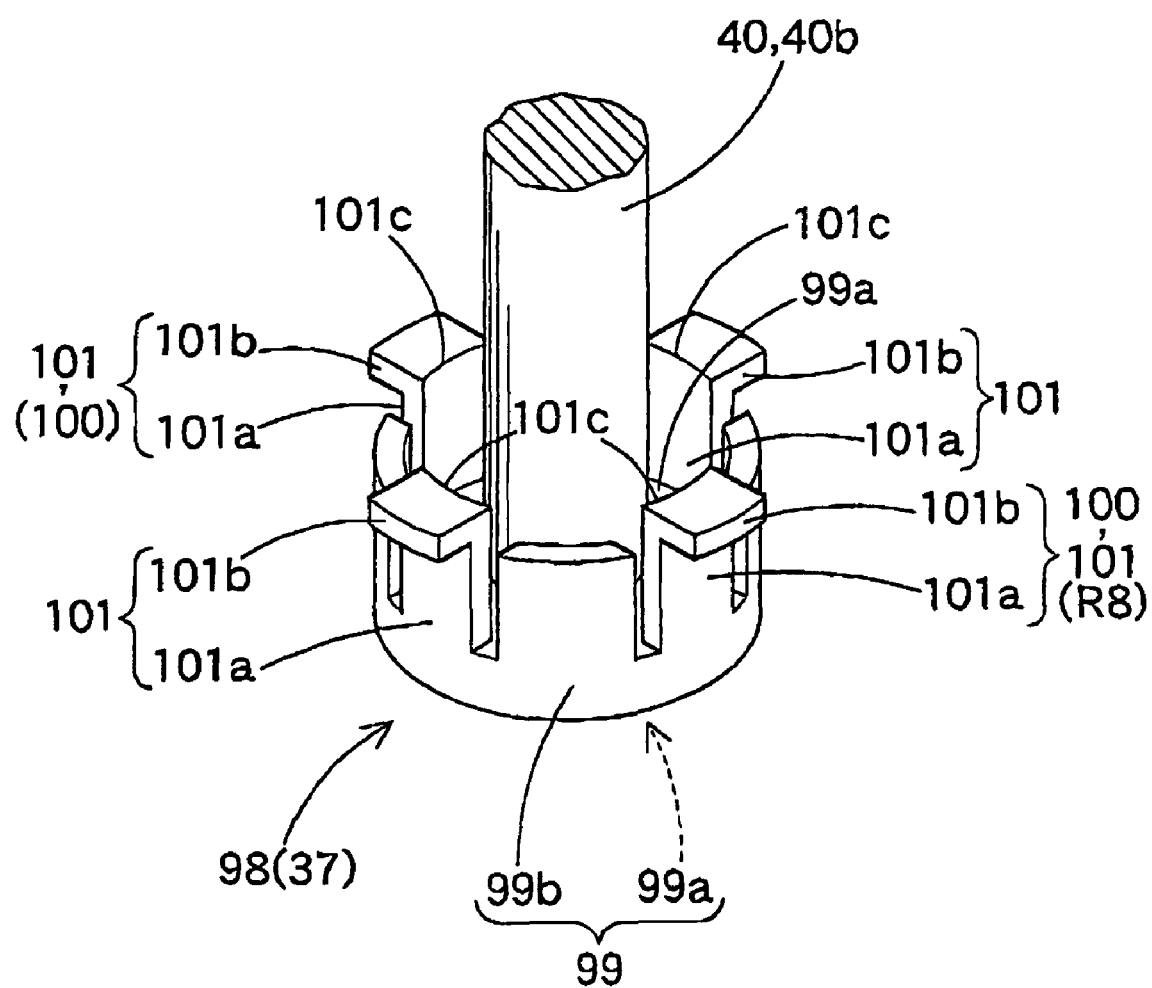
FIG. 26 is a perspective view showing a portion of a piston used in the actuator of the eighth embodiment.
Figure 27:
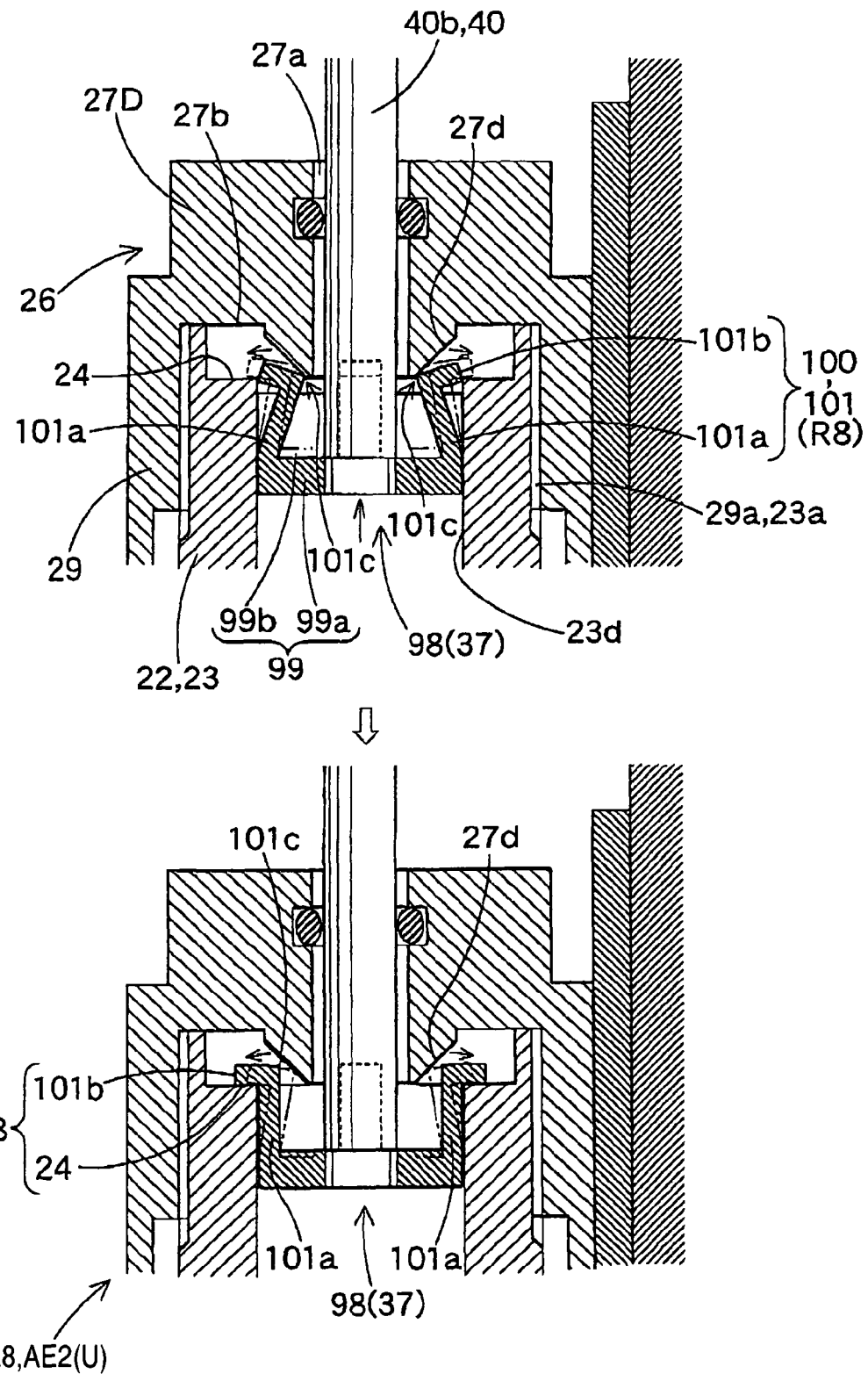
FIG. 27 is a view successively explaining an operation of an elastic piece portion of the piston in operating the actuator of the eighth embodiment.

Further, when a diameter enlarging deformed portion is deformed from a diameter contracting state to a diameter enlarging state by utilizing an elastic deformation, the diameter enlarging deformed portion may be constituted as in an actuator A8 (AE2) of an eighth embodiment shown in FIGS. 25 through 27. The actuator A8 (AE2) of the eighth embodiment is constituted by a piston cylinder type and is configured to move forward (move upward) the moving member 37 as a piston 98 by making the gas G as the working fluid flow to inside of the housing 21 as the cylinder 22 and a diameter enlarging deformed portion 100 is constituted as an elastic piece portion 101 arranged on a side of an outer peripheral face of the piston 98 along a direction of moving the piston 98 (moving member 37).

Further, according to the eighth embodiment, constitutions of the piston 98 constituting a lock mechanism R8 along with the locking stepped portion 24 and a front end wall portion 27D of the cylinder 22 differ from those of the first embodiment, otherwise, the cylinder 22, the gas generator 35 and the support rod 40 of other constitutions are substantially similar to those of the actuator A1 (AE1) of the first embodiment, portions and members similar to those of the first embodiment are attached with notations the same as those of the first embodiment and an explanation thereof will be omitted.

Further, the piston 98 is constituted by including a main body 99 including a base plate portion 99a in a shape of a circular plate connected to the support rod 40 by a screw structure, welding or the like, and a cylinder portion 99b in a shape of a circular cylinder from an outer peripheral edge of the base plate portion 99a and slidable on the inner peripheral face 23d of the main body 23 of the cylinder 22, and the elastic piece portion 101 constituting the diameter enlarging deformed portion 100.

The elastic piece portion 101 is constituted by constituting one end portion (lower end in case of embodiment) along a direction of moving the piston 98 by a side of a base portion 101a connected to the cylinder portion 99b of the main body 99 of the piston 98 at a vicinity of a side of the base plate portion 99a and constituting other end portion (upper end in case of embodiment) along the direction of moving the piston 98 as a hook piece 101b to be projected to an outer side to be able to be locked by the locking stepped portion 24. In other words, the respective elastic piece portions 101 are arranged to extend sides of the base portions 101a from a vicinity of the base plate portion 99a of the cylinder portion 99b to be able to bend sides of the hook piece portions 101b by intermittently gouging out the cylinder portion 99b in a direction around an axis of the cylinder portion 99b. In the case of the eighth embodiment, 4 pieces of the elastic piece portions 101 are arranged radially in the direction around the axis of the piston 98 and when contained to inside of the main body 23 of the cylinder 22, the respective hook piece portions 101b are contained thereto by being bent to inner sides by being brought into contact with the inner peripheral face 23d to be continuous to the outer peripheral face of the cylinder portion 99b (refer to FIG. 25A).

Further, the front end wall portion 27D is arranged with a guide face 27d for guiding the hook piece portions 101b in the diameter enlarging direction by being brought into contact with inner side edges 101*c* of the respective hook piece portions 101*b* when arranged to the locking stepped portion 24 after upward movement of the piston 98 (moving member 37). The guide face 27*d* is constituted from a lower face side (taper face side) of a converging taper-like portion by projecting a peripheral edge of an inserting hole 27*a* on a side a lower face 27*b* of a front end wall portion 27D in a shape of a circular cone.

According to the actuator A8 (AE2) of the eighth embodiment, in being operated, when the piston 98 is moved upward by the gas G generated from the gas generator 35 and the elastic piece portion 101 constituting the diameter enlarging deformed portion 100 is arranged at the locking stepped portion 24, the respective hook piece portions 101*b* are elastically deformed from the diameter contracting state of being bent to the inner sides to the diameter enlarging state such that the respective hook piece portions 101*b* are rotated by constituting a center of rotation by the side of the base portion 101*a*, the respective hook piece portions 101*b* are locked by the locking stepped portion 24, and even when the support rod 40 is going to move downward, the downward movement can be restricted.

Further, also in the eighth embodiment, when the amount of absorbing the kinetic energy of the walker by plastically deforming the support rod 40 is changed, the support rod 40 may be interchanged by the support rod 40A (refer to two-dotted chain line of FIG. 25) adjusting the outer diameter dimension of the shaft portion 40*b* to be connected to the base plate portion 99*a* of the main body 99 of the piston 98. Further, also in the eighth embodiment, even when the outer diameter dimension of the support rod 40, 40A is changed to change the rigidity, although it is necessary to adjust the inner diameter dimension of the inserting hole 27*a* of the support rod 40A at the front end wall portion 27DA on the side of the cylinder 22 (refer to two-dotted chain line of FIG. 25A), constitutions of the piston 98 (moving member 37) and locking stepped portion 24 on the side of the cylinder 22 of locking the diameter enlarging deformed portion 100 can commonly be used without being changed to be able to easily deal therewith and operation and effect similar to those of the first embodiment can be achieved.

Furthermore, according to the eighth embodiment, the front end wall portion 27D of the cylinder 22 is arranged with the guide face 27*d* for guiding the hook piece portion 101*b* in the diameter enlarging direction by being brought into contact with the inner side edge 101*c* of the hook piece portion 101*b* when arranged to the locking stepped portion 24 after upward movement (after forward movement) of the piston 98 (moving member 37). Therefore, according to the eighth embodiment, even when an urge force of the hook piece portion 101*b* in the diameter enlarging direction is weak, the hook piece portion 101*b* can precisely be deformed to enlarge the diameter to be locked by the locking stepped portion 24. That is, the hook piece portion 101*b* can precisely be locked by the locking stepped portion 24 by utilizing the guide face 27*d* even when the urge force of the hook piece portion 101*b* in the diameter enlarging direction is weakened such that a resistance in sliding the respective hook piece portions 101*b* on the inner peripheral face 23*d* of the cylinder 22 is weakened when the piston 98 (moving member 37) is moved upward, and a speed of moving the piston 98 (moving member 37) can be restrained from being reduced.

Figure 28:
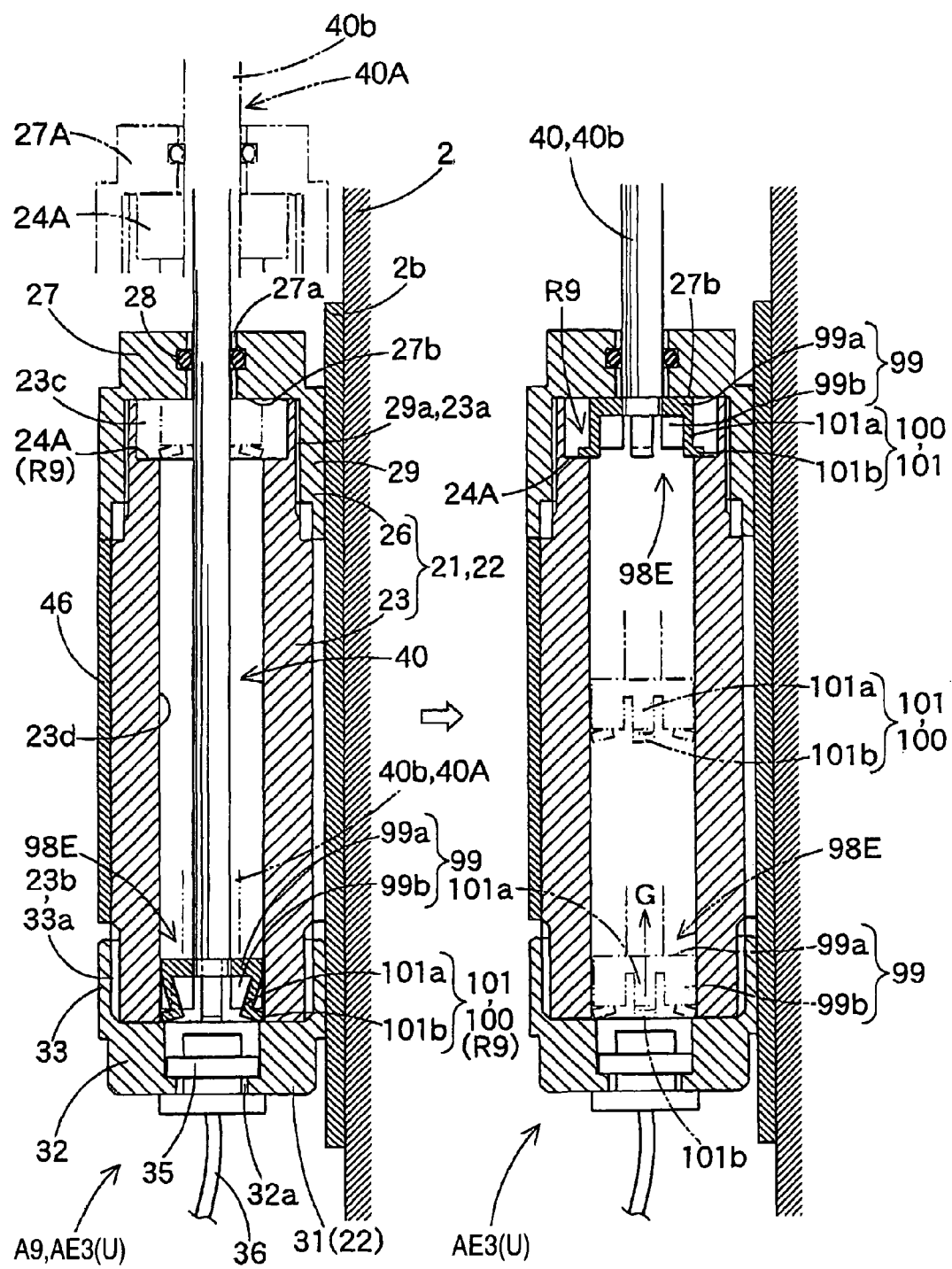
FIG. 28 is an outline vertical sectional view of an actuator according to a ninth embodiment, showing time of operating and time of finishing to operate.

Naturally, the eighth embodiment may be constituted without providing the guide face 27*d* as in the front end wall portion 27 of the first embodiment. Further, as in an actuator A9 (AE3) of a ninth embodiment shown in FIG. 28, a piston 98E constituting a lock mechanism R9 along with a locking stepped portion 24A may be constituted such that as a constitution of turning the piston 98 of the eighth embodiment upside down, in the elastic piece portion 101, an arrangement of the hook piece portion 101*b* relative to the base portion 101*a* is disposed on a downward movement side (rearward movement side) of the piston 98A (moving member 37).

Further, when the ring-like elastic member 43 is constituted by a C ring having a notch 43*e* (refer to FIG. 7B) penetrating inner and outer peripheries as in the actuator A1 (AE1) of the first embodiment, a ring-like elastic member 43E shown in FIG. 39 may be used. The ring-like elastic member 43E is constituted as the diameter enlarging deformed portion 42 forming a lock mechanism R10 along with the locking stepped portion 24 similar to the ring-like elastic member 43, and constituted by a shape of a plate substantially in a shape of a circular ring comprising spring steel and formed by a shape of widening a width dimension B between the inner and the outer peripheries from sides of front end portions 43*f*, 43*f* at a vicinity of the notch 43*e* over to a root portion 43*g* constituting a position of point symmetry with the notch 43*e*.

Figure 30:
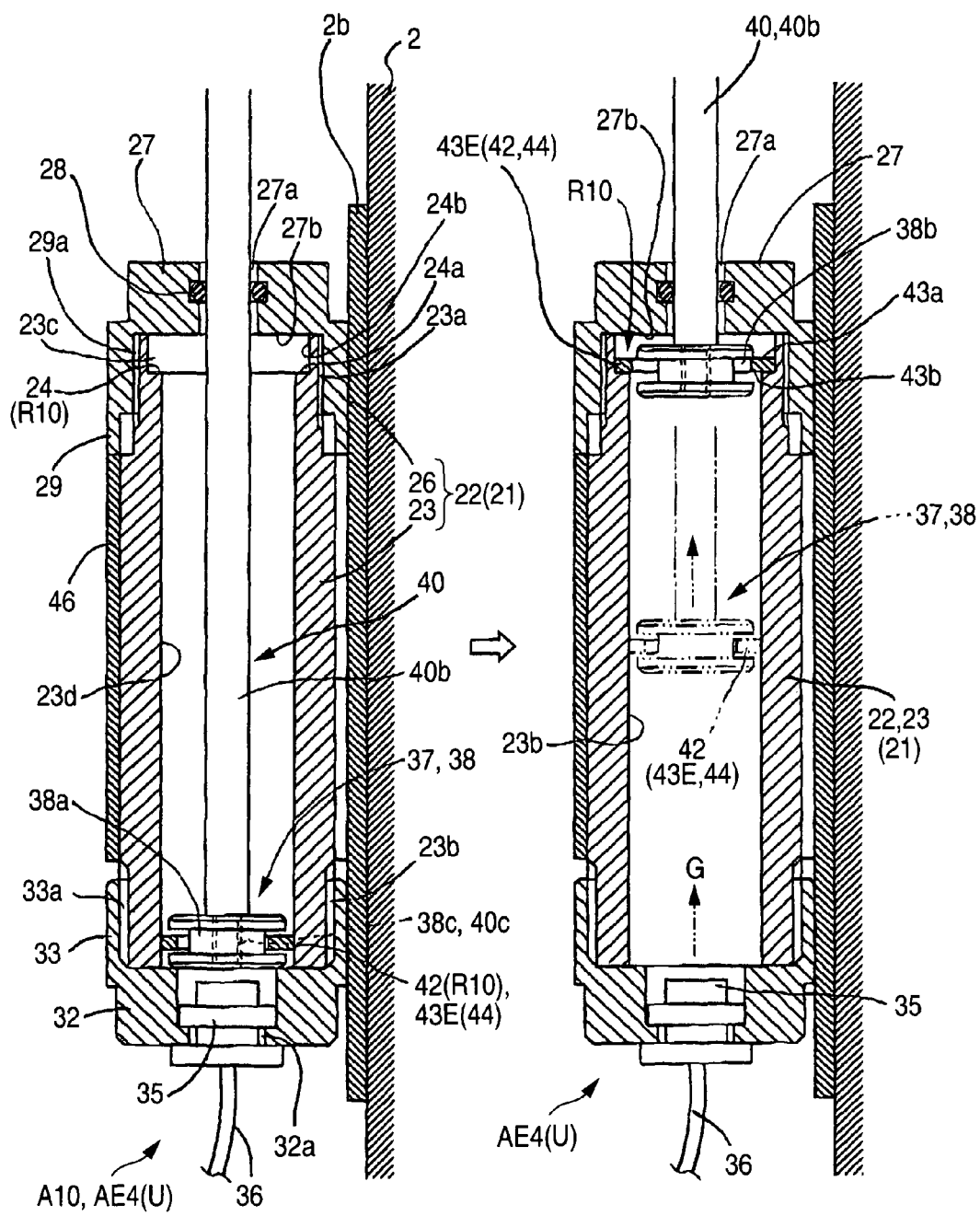
FIG. 30 is an outline sectional view of the actuator of the tenth embodiment, showing time of operating and time of finishing to operate.
Figure 31:
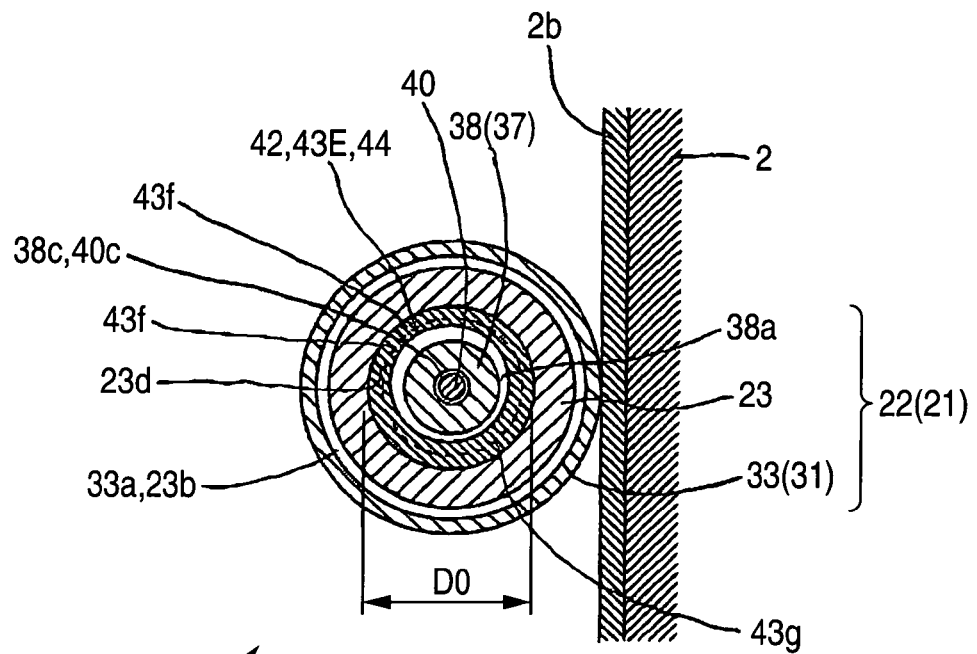
FIG. 31 is an outline cross-sectional view of a portion of a diameter enlarging deformed portion of the actuator of the tenth embodiment, showing time before being operated and time of finishing to operate.
Figure 31:
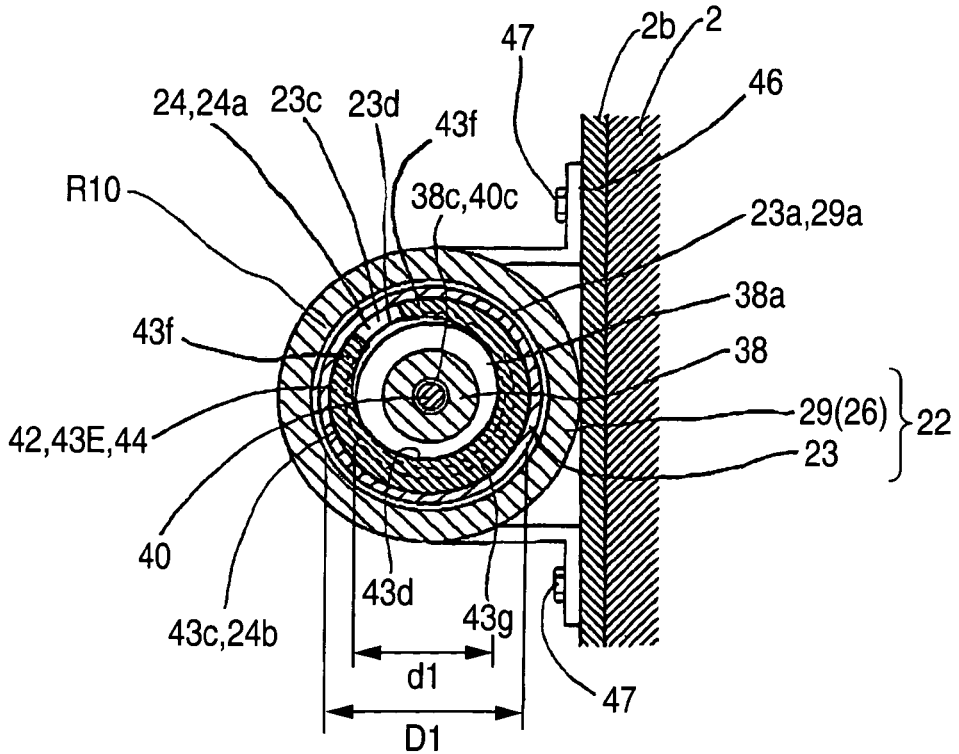

Further, according to the actuator A10 (AE4) of a tenth embodiment using the ring-like elastic member 43E, as shown by FIGS. 30, 31, only the ring-like elastic member 43E differs from the ring-like elastic member 43 of the first embodiment, otherwise, constitutions of the piston 38 (moving member 37), the front end wall portion 27 of the cylinder 22 and the like are similar to those of the first embodiment, portions and members similar to those of the first embodiment are attached with notations the same as those of the first embodiment and an explanation thereof will be omitted.

Further, similar to the ring-like elastic member 43 of the first embodiment, the outer diameter dimension D0 of the piston 38 per se is constituted such that the ring-like elastic member 43E is brought into press contact with the recess groove 38*a* of the piston 38 to be slidable on the inner peripheral face 23*d* of the cylinder 22 in a state of being contained to the recess groove 38*a* of the piston 38 and the ring-like elastic member 43E serves also as the piston ring 44 for sealing the side of the gas generator 35 of the piston 38. Further, as shown by FIGS. 30A, 30B and FIGS. 31A, 31B, the ring-like elastic member 43E is elastically deformed from the diameter contracting state to the diameter enlarging state, that is, such that the outer diameter dimension D1 is constituted from the outer diameter dimension D0 in the diameter contracting state to bring the outer peripheral face 43*c* into contact with the inner peripheral face 24*b* of the locking stepped portion 24 by being elastically deformed by an elastic force of its own when arranged to the locking stepped portion 24 after upward movement of the piston 38. However, as shown by FIG. 31B, the inner peripheral face 43*d* in enlarging the diameter is separated from inside of the recess groove 38*a* at a vicinity of the front end portions 43*f*, 43*f*, and arranged on the side of the bottom face 24*a* of the locking stepped portion 24.

Figure 29A:
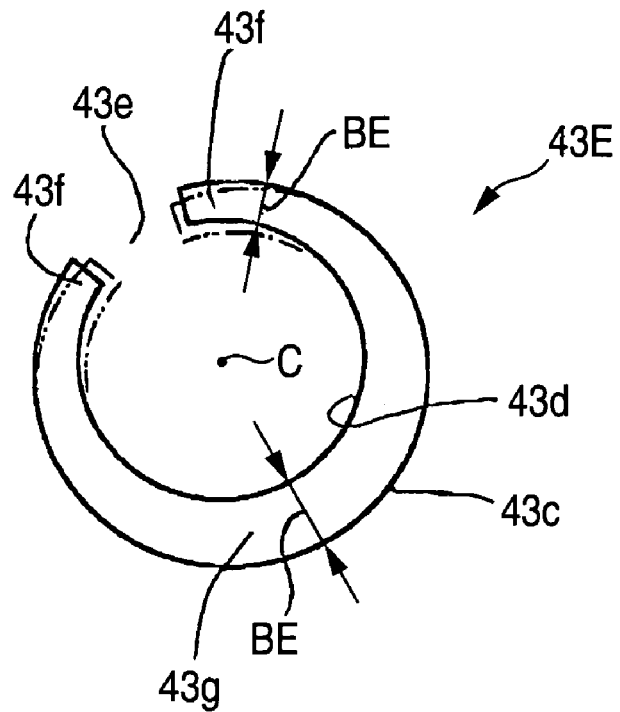
FIG. 29 illustrates a plane view and a perspective view of a ring-like elastic member used in an actuator of a tenth embodiment.
Figure 29B:
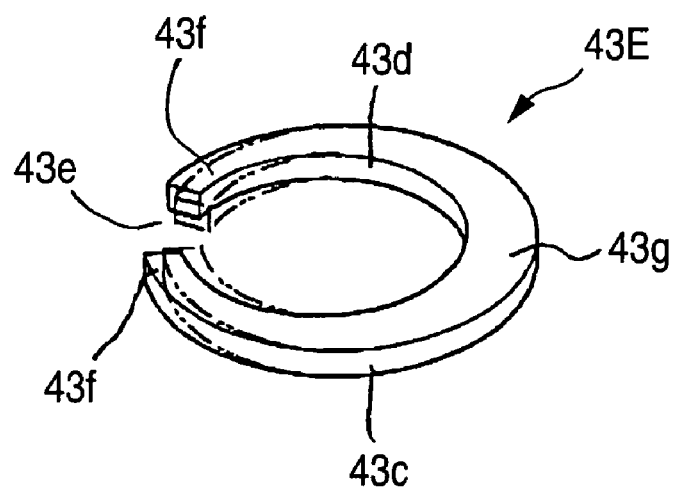

That is, the ring-like elastic member 43E is easily arranged to the recess groove 38*a* by being able to be deformed elastically to contract the diameter easily to bend the side of the front end portions 43*f*, 43*f* of the vicinity of the notch 43E to the side of the axis core C (refer to FIG. 29A) of the ring-like elastic member 43E and easily enlarge the diameter when arranged to the locking stepped portion 24. Further, according to the ring-like elastic member 43E of the tenth embodiment, the front end portions 43*f*, 43*f* per se at the vicinity of the notch 43E of the ring-like elastic member 43E narrows the width dimension BE between the inner and the outer peripheries, there is not brought about a state in which the ring-like elastic member 43E rides over the recess groove 38*a* of the piston 38 (moving member 37) and the locking stepped portion 24 of the cylinder 22 (housing 21) in enlarging the diameter, the outer peripheral face 43c the diameter of which is enlarged is brought into contact with the inner peripheral face 24b of the locking stepped portion 24, and even when arranged only on the side of the locking stepped portion 24, the vicinity of the side of the root portion 43g constituting the position of a point symmetry with the front end portion 43f is brought into a state of riding over the recess groove 38a of the piston 38 and the locking stepped portion 24 of the cylinder 22 to be able to lock to the bottom face 24a of the locking stepped portion 24 and the rearward movement of the support rod 40 can be restricted. In other words, when the front end portions 43f, 43f of the vicinity of the notch 43e of the ring-like elastic member 43E can ensure an elastic deformation of moving the side of the root portion 43G by bringing the side of the root portion 43G of the locking stepped portion 24 into the state of riding over the recess groove 38a of the piston 38 and the locking stepped portion 24 of the cylinder 22 to project from the recess groove 38a, it is not necessary to enlarge the diameter to bring the front end portions 43f, 43f per se into the state of riding over the recess groove 38a of the piston 38 and the locked stepped portion 24 of the cylinder 22 in enlarging the diameter. Therefore, there is not constituted a constitution in which in enlarging the diameter, an entire region of the ring-like elastic member 43 is enlarged to the state of riding over the recess groove 38a of the piston 38 and the locking stepped portion 24 of the cylinder 22, and in consideration of only the outer diameter dimension D1 by which the front end portions 43f, 43f per se are brought into the diameter enlarging state from the diameter contracting state in the elastic deformation, the inner diameter dimension dl in the elastic deformation may not be controlled strictly and the ring-like elastic member 43E comprising the C ring can easily be fabricated.

Further, when the ring-like elastic member is constituted by a shape of the C ring, other than constituting a ring shape of a shape of a circular plate having a thickness dimension of the plate shape along a direction of moving the piston 38 (moving member 37) as in the ring-like elastic members 43, 43E of the first and the tenth embodiments, as a cylinder shape, a cross-sectional face in a direction orthogonal to the axis may be constituted by the C ring shape.

Figure 32A:
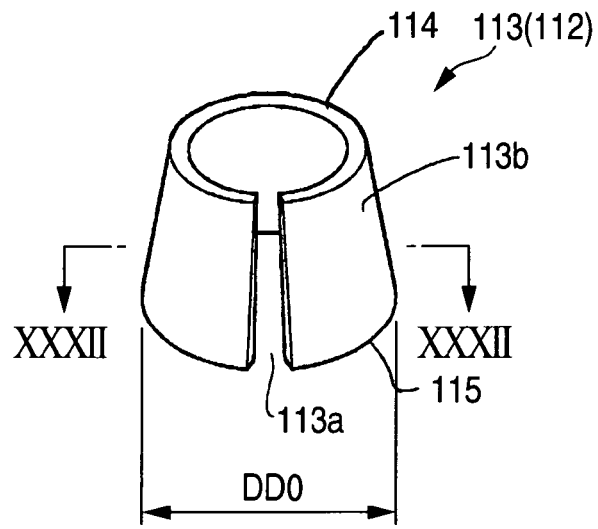
FIG. 32A illustrates perspective views showing states in time of contracting a diameter of a ring-like elastic member used in the actuator of an eleventh embodiment.
Figure 32A:
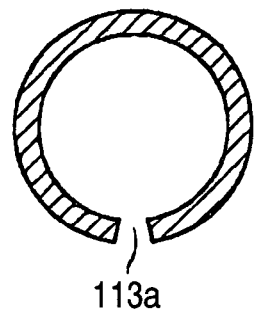
Figure 32B:
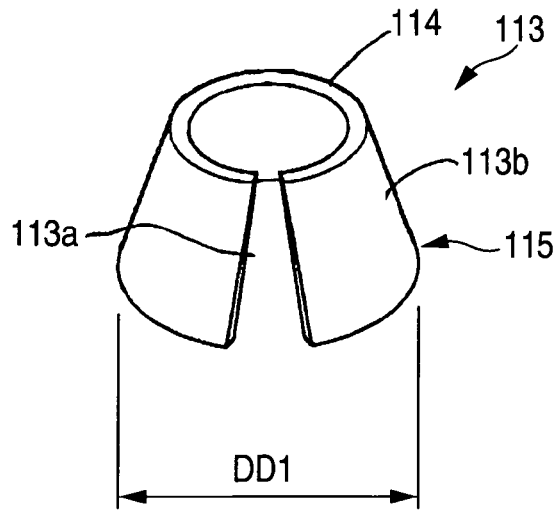
FIG. 32B illustrates perspective views showing states in time of enlarging the diameter of a ring-like elastic member used in the actuator of an eleventh embodiment.
Figure 33:
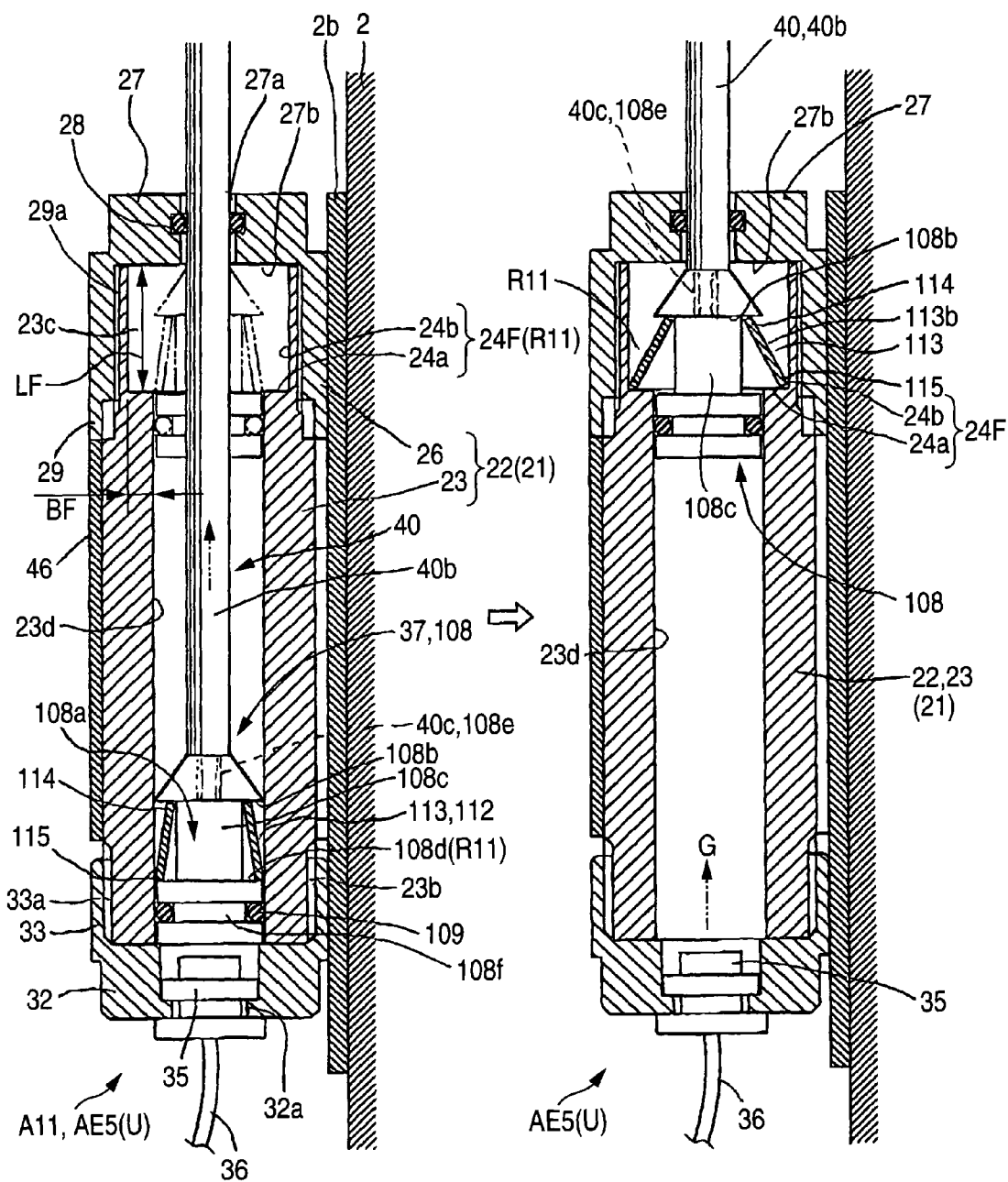
FIG. 33 is an outline vertical sectional view of the actuator of the eleventh embodiment, showing time of operating and time of finishing to operate.

For example, the ring-like elastic member may be constituted as in an actuator A11 (AE5) of an eleventh embodiment shown in FIGS. 32, 33, A ring-like elastic member 113 constituting a diameter enlarging deformed portion 112 according to the eleventh embodiment comprises spring steel or the like, a cross-sectional face in a direction orthogonal to the axis is constituted by a shape of a C ring having a notch 113a penetrating inner and outer peripheries, and the ring-like elastic member 113 is formed by a shape of a taper pipe capable of enlarging an outer diameter dimension of an end portion (lower end portion) 115 on a rear movement side more than an end portion (upper end portion) 114 on a forward movement side.

Further, the actuator A11 of the eleventh embodiment differs from the actuator A1 of the first embodiment only in constitutions of the ring-like elastic member 113 as the diameter enlarging deformed portion 112, a locking stepped portion 24F constituting a lock mechanism R11 along with the ring-like elastic member 113, and a piston 108 at a vicinity of a recess groove 108a of containing the ring-like elastic member 113 in a shape of a taper pipe, other constitutions are similar to those of the first embodiment, portions and members similar to those of the first embodiment are attached with notations the same as those of the first embodiment and an explanation thereof will be omitted.

Further, the ring-like elastic member 113 is constituted such that when arranged to the locking stepped portion 24F after the forward movement of the piston 108 (moving member 37), the upper end portion 114 is contained in a recess groove 108a, and the lower end portion 115 is elastically deformed from the diameter contracting state to the diameter enlarging state, and is separated from the recess groove 108a to be able to be brought into contact with a bottom face 14a and an inner peripheral face 24b of the locking stepped portion 24F. That is, in the case of the eleventh embodiment, the diameter of the lower end portion 115 is contracted to a state of making an outer diameter dimension DD0 (refer to FIG. 32A) coincide with that of the inner peripheral face 23d of the main body 23 of the cylinder 22 in a state before operating the actuator A11 (AE5) (refer to FIG. 33A), when arranged to the locking stepped portion 24F in being operated, the lower end portion 115 enlarges the diameter to an outer diameter dimension DD1 of being brought into contact with the inner peripheral face 24d of the locking stepped portion 24F (refer to FIGS. 32B, 33B).

The piston 108 constituting the moving member 37 is formed substantially in a shape of a circular pillar by being connected with the support rod 40 by screwing a male screw portion 40c of a lower end of the support rod 40 of inserting to an inserting hole 27a of the front end portion 27 of the cylinder 22 to a screw hole 108e. Further, an outer peripheral face of a lower portion constituting the rear movement side of the piston 108 is provided with a recess groove 108f arranged with a piston ring 109, and the outer peripheral face of an upper portion side constituting the forward movement side of the piston 108 is provided with a recess groove 108a of containing the ring-like elastic member 113 constituting the diameter enlarging deformed portion 112. The recess groove 108a is constituted by including a peripheral face 108c on a bottom portion side in a direction orthogonal to the axis of the support rod 40, a lower face 108b extended from an upper edge side of the peripheral face 108c and directed downward, an upper face 108d extended from a lower edge side of the peripheral face 108c and directed upward, and the ring-like elastic member 113 in a state of contracting the diameter of the lower end portion 115 is contained between the lower face 108b and the upper face 108d at inside of the recess groove 108a.

The locking stepped portion 24F of the cylinder 22 is configured to make a length dimension LF of the inner peripheral face 24B longer than that of the locking stepped portion 24 of the first embodiment in correspondence with the length dimension of the ring-like elastic member 113 since the ring-like elastic member 113 to be locked is constituted by a shape of a long taper pipe along the direction of moving the piston 108, and is constituted such that a width dimension BF of the bottom plate 24a (distance between the inner peripheral face 23d of the cylinder 22 and the inner peripheral face 24b of the locking stepped portion 24F) to be able to ensure a difference of outer diameter dimensions. DD0, DD1 from the diameter contracting state to the diameter enlarging state of the lower end portion 115 of the ring-like elastic member 113 (deformation amount) to be large (refer to FIG. 33A).

According to the actuator A11 (AE5), when operated, as shown by FIGS. 33A, 33B, when the piston 108 is moved upward by the gas G generated from the gas generator 35 and the ring-like elastic member 113 constituting the diameter enlarging deformed portion 112 is arranged at the locking stepped portion 24f, the lower end portion 115 is elastically deformed from the diameter contracting state to the diameter enlarging state to be separated from the recess groove 108a. Further, even when the support rod 40 is going to move downward, the upper end portion 114 is brought into contact with the peripheral face 108c and the lower face 108b in a state of being contained in the recess groove 108a and the lower end portion 115 is brought into a state of being brought into contact with the bottom face 24a and the inner peripheral face 24b at the locking stepped portion 24F. That is, the ring-like elastic member 113 enlarging the diameter of the lower end portion 115 can receive the downward movement of the support rod 40 by a portion between the upper end portion 114 brought into contact with the peripheral face 108c and the lower face 108b by being contained in the recess groove 108a and the lower end portion 115 brought into contact with the peripheral face 24a and the inner peripheral face 24b to be locked by the locking stepped portion 24F, that is, the peripheral wall 113b substantially in a shape of a circular cylinder along the axial direction of the taper pipe shape, and withstand even a large compressive load and can stably restrict the rearward movement of the support rod 40.

Further, according to the ring-like elastic member 113 in the taper pipe shape provided with the notch 113a along the axial direction as in the eleventh embodiment, the lower end portion 115 may be able to be separated from the recess groove 108a to be able to be simply brought into contact with the bottom face 24a and the inner peripheral face 24b of the locking stepped portion 24F in enlarging the diameter so far as the upper end portion 114 is brought into a state of being contained at inside of the recess groove 101a in enlarging the diameter. In other words, the lower end portion 115 constituting an end portion on the side of the rearward movement may not be able to enlarge the diameter to ride over the recess groove 108a through the locking stepped portion 24F, according to the ring-like elastic member 113 of the taper pipe shape provided with the notch 113a along the axial direction, an accuracy of a wall thickness or a deformation amount (deformation amount being elastically deformed from the diameter enlarging state to the diameter contracting state to be able to be contained in the recess groove 101a) of the lower end portion 115 may not strictly be controlled and the ring-like elastic member 113 can easily be fabricated.

Further, in the tenth and the eleventh embodiments, when the amount of absorbing the kinetic energy of the walker by plastically deforming the support rod is increased, similar to the first embodiment, the support rod 40 may be changed to the support rod 40A (refer to FIG. 8) or the like increasing the bending rigidity by making the shaft portion 40b bold by utilizing the screw holes 38c, 108e of the pistons 38, 108.

Figure 34A:
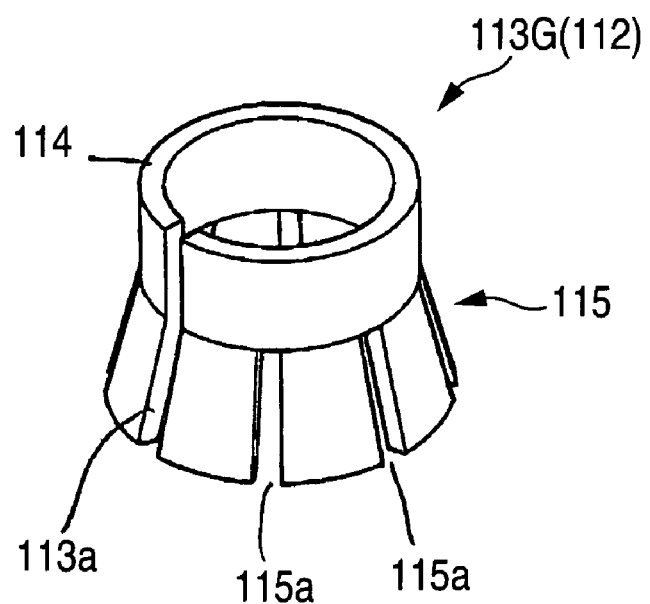
FIG. 34A is a perspective view showing a state of time of contracting a diameter in a modified example of a ring-like elastic member used in the eleventh embodiment.
Figure 34B:
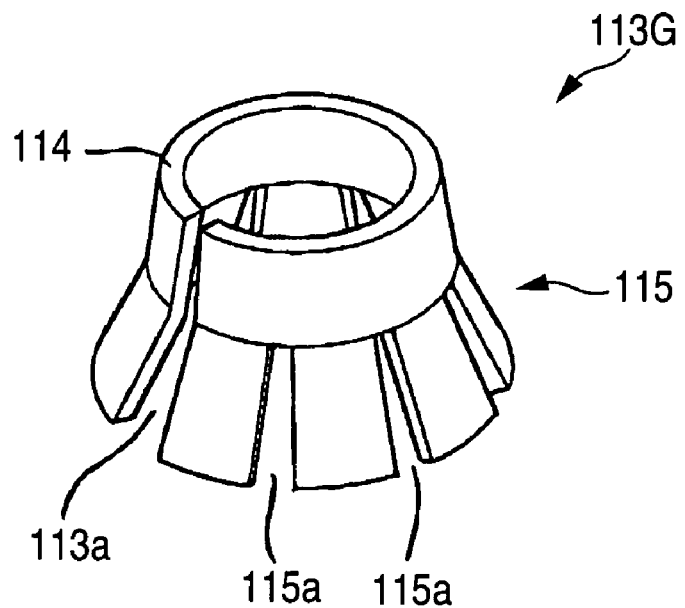
FIG. 34B is a perspective view showing a state of time of enlarging the diameter in a modified example of a ring-like elastic member used in the eleventh embodiment.

Further, as the ring-like elastic member of a taper pipe shape provided with a notch 113a along the axial direction, as in a ring-like elastic member 113G shown in FIGS. 34A, 34B, in order to facilitate to recover a side of the lower end portion 115 (end portion on rearward movement side), a plurality of slits 115a along the axial direction may be provided at the lower end portion 115.

Figure 35:
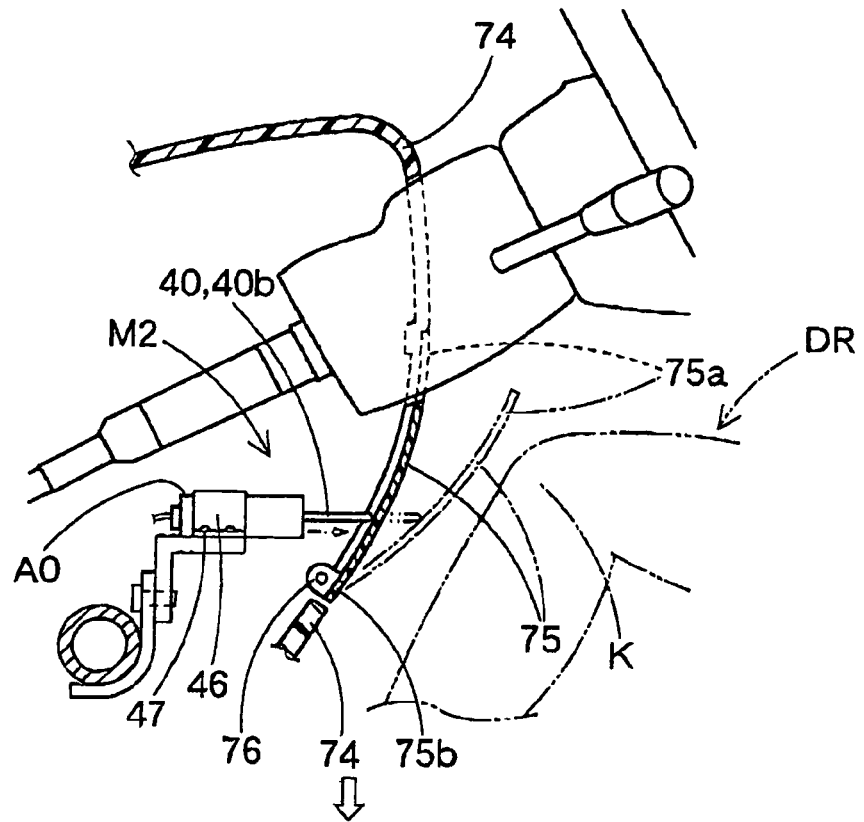
FIG. 35 is a view showing a modified example of respective embodiments.
Figure 35:
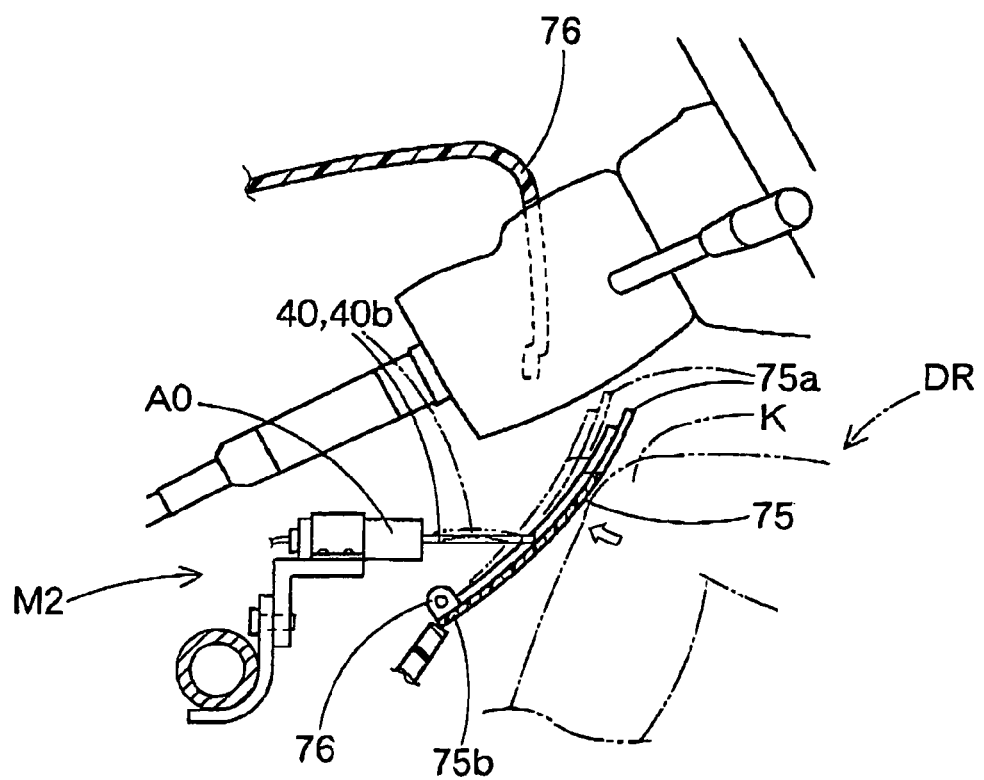

Further, although according to the actuators A1 (AE1), A8 (AE2), A9 (AE3), A10 (AE4), A11 (AE5), A2 (AP1), A3 (AP2), A7 (AP3), A4 (AC1), A5 (AC2), A6 (AC3) of the first through the eleventh embodiments, there is shown a case of constituting the forward movement by a movement of moving upward and the rearward movement is constituted by a movement of moving downward, the operating directions are not limited thereto, for example, the actuator of the invention may be used in an operating direction of a horizontal direction, further, a safety apparatus for an automobile used in the actuator of the invention may be used for an apparatus other than the walker protecting apparatus M1. For example, the actuators A1 (AE1), A8 (AE2), A9 (AE3), A10 (AE4), A11 (AE5), A2 (AP1), A3 (AP2), A7 (AP3), A4 (AC1), A5 (AC2), A6 (AC3) (in the illustrated examples, designated as A0 by summarizing these) may be used for a knee protecting apparatus M2 as a safety apparatus for an automobile shown in FIG. 35.

The knee protecting apparatus M2 protects the knee k of a driver DR by receiving the knee of the driver DR constituting a protection object, when the actuator A0 is operated, a knee receiving member 45 arranged at an instrument panel 74 is pushed to a rear side, and when the knee K is moved forward to collide with the knee receiving member 75, the kinetic energy of the driver DR is absorbed while receiving the knee K by plastically deforming to bend a shaft portion 40b of the support rod 40. Further, the knee receiving member 75 is axially supported by a hinge portion 76 attached to the instrument panel 74 and when the actuator A0 is operated, an upper end 75a is pushed out to the rear side by constituting a center of rotation by the hinge portion 76.

Further, according to the actuators A1 (AE1), A8 (AE2), A9 (AE3), A10 (AE4), A11 (AE5), A2 (AP1), A3 (AP2), A7 (AP3), A4 (AC1), A5 (AC2), A6 (AC3) of the first through the eleventh embodiments, there is constructed a constitution in which as the cylinder piston type, the gas generator 35 of generating the gas G by being ignited by inputting an operating signal is arranged on the end portion side remote from the front end wall portion 27, 27A, 27C, 27D of the housing 21 constituting the cylinder 22, and the moving member 37 as the piston 38, 48, 58, 68, 78, 78C, 88, 98, 98E, 108 is moved forward by constituting a drive source by the gas G generated by the gas generator 35, as the gas generator 35, a micro gas generator capable of generating a gas explosively and rapidly in being ignited and the moving member 37 as the piston 38, 48, 58, 68, 78, 78C, 88, 98, 98E, 108 can swiftly be moved. Naturally, when the actuator is made to constitute the piston cylinder type, as the drive source of moving forward the moving member as the piston, by constituting the working fluid by water, oil, air or the like, a water pressure, an oil pressure, an air pressure or the like may be utilized.

Further, as the drive source of moving forward the moving member, an attraction force of a solenoid can be utilized, or an urge force of a compressed spring (recovery force) or the like can be utilized. For example, in a case of utilizing the attraction force of the solenoid, when a movable iron core is arranged at inside of a housing as the moving member and electricity is conducted to an exciting coil arranged at a surrounding of the movable iron core at inside of the housing, the moving member can be moved forward. Further, in the case of utilizing the spring, when the moving member is connected to a free end side of the compressed coil spring, a front end of the moving member or the compressed coil spring is locked by a stopper constituted by a solenoid or the like to be able to be pulled, and the stopper is pulled to release locking, the moving member is moved forward by the urge force of recovering the compressed coil spring.

What is claimed is:
1. An actuator that is used in a safety apparatus for an automobile, the actuator configured to move forward a moving member arranged at inside of a housing in a cylindrical shape along with a support rod connected to the moving member in being operated, and comprising a lock mechanism of restricting a rearward movement of the support rod moved forward; wherein:
the support rod projected from a front end wall portion of the housing supports a receiving member for receiving a protection object;

the support rod is plastically deformed so as to absorb a kinetic energy of the protection object when receiving the protection object by the receiving member after having moved forward;

the lock mechanism comprise, a diameter enlarging deformed portion arranged at the moving member and capable of enlarging a diameter of the moving member more than an outer diameter dimension of the moving member when moving forward at inside of the housing, and a locking stepped portion arranged at a position where the moving member is located at, after having been moved at an inner peripheral face of the housing, said locking stepped portion capable of restricting a rearward movement of the moving member by locking the diameter enlarging deformed portion the diameter of which is enlarged; and the diameter enlarging deformed portion is locked by the locking stepped portion by being elastically deformed by an elastic force of the diameter enlarging deformed portion itself, or being plastically deformed by a press force of the moving member from a diameter contracting state to a diameter enlarging state when the moving member is arranged at the locking stepped portion after having been moved forward.

2. The actuator according to claim 1, wherein the moving member includes a recess groove provided along a peripheral direction of an outer peripheral face of the moving member; and the diameter enlarging deformed portion is configured by a ring-like elastic member contained in the recess groove and elastically deformed from the diameter contracting state to the diameter enlarging state riding over the recess groove of the moving member and the locking stepped portion of the housing when the moving member is arranged at the locking stepped portion after having been moved forward.

3. The actuator according to claim 2, wherein the ring-like elastic member is configured by a C ring having a notch penetrating inner and outer peripheries of the ring-like elastic member by a shape of widening a width dimension between the inner and the outer peripheries from a side of a front end portion at a vicinity of the notch over to a side of a root portion constituting a position in point symmetry with the notch.

4. The actuator according to claim 2, wherein the locking stepped portion provided at the housing includes a bottom face of restricting the rearward movement of the diameter enlarging deformed portion, and an inner peripheral face extended from an outer peripheral edge of the bottom face along a forward movement direction of the moving member;

wherein the ring-like elastic member is configured by a shape of a C ring having a notch penetrating inner and outer peripheries of the ring-like elastic member in a cross-sectional face thereof in a direction orthogonal to an axis, and formed by a shape of a taper pipe capable of enlarging an outer diameter dimension of an end portion on a rearward movement side more than an end portion on a forward movement side and is configured to be brought into contact with the bottom face and the inner peripheral face of the locking stepped portion by elastically deforming the end portion on the rearward movement side from the diameter contracting state to the diameter enlarging state by containing the end portion on the forward movement side to the recess groove when the moving member is arranged at the locking stepped portion after the forward movement.

5. The actuator according to claim 2, wherein the actuator is configured as a piston cylinder type and configured to move forward the moving member constituting a piston by making a working fluid flow to inside of the housing constituting a cylinder in being operated; and wherein the ring-like elastic member is constituted as a piston ring for sealing a side of supplying the working fluid of the moving member by being slidably brought into press contact with an inner peripheral face of the housing in a state of being contained to the recess groove.

6. The actuator according to claim 1, wherein the diameter enlarging deformed portion is configured as an elastic piece portion arranged on a side of an outer peripheral face of the moving member along the direction of moving the moving member;

wherein the elastic piece portion comprises one end portion thereof along the direction of moving the moving member by a base portion side connected to a main body side of the moving member, and other end portion thereof along the direction of moving the moving member by a hook piece portion capable of being locked by the locking stepped portion; and wherein when the moving member is arranged at the locking stepped portion after the forward movement, the elastic piece portion is arranged such that the hook piece portion is locked by the locking stepped portion by elastically deforming a side of the base portion to a side of the diameter enlarging direction to rotate the side of the hook piece portion by making a side of the base portion by a side of a center of rotation.

7. The actuator according to claim 6, wherein the elastic piece portion is constituted by arranging the hook piece portion relative to the base portion to be disposed on the forward movement side of the moving member;

wherein the front end wall portion is arranged with a guide face for guiding the hook piece portion in the diameter enlarging direction by being brought into contact with the hook piece portion when the moving member is arranged at the locking stepped portion after the forward movement.

8. The actuator according to claim 1, wherein the diameter enlarging deformed portion is plastically deformed from the diameter contracting state to the diameter enlarging state by being brought into contact with the front end wall portion when the moving member is arranged at the locking stepped portion after the forward movement.

9. The actuator according to claim 8, wherein the actuator is configured as a piston cylinder type, and configured to move forward the moving member constituting a piston by making a working fluid flow to inside of the housing constituting a cylinder in being operated;

wherein the moving member itself constitutes the diameter enlarging deformed portion by making substantially an entire periphery in a peripheral direction of at least a portion of an outer peripheral face slidable to an inner peripheral face of the cylinder.

10. The actuator according to claim 8, wherein the actuator is configured as a piston cylinder type, and configured to move forward the moving member constituting a piston by making a working fluid flow to inside of the housing constituting a cylinder in being operated;

wherein the locking stepped portion provided on a side of the cylinder is constituted by including a bottom face for restraining the rearward movement of the diameter enlarging deformed portion, and an inner peripheral face extended from an outer peripheral edge of the bottom face along a direction of moving forward the moving member;

wherein the moving member includes:
- a piston main body; and
- a lock member arranged on a side of the front end wall portion of the piston main body separately from the piston main body and connected to the support rod by being made to be able to be brought into contact with the front end wall portion;

wherein the lock member includes a ceiling plate portion made to be able to be brought into contact with the front end wall portion by connecting the support rod, and an umbrella portion in a cylindrical shape constituting the diameter enlarging deformed portion by being extended from an outer peripheral edge of the ceiling plate portion to a side of the piston main body;

wherein the umbrella portion includes a locking leg arranged to a side of an end portion remote from the ceiling plate portion and divided into a plurality thereof in a direction around an axis of the cylinder;

wherein the piston main body includes a taper-like press portion in a converging shape to be able to press the lock member to move to a position of arranging the locking stepped portion by being brought into contact with the respective locking legs of the umbrella portion when the moving member constituting the piston is moved forward at a front end thereof on a side of the umbrella portion; and wherein when the lock member is arranged at a position of arranging the locking stepped portion by being pressed by the piston main body to bring the ceiling plate portion into contact with the front end wall portion, the umbrella portion is opened in the diameter enlarging direction while being plastically deformed by being pressed by the taper-like press portion of the piston main body, and the respective locking legs of the umbrella portion are configured to restrict the rearward movement of the lock member by being brought into contact with the bottom face and the inner peripheral face of the locking stepped portion.

11. The actuator according to claim 1, wherein the housing is configured by arranging a gas generator of generating a gas by being ignited in inputting an operating signal on a side of an end portion remote from the front end wall portion; wherein the moving member is configured to move forward by constituting a drive source by the gas generated from the gas generator.

\* \* \* \* \*